US008121378B2

(12) United States Patent
George et al.

(10) Patent No.: US 8,121,378 B2
(45) Date of Patent: *Feb. 21, 2012

(54) FAST HIERACHICAL TOMOGRAPHY METHODS AND APPARATUS

(75) Inventors: Ashvin K. George, Champaign, IL (US); Yoram Bresler, Urbana, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/546,178

(22) Filed: Aug. 24, 2009

(65) Prior Publication Data
US 2010/0002955 A1   Jan. 7, 2010

Related U.S. Application Data

(63) Continuation of application No. 10/570,020, filed on Feb. 28, 2006, now Pat. No. 7,729,526.

(60) Provisional application No. 60/501,350, filed on Sep. 9, 2003.

(51) Int. Cl.
*G06K 9/00* (2006.01)
*A61B 6/00* (2006.01)

(52) U.S. Cl. ............................ 382/131; 382/154; 378/21

(58) Field of Classification Search .................. 382/100, 382/128, 129, 130, 131, 132, 133, 134, 154, 382/168, 173, 181, 194, 203, 232, 254, 255, 382/260, 274, 280, 285–295, 305, 312, 250; 378/4, 11, 14, 20, 21
See application file for complete search history.

(56) References Cited

U.S. PATENT DOCUMENTS

| 4,135,247 | A | * | 1/1979 | Gordon et al. | 378/11 |
| 5,778,038 | A | * | 7/1998 | Brandt et al. | 378/4 |
| 5,909,476 | A | * | 6/1999 | Cheng et al. | 378/4 |
| 6,151,377 | A | * | 11/2000 | Nilsson | 378/4 |
| 6,351,548 | B1 | * | 2/2002 | Basu et al. | 382/128 |
| 6,463,116 | B1 | * | 10/2002 | Oikawa | 378/4 |

FOREIGN PATENT DOCUMENTS
EP   0811952 A2   12/1997

OTHER PUBLICATIONS

Samit Basu, Yorman Bresler, "0(n2logN) Filtered Backprojection Reconstruction Algorithm for Tomography", IEEE Transactions on Image Processing, vol. 9, No. 10, Oct. 2000.
Supplemental International Search Report and Written Opinion Under Date of Mailing of May 4, 2005, in connection with international Patent Application No. PCT/US2004/29857.

* cited by examiner

*Primary Examiner* — Seyed Azarian
(74) *Attorney, Agent, or Firm* — Quarles & Brady LLP

(57) ABSTRACT

Pixel images $\hat{f}$ are created from projections ($q_1 \ldots q_p$) by backprojecting selected projections to produce intermediate images ($I_{l,m}$), and performing digital image coordinate transformations and/or resampling on selected intermediate images. The digital image coordinate transformations are chosen to account for view angles of the constituent projections of the intermediate images and for their Fourier characteristics, so that the intermediate images may be accurately represented by sparse samples. The resulting intermediate images are aggregated into subsets, and this process is repeated in a recursive manner until sufficient projections and intermediate images have been processed and aggregated to form the pixel image $\hat{f}$. Digital image coordinate transformation can include rotation, shearing, stretching, contractions. Resampling can include up-sampling, down-sampling, and the like. Projections can be created from a pixel image ($\hat{f}$), by performing digital image coordinate transformation and/or resampling and/or decimation re-projecting the final intermediate image.

20 Claims, 36 Drawing Sheets

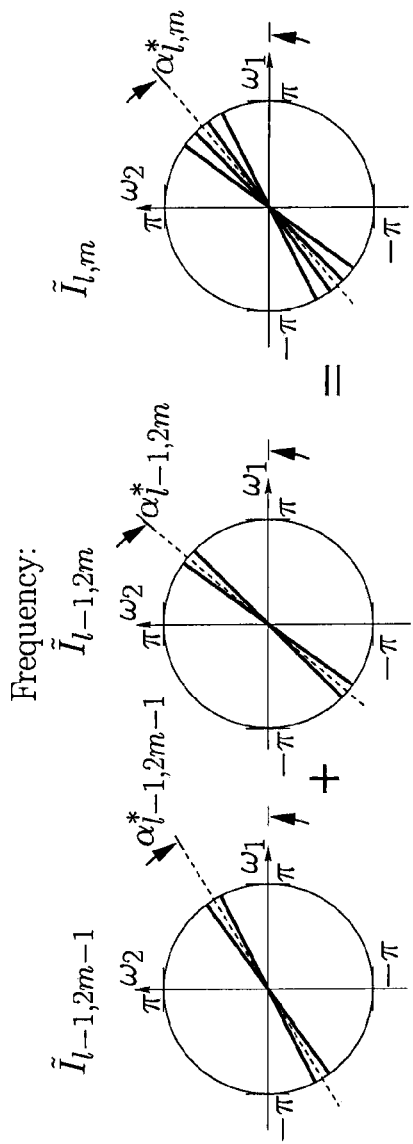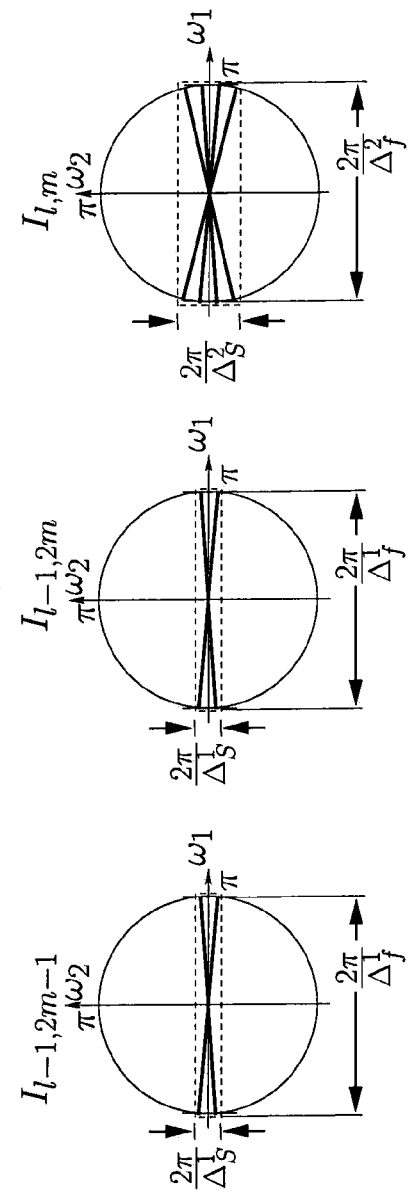
FIG.7A
FIG.7B $$\text{FINDALPHAS}(E_{L+1,1}, E_{L+1,2}):$$

for $l \leftarrow L$ downto 2
  for $m \leftarrow 1$ to $6 \cdot 3^{L-l}$
    for $i \in \{0, 2\}$ $$\alpha^*_{l,3m-i} = -\frac{(E^i_{l+1,m})^+_y + (E^i_{l+1,m})^-_y}{(E^i_{l+1,m})^+_x + (E^i_{l+1,m})^-_x}$$

$$E_{l,3m-i} = \mathcal{S}(-\alpha_{l,3m-i}) E^i_{l,3m-i}$$

FIG.14

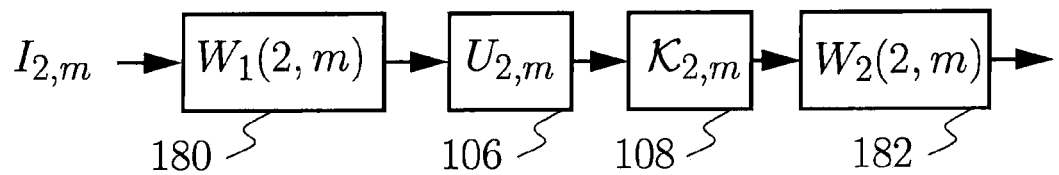
FIG.19
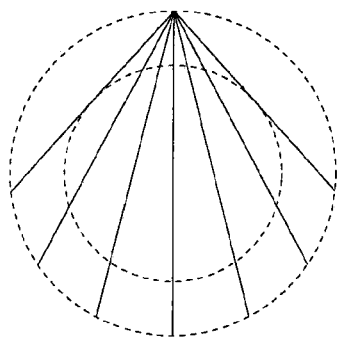 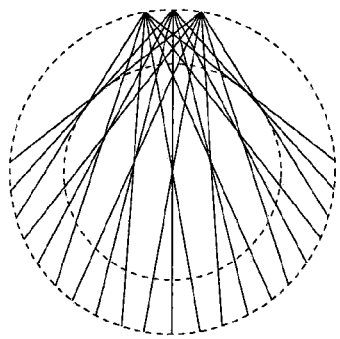 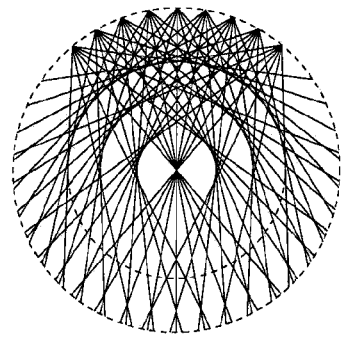
FIG.20A  FIG.20B  FIG.20C
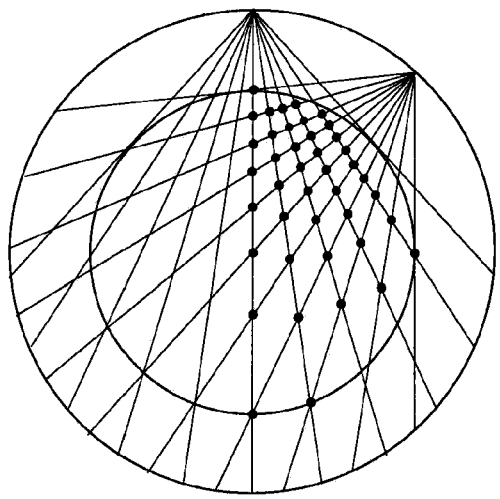 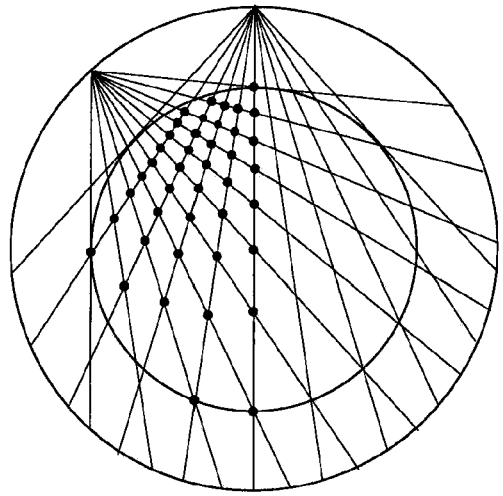
FIG.21A  FIG.21B Central Divergent Beam Sampling on the Central Divergent Beam (1) Intersect with vertical planes (2) Resample on planes:

FIG.37A    FIG.37B
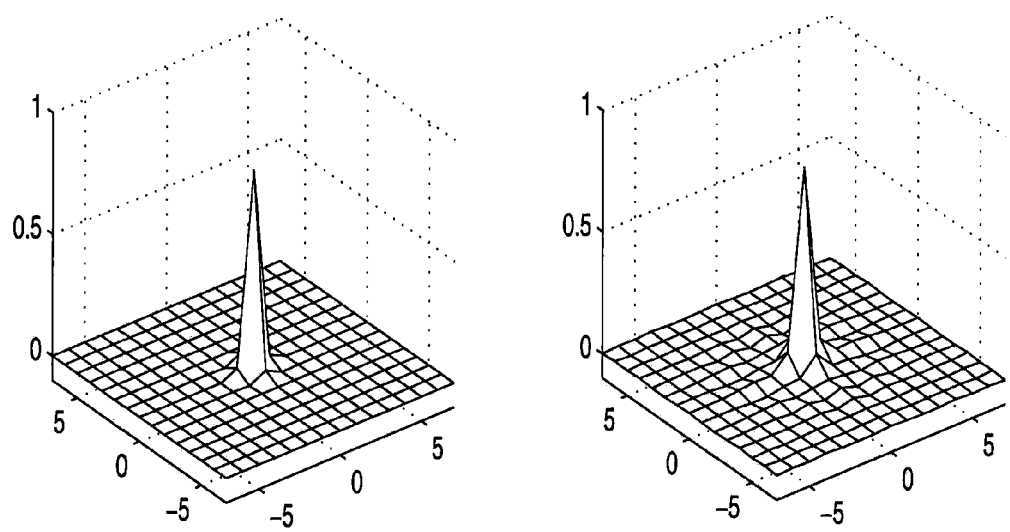
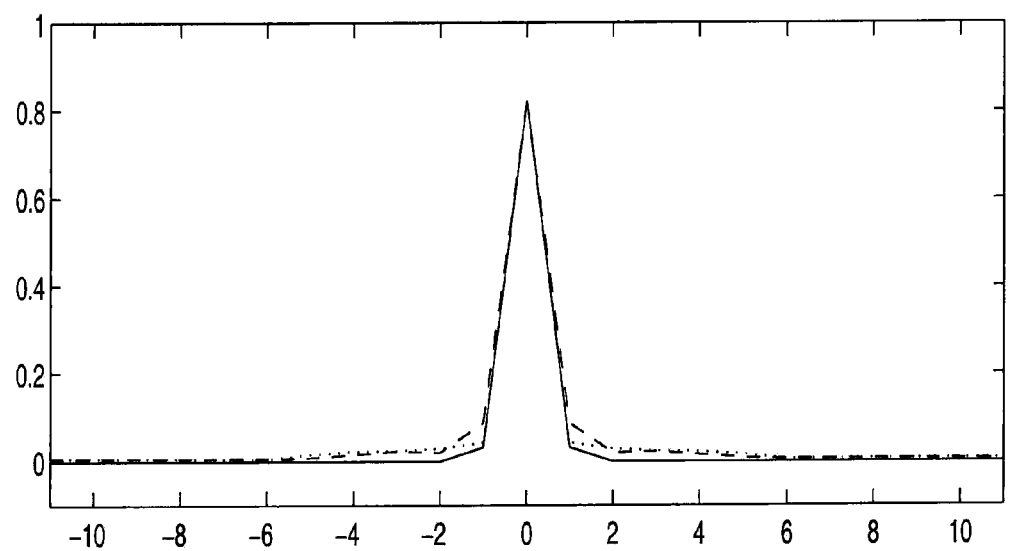
FIG.37C

FAST HIERACHICAL TOMOGRAPHY METHODS AND APPARATUS

This application is a continuation of U.S. patent application Ser. No. 10/570,020, filed Feb. 28, 2006 now U.S. Pat. No. 7,729,526, which is incorporated herein by reference in its entirety, and which claims the benefit of U.S. Provisional Patent Application Ser. No. 60/501,350, filed Sep. 9, 2003, which is also incorporated herein by reference in its entirety.

This invention relates to tomography, and more particularly, to methods and apparatus for creating pixel images from projections.

BACKGROUND OF THE INVENTION

Tomographic reconstruction is a well-known technique underlying nearly all of the diagnostic imaging modalities including x-ray computed tomography (CT), positron emission tomography (PET), singly photon emission tomography (SPECT), and certain acquisition methods for magnetic resonance imaging (MRI). It also finds application in manufacturing for nondestructive evaluation (NDE), for security scanning, in synthetic aperture radar (SAR), radio astronomy, geophysics and other areas.

There are several main formats of tomographic data: (i) parallel-beam, in which the line-integrals are performed along sets of parallel lines; (ii) divergent-beam, in which the line-integrals are performed along sets of lines that diverge as a fan or a cone; and (iii) curved, in which the integrals are performed along sets of curves, such as circles, ellipses, or other closed or open curves. One problem of tomographic reconstruction is to reconstruct a 2D or 3D image from a set of its line-integral projections. Another problem of tomographic reconstruction is to reconstruct a 3D image from a set of its surface-integral projections, that is, its integrals on a family of surfaces. For example, the 3D Radon transform involves integrals of the image on a family of 2D planes of various orientations and distances from the origin. Some of the problems of tomographic reconstruction, and some of the reconstruction methods, are described in standard references such as F. Natterer, *The Mathematics of Computerized Tomography*. Chichester: John Wiley, 1986; F. Natterer and F. Wubbeling, *Mathematical Methods in Image Reconstruction*. Philadelphia: Society for Industrial and Applied Mathematics, 2001; A. C. Kak and M. Soaney, *Principles of Computerized Tomographic Imaging*. New York: IEEE Press, 1988; and S. R. Deans, *The Radon Transform and Some of Its Applications*. New York: Wiley, 1983.

The method of choice for tomographic reconstruction is filtered backprojection (FBP) or convolution backprojection (CBP), which use an unweighted (in the parallel-beam or Radon Transform cases) or a weighted (in most other cases) backprojection step. This step is the computational bottleneck in the technique, with computational requirements scaling as $N^3$ for an N×N-pixel image in 2D, and at least as $N^4$ for an N×N×N-voxel image in 3D. Thus, doubling the image resolution from N to 2N results in roughly an 8-fold (or 16-fold, in 3D) increase in computation. While computers have become much faster, with the advent of new technologies capable of collecting ever larger quantities of data in real time (e.g., cardiac imaging with multi-row detectors, interventional imaging), and the proliferation of 3D acquisition geometries, there is a growing need for fast reconstruction techniques. Fast reconstruction can either speed up the image formation process, reduce the cost of a special-purpose image reconstruction computer, or both.

The dual operation of backprojection is reprojection, which is the process of computing the projections of an electronically stored image. This process, too, plays a fundamental role in tomographic reconstruction. A combination of backprojection and reprojection can also be used to construct fast reconstruction algorithms for the long object problem in the helical cone-beam geometry, which is key to practical 3D imaging of human subjects. Furthermore, in various applications it is advantageous or even necessary to use iterative reconstruction algorithms, in which both backprojection and reprojection steps are performed several times for the reconstruction of a single image. Speeding up the backprojection and reprojection steps will determine the economic feasibility of such iterative methods.

Several methods have been proposed over the years to speed up reconstruction. For example, Brandt et al. U.S. Pat. No. 5,778,038 describes a method for 2D parallel-beam tomography using a multilevel decomposition, producing at each stage an image covering the entire field-of-view, with increasing resolution. Nillson et al. U.S. Pat. No. 6,151,377 disclose other hierarchical backprojection methods. While these systems may have merit, there is still a need for methods and apparatus that produce more accurate images, and offer more flexibility between accuracy and speed.

Accordingly, one object of this invention is to provide new and improved methods and apparatus for computed tomography (CT) scanning.

Another object is to provide new and improved methods and apparatus for CT scanning that produce more accurate images, and offer more flexibility between accuracy and speed.

SUMMARY OF THE INVENTION

These objects are achieved or exceeded by the present invention. Pixel images are created from projections by backprojecting selected projections to produce intermediate images, and performing digital image coordinate transformations and/or resampling on intermediate images. The digital image coordinate transformations are chosen to account for view angles of the constituent projections of the intermediate images and for their Fourier characteristics, so that the intermediate images may be accurately represented by sparse samples. The resulting intermediate images are aggregated into subsets, and this process is repeated in a recursive manner until sufficient projections and intermediate images have been processed and aggregated to form the pixel image.

Digital image coordinate transformation can include rotation, shearing, stretching, contractions, etc. Reampling can include up-sampling, down-sampling and the like.

Projections can be created from a pixel image by performing digital image coordinate transformation and/or resampling and/or decimation and re-projecting the final intermediate image.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIGS. 7A and 7B are diagrams showing Fourier supports of intermediate images for the backprojection algorithm illustrated in FIG. 5A.

FIG. 14 is an algorithm for finding optimal shear factors;

FIG. 19 illustrates weighting of intermediate images in the algorithm described in FIG. 18;

FIGS. 20A, 20B and 20C illustrate sampling points for the second hierarchical level of FIG. 18;

FIGS. 21A and 21B are diagrams of sampling patterns used in the algorithm of FIG. 18;

FIGS. 37A and 37B are diagrams of point spread functions of the conventional algorithm and the fast algorithm of the present invention, respectively, and FIG. 37C displays cuts through these point spread functions.

DETAILED DESCRIPTION

Symbols and Fonts

Figure 1:
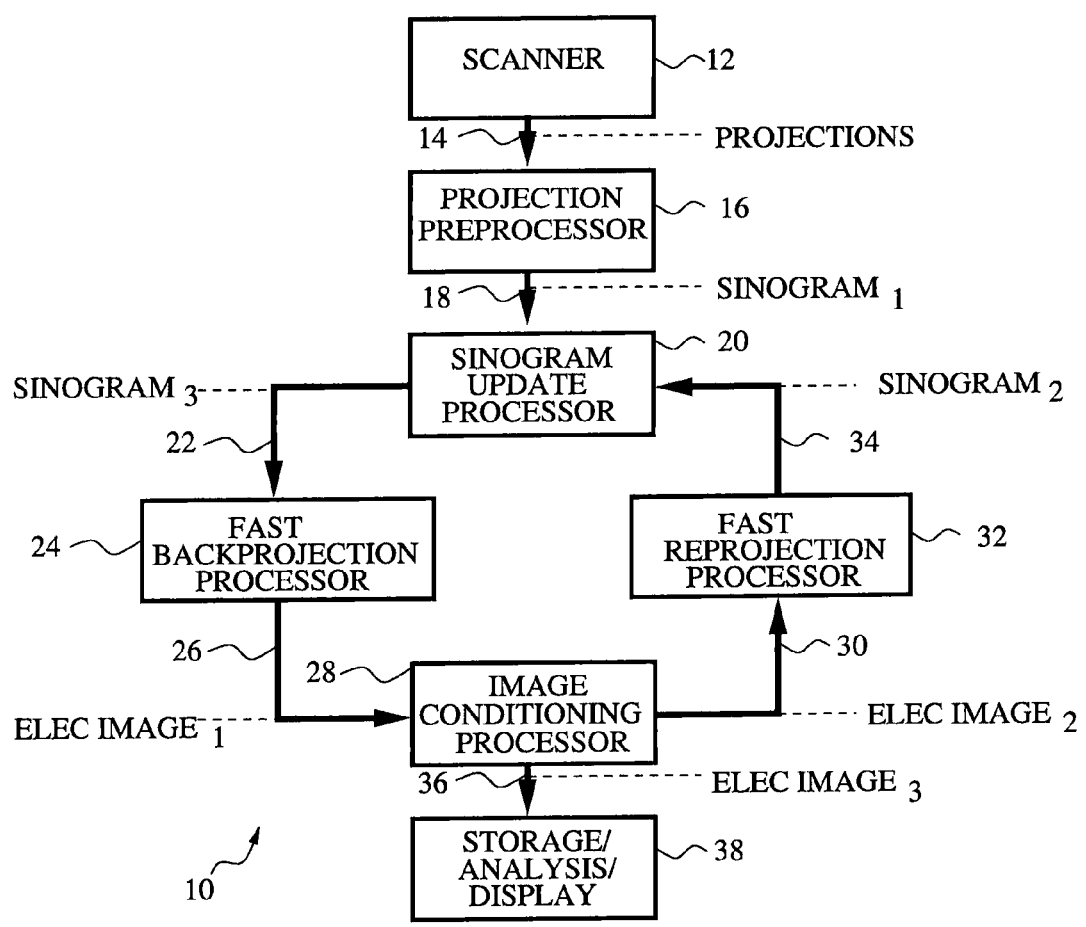
FIG. 1 is a block diagram of apparatus used for the present invention.

The following system of mathematical symbols and fonts will be used to improve clarity.

Functions in the space domain are denoted by small letters (e.g. $f(x)$), while their Fourier transforms are denoted by capital letters ($F(\omega)$).

The indices of two-variable functions are denoted variously, depending on convenience. The following three notations of function f are equivalent: $f((x_1, x_2))$, $f(\vec{x})$, and $$f\left(\begin{bmatrix} x1 \\ x2 \end{bmatrix}\right).$$

Continuous-domain and discrete-domain functions respectively are distinguished by the style of parentheses used with their indices: $f(x_1, x_2)$ is a function of two continuous variables (i.e., $\vec{x} \in \mathbb{R}^2$), and $f[m_1, m_2]$ is the sampled version of $f(\vec{x})$ and is therefore a 2-D array.

A linear operator and its corresponding matrix are distinguished by the font style. Suppose ($A \in \mathbb{R}^{2 \times 2}$) is a matrix, then $\mathcal{A}$ is its associated linear operator. For example, if A is a coordinate transformation, $g(\vec{x}) = (\mathcal{A}f)(\vec{x}) = f(A\vec{x})$.

The same operator is sometimes denoted differently inside and outside block diagrams. While outside it may be denoted as $\mathcal{A}(\alpha)$, within the block diagram it is denoted as $\mathcal{A}_\alpha$.

Overview of Hardware

The present invention has application in a variety of imaging apparatus, including CT scanners. Typical imaging apparatus 10 (FIG. 11) includes a scanner 12 which acquires data from an object such as a head, and sends raw data corresponding to line-integral projections, e.g., with a divergent beam geometry, 14 to a projection pre-processor 16. The projection pre-processor 16 applies various conversions, normalizations, and corrections to the data, as well as weighting and filtering, which may be shift varying. The output of the projection pre-processor 16 is a collection of pre-processed projections, hereinafter simply referred to as projections, also called sinogram$_1$ 18, which is fed to a sinogram update processor 20. The sinogram update processor 20 possibly modifies the input sinogram$_1$ 18, using information from sinogram$_2$ 34, for example correcting for various artifacts including beam-hardening, or as part of a multi-step or iterative reconstruction procedure.

The output of the sinogram update processor 20 is a sinogram$_3$ 22, which is input to a fast backprojection processor 24. The fast backprojection processor 24 is generally a computer or special purpose hardware, or any combination thereof, of any suitable type programmed and/or wired to perform the algorithms described herein.

The output of the fast backprojection processor 24 is an electronic image, 26, which is input to an image conditioning processor 28. The image conditioning processor 28 performs necessary postprocessing of the electronic image, possibly including identification and extraction of artifact images, or images for further processing in a multi-step or iterative reconstruction process.

If desired, the image conditioning processor 28 can produce an electronic image$_2$ 30 that is fed to a fast reprojection processor 32. The fast reprojection processor 32 is generally a computer or special purpose hardware, or any combination thereof, of any suitable type programmed and/or wired to perform the algorithms described herein. If desired, this processor can share the use of the same computer and hardware employed by the backprojection processor 24.

The output of the fast reprojection processor 32 is a sinogram$_2$ 34, which is fed back into the sinogram update processor 20. The backprojection/reprojection process can continue until suitable results are obtained. While reprojection is not always needed, it is helpful in many situations.

When the electronic image$_1$ 26 is suitable, the image conditioning processor 28 produces an electronic image$_3$ 36, which is fed to a storage/analysis/display device 38. It is contemplated that the electronic image$_3$ 36 can be stored in a computer memory, and/or analyzed electronically for anomalies or dangerous materials, for example, and/or displayed, and/or printed in some viewable form.

Overview of Backprojection and Reprojection Methods of the Present Invention

The backprojection methods of the present invention use various techniques to create an image made of pixels (picture elements) and/or voxels (3D picture elements), hereinafter referred to collectively as pixels, which will now be introduced in a general way.

This explanation uses terminology and processes commonly used in multi-dimensional signal processing, for example as described in D. Dudgeon and R. Mersereau, *Multidimensional Digital Signal Processing*. Englewood Cliffs: Prentice-Hall, 1983. Some terms in this description of the present invention are used in the following contexts. The term Sampling pattern refers to a set of points in space with positions defined relative to a system of coordinates. Examples of sampling patterns are seen in FIGS. 2A-2C and 3A-3C. A Cartesian sampling pattern refers to a set of points formed by the intersection of two mutually perpendicular sets of parallel lines. The term continuous image refers to a function defined on a coordinate system, for example, f(x, y), and f(x, y, z) are respectively 2D and 3D functions. A digital image is an array of values of a continuous image on a sampling pattern. More broadly, a continuous image can be represented by an array of numbers that serve as the coefficients in a series expansion with respect to some basis set, such as splines, of which the Cartesian product of zero-th order splines yields the familiar square pixel form for displaying digital images as continuous images. Hereinafter, this array of numbers will be also referred to as a digital image. All images stored in a digital computing device must be digital. For brevity, both digital and continuous images will be often referred to hereinafter simply as images, with the meaning inferred from the context. With this terminology, a pixel image is a digital image corresponding to a sampling pattern that is a lattice, i.e., a uniformly spaced, periodic pattern, usually but not necessarily Cartesian.

One sampling pattern will be said to be sparser than another, if it yields a smaller total number of samples of a continuous image. Typically a sparser sampling pattern will have a lower sampling density. Oversampling refers to using more samples than necessary to represent a continuous image at a desired accuracy. The corresponding digital image will be said to be oversampled. Given a digital image corresponding to a continuous image for one sampling pattern, the process of producing a new digital image corresponding, with a desired accuracy, to the same continuous image on a different sampling pattern, will be called digital image resampling. Up-sampling and down-sampling are special cases of resampling on a denser or sparser sampling pattern, respectively. Further, up-sampling or down-sampling by a factor of 1 involves no change in the digital image, is considered a form of up-sampling or down-sampling. Digital image addition refers to to a point-by-point addition of digital images defined with respect to the same sampling pattern, or the same basis, in the case of an expansion with respect to a basis. Lower dimensional digital filtering refers to digital filtering of a multidimensional array along only a subset of its dimensions, for example, separate 1D filtering of each column of a 2D rectangular digital image.

Coordinate transformation of a continuous image refers to operations such as rotation, shearing, stretching, or contraction. To define a digital coordinate transformation, consider two continuous images related by a coordinate transformation, and the corresponding digital images representing the continuous images with respect to a common sampling pattern. The process of producing one digital image from the other is called digital image coordinate transformation. This can be accomplished by digital filtering, i.e., by discrete index operations on the digital image. Specific examples include (but are not limited to) digital image rotation, digital image shearing, digital image stretching, digital image contraction, and the combinations of such operations. Methods for performing digital image coordinate transformation are known, for example, as described in M. Unser, P. Thevenaz, and L. Yaroslavsky, *Convolution-based interpolation for fast, high-quality rotation of images*. IEEE Transactions Image Processing, Vol. 4, pp. 1371-1381, 1995.

Figure 2A:
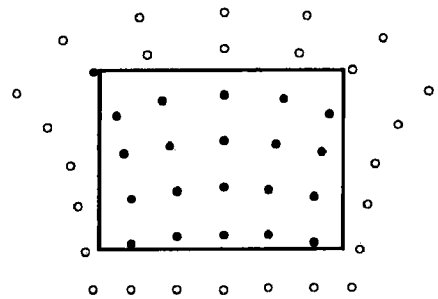
FIGS. 2A, 2B and 2C are diagrams of sampling patterns used in some embodiments of the present invention.
Figure 2B:
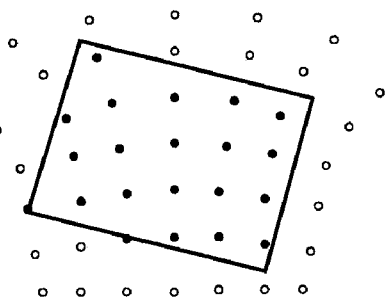
Figure 2C:
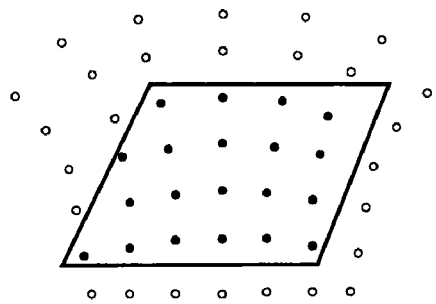

Some digital image coordinate transformations are illustrated in FIGS. 2A-2C and 3A-3C. FIG. 2A shows the outline of a continuous image (a rectangle) and the sampling pattern for a digital image representing it. Values of the continuous image on the heavy dots are included in the digital image. FIGS. 2B and 2C show the rotated and the sheared continuous image, respectively, on the same sampling pattern, with the heavy dots showing the values included in the digitally rotated/sheared version of the digital image in FIG. 2A.

Figure 3A:
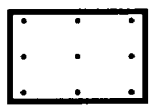
FIGS. 3A, 3B and 3C are additional sampling patterns used in some embodiments of the present invention.
Figure 3B:
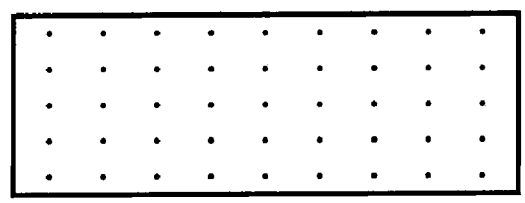
Figure 3C:
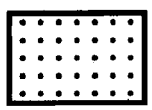

FIG. 3A also shows a continuous image and a sampling pattern defining a digital image. FIG. 3B shows the stretched continuous image by some constant factors in the x and y dimensions. The digitally stretched image is defined by values of the stretched continuous image on the heavy dots. FIG. 3C shows the same continuous image as in FIG. 3A, but with a sampling pattern denser by certain stretch factors. The corresponding digital image in FIG. 3C will be the same as in FIG. 3B. More generally, digital image stretching or contraction can be equivalent, for sampling patterns with some regularity, to digital image up-sampling or down-sampling.

Note that the application of certain coordinate transformations, such as rotation by 0 degrees, shearing by a shear parameter of zero, or stretching or contraction by a factor of 1, leave the digital image unchanged, and therefore may be either included or omitted in the description of a process, without changing the result.

The Fourier transform of a continuous image allows one to determine, via sampling theory, the properties of sampling patterns such that the corresponding digital image represents the continuous image to desired accuracy, as explained, for example, in D. Dudgeon and R. Mersereau, *Multidimensional Digital Signal Processing*. Englewood Cliffs: Prentice-Hall, 1983. Likewise, the discrete-time Fourier transform (DTFT) of a digital image allows one to determine what digital image coordinate transformations will produce a digital image that represents the transformed continuous image to a desired level of accuracy. The relevant properties of the Fourier transform of continuous images, and the DTFT of digital images, will be collectively referred to as Fourier characteristics.

Weighted backprojection operations require weighting of each projection by a weight that depends on the position of the pixel generated by the backprojection. Different weights can be used for different projections, depending, for example, on the position of the source at which the projection was acquired, as explained in A. C. Kak and M. Slaney, *Principles of Computerized Tomographic Imaging*. New York: IEEE Press, 1988. As a special case, the weighting factor can be equal to 1, which corresponds to no weighting, but is a weighting factor. Unless specifically indicated, weighted and un-weighted backprojection will be collectively referred to as backprojection. With this background information, several embodiments of the invention will be described.

The backprojection processor 24 (FIG. 1) is programmed to perform the algorithms used to practice the present invention. The algorithms will be discussed in detail, but will first be described in more general terms. Steps in the backprojection process are indicated in block diagrams, with reference numerals.

Figure 4:
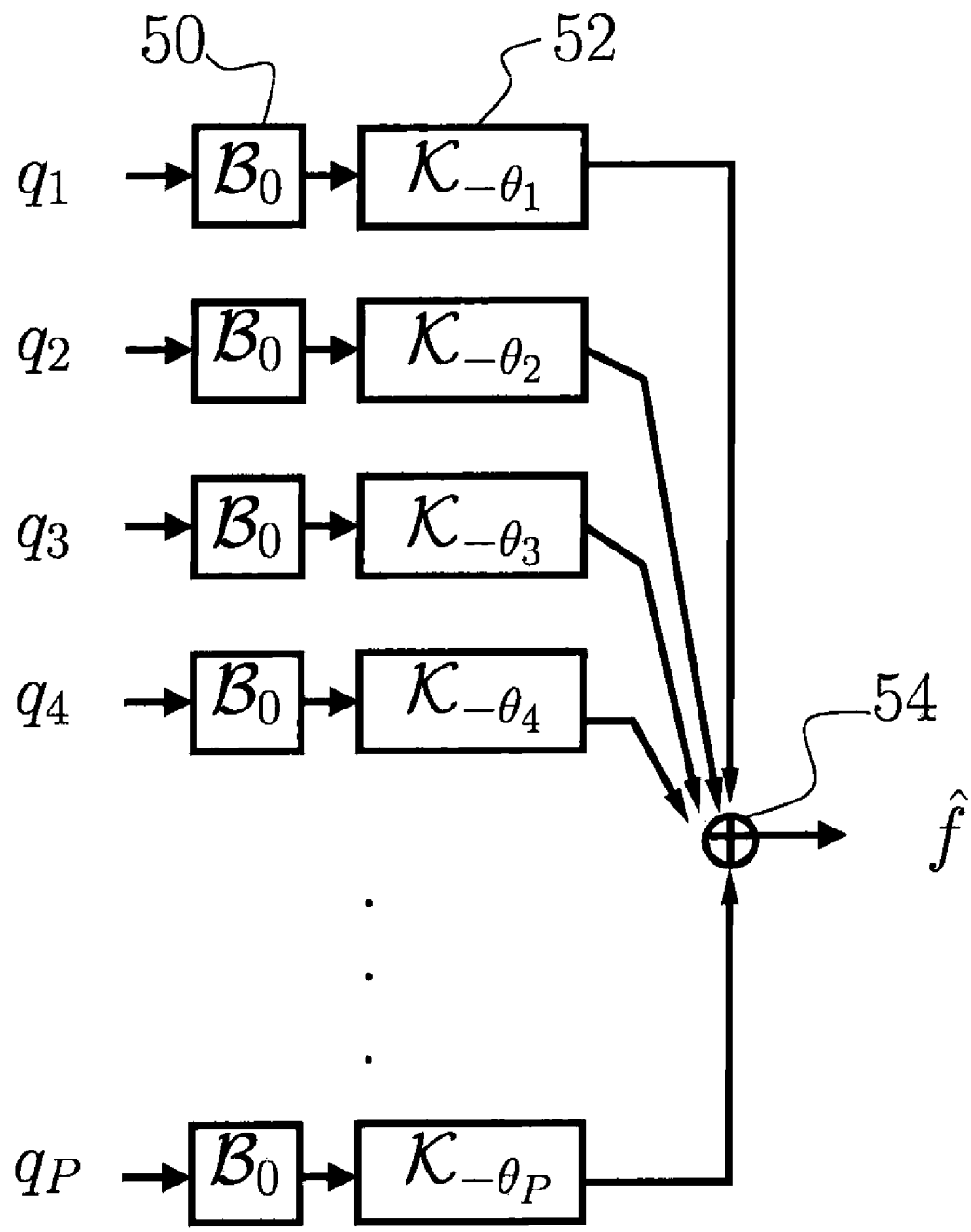
FIG. 4 is a diagram illustrating a known method of backprojection.

FIG. 4 illustrates rotation-based backprojection, as the sum of rotated intermediate images formed by backprojecting individual projections $q_1 \ldots q_P$ at zero angle in step 50. The backprojections produces images which are subjected to coordinate transformation at 52, and aggregated at 54 to produce an image $\hat{f}$. By itself, this structure is equivalent to conventional backprojection, and offers no reduction in operation count. However, it serves as a stepping stone to the introduction of some of the fast hierarchical backprojection methods of the present invention.

Figure 5A:
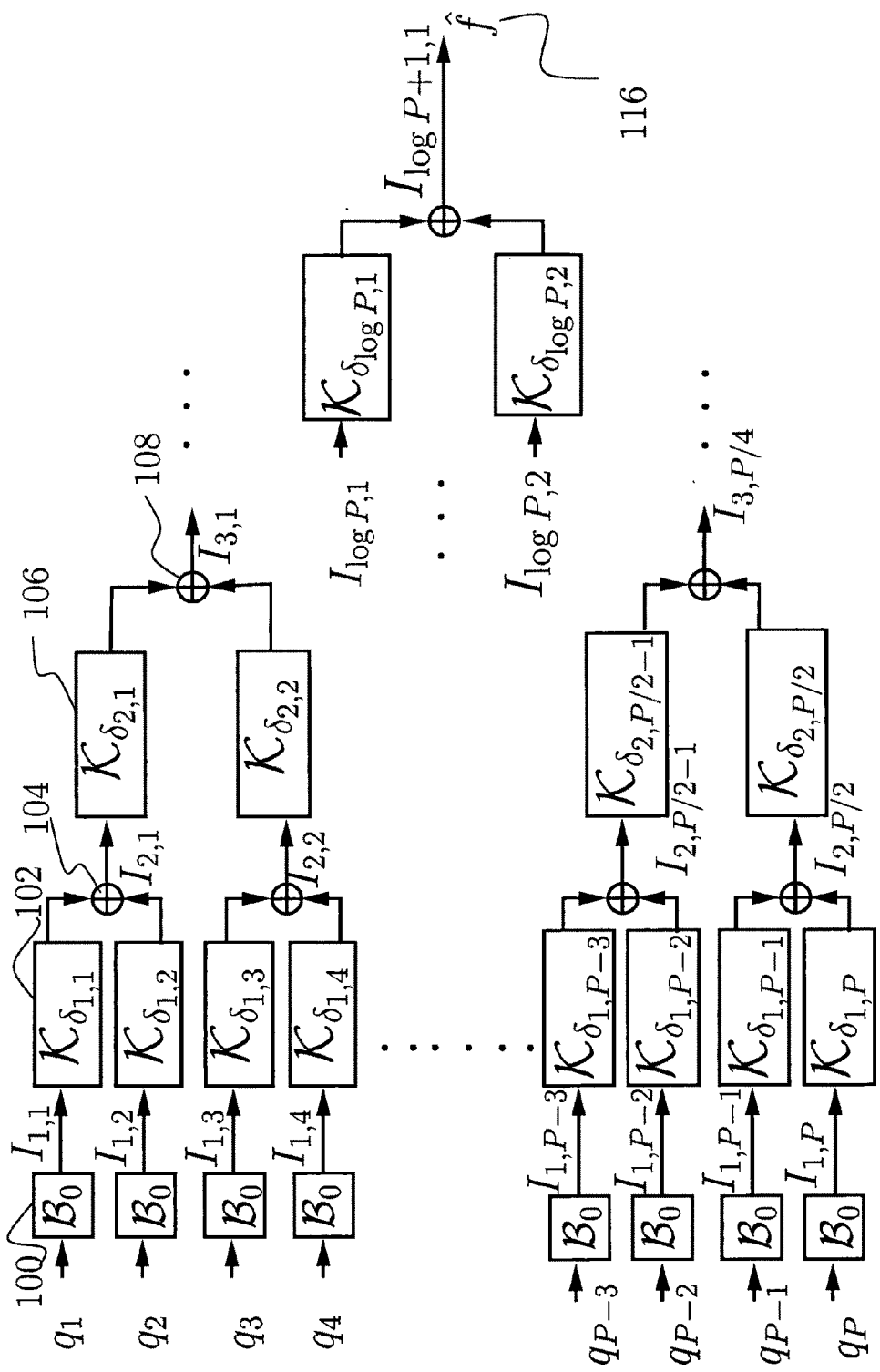
FIG. 5A is a diagram illustrating an algorithm for one embodiment of the present invention.

FIG. 5A illustrates a hierarchical backprojection method for creating a pixel image $\hat{f}$ from a plurality of projections $q_1 \ldots q_P$. Each projection $q_m$ is backprojected at 100 to produce a plurality of intermediate images $I_{1,1} \ldots I_{1,P}$. This is the zeroth or preparatory level of a hierarchical backprojection. Digital image coordinate transformations are performed on selected intermediate images at 102. Subsets of the transformed intermediate images (pairs, here), are aggregated at 104 to produce aggregate intermediate images $I_{2,1}, \ldots I_{2,P/2}$. This is the first level of a hierarchical backprojection. The aggregate intermediate images of the first level serve as new intermediate images input to the next level of hierarchical backprojection. The process of applying digital image coordinate transformations to selected intermediate images at 106, and aggregating selected intermediate images at 108 to produce new intermediate images continues until all intermediate images have been processed and aggregated into the final image $\hat{f}$ at 116.

Figure 5B:
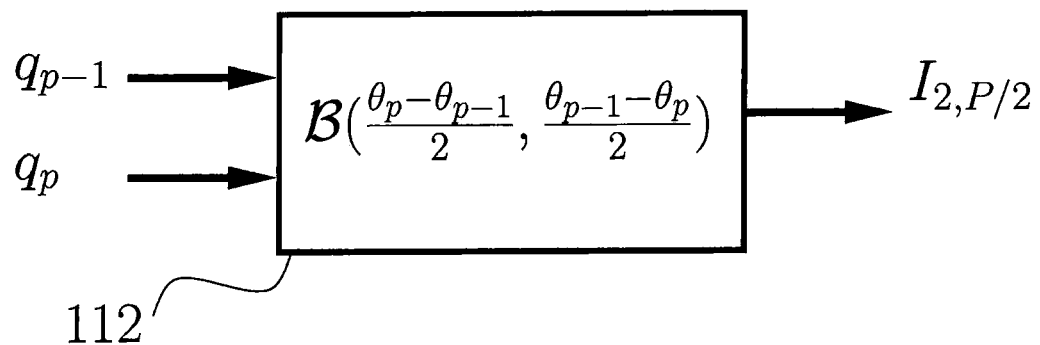
FIG. 5B is a diagram illustrating the manner in which intermediate images are generated in the embodiment of FIG. 5A.

If desired, the operations within and across some of the levels can be combined. For example, the zeroth and first level can be combined for some of the projections, and the corresponding intermediate images from the set $I_{2,1}, \ldots I_{2,P/2}$ produced instead by a backprojection 112 at selected view angles of two or more (exactly two, for the embodiment in FIG. 5A) selected projections $q_p$, as shown in FIG. 5B. Alternatively, some of the initial intermediate images can be produced by an equivalent process involving no explicit backprojection, such as a direct Fourier reconstruction method, as described in F. Natterer and F. Wubbeling, *Mathematical Methods and Image Reconstruction*. Philadelphia: Society for Industrial and Applied Mathematics, 2001.

Figure 6:
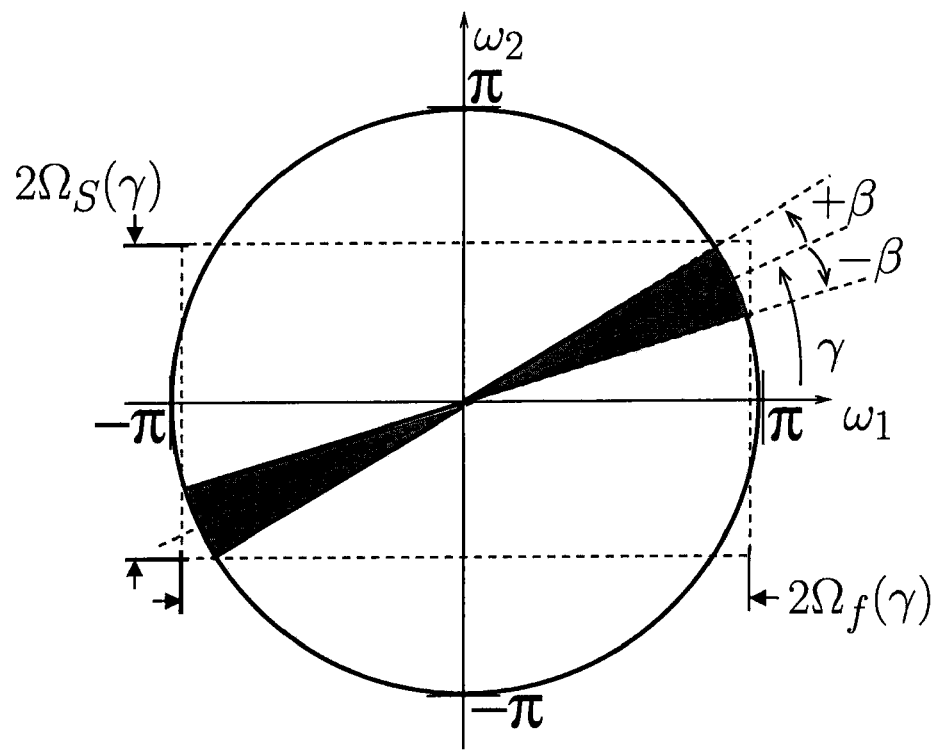
FIG. 6 is a diagram illustrating Fourier characteristics used to produce the intermediate images of FIG. 5A.

The parameters of the various digital image coordinate transformations are chosen to account for the view angles of the constituent projections of the intermediate images, and for the Fourier characteristics of the intermediate images, so that the aggregates of the intermediate images may be accurately represented by sparse samples, as will be explained. These Fourier characteristics focus on the essential spectral support of the intermediate images, i.e. the region in the Fourier (frequency) domain, where the Fourier transform of the intermediate image is significantly different from zero. Sampling theory teaches that the spectral support of a continuous image determines the nature of the sampling patterns that produce digital images that represent the underlying continuous image, and from which the continuous image can be reliably reconstructed. In particular, FIG. 6 shows the typical wedge-shaped spectral support of intermediate image $\tilde{I}_{l,m}$ in the hierarchical algorithm.

Figure 7C:
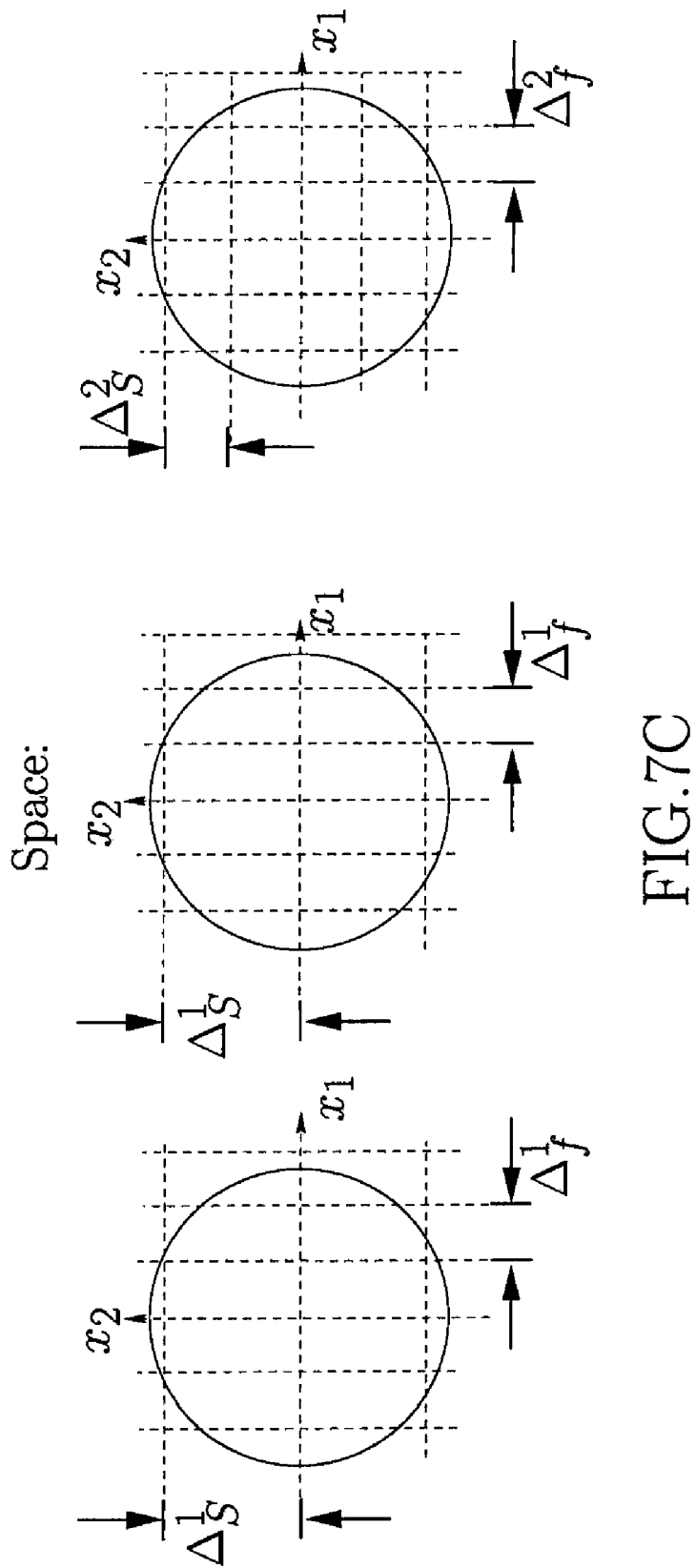
FIG. 7C illustrates the corresponding space-domain sampling pattern when the coordinate transformation is a digital image rotation.

FIGS. 7A and 7B show Fourier supports of intermediate images in the binary hierarchical backprojection algorithm illustrated in FIG. 5A, when the coordinate transformation is chosen to be a digital image rotation. FIG. 7A shows the Fourier-domain support of the virtual intermediate images $\tilde{I}$. A virtual image $\tilde{I}_{l,m}$ is composed of the backprojection of the projections that are included in the corresponding image $I_{l,m}$. FIG. 7B shows that by choosing the parameters of the coordinate transformation to account for the view angles of the constituent projections of the intermediate images, and for the Fourier characteristics of the intermediate images, the vertical bandwidth (the height of the broken-line rectangle) of the intermediate images can be minimized, allowing sparse sampling and reducing computational requirements. FIG. 7C shows the space-domain sampling scheme of $I_{l,m}$, $I_{l-1,2m}$ and $I_{l-1,2m-1}$. The sampling points are at the intersections of the dotted lines in the space domain.

Figure 8:
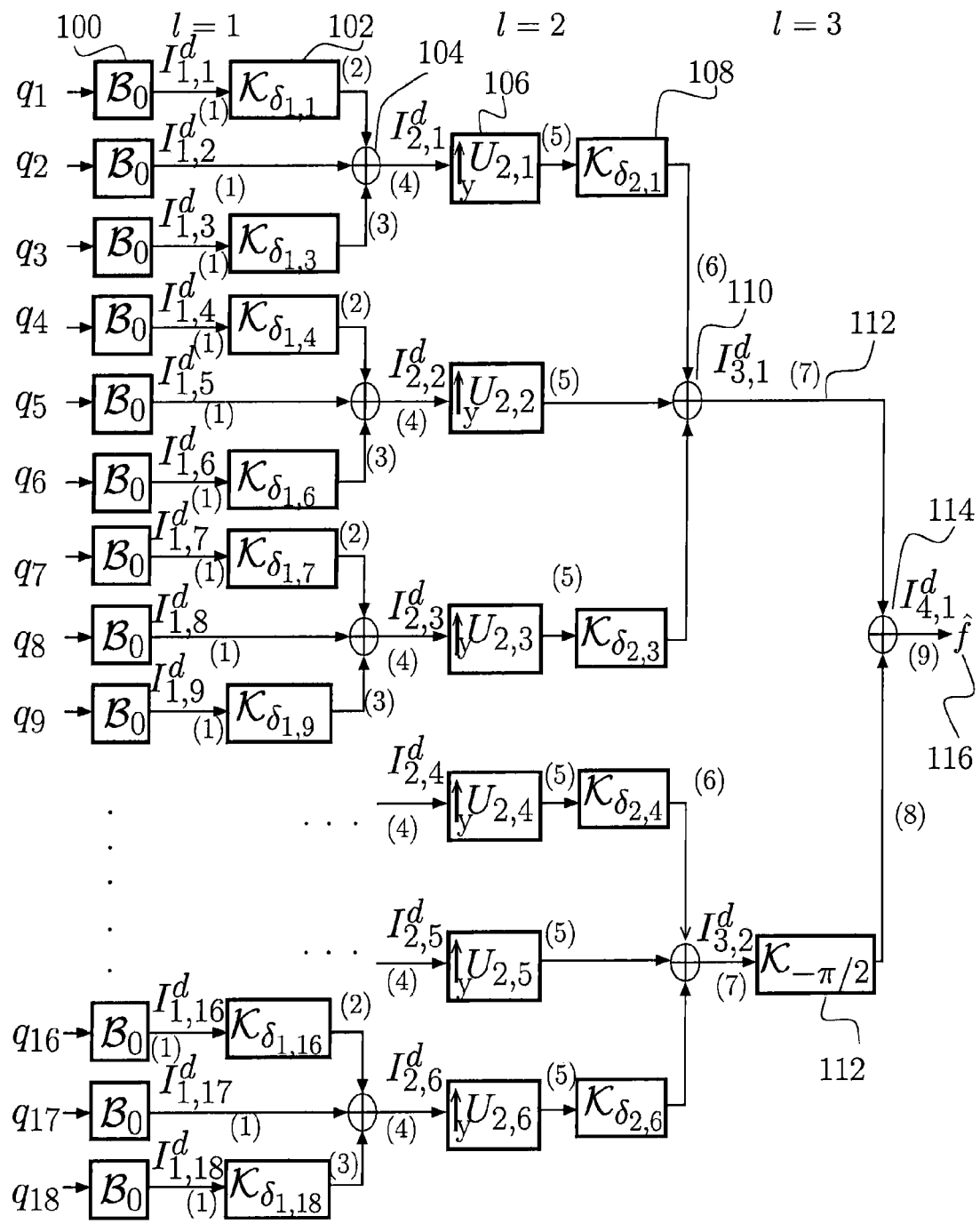
FIG. 8 is a diagram illustrating an algorithm used in another embodiment of the present invention.

FIG. 8 describes another embodiment of the present invention, which performs a ternary aggregation of intermediate images, with $P=2\times3^L$ projections. For concreteness of illustration, the case of $P=18$ projections is shown. As in FIG. 5A, projections $q_{\theta_1}, q_{\theta_2}, \ldots q_{\theta_{18}}$ are backprojected at 100 to produce a plurality of intermediate images $I_{1,1}{}^d \ldots I_{1,18}{}^d$. This is the zeroth level of a hierarchical backprojection.

The projections are grouped in 3's, and selected projections (two of the three in FIG. 8) in each group are subjected to digital image coordinate transformation at 102. Subsets (triplets, in FIG. 8) of the transformed intermediate images $I_l{}^d$, are aggregated at 104 to produce aggregate intermediate images $I_{2,1}{}^d, \ldots I_{2,6}{}^d$. This is the first level of hierarchical backprojection (l=1).

In the second level of hierarchical backprojection (l=2) selected aggregate intermediate images $I_{2,m}{}^d$ undergo a coordinate transformation composed of stretching or upsampling along the y coordinate at 106, and another coordinate transformation $\mathcal{K}_{\bar{s}_{l,m}}$ on selected aggregate intermediate images at 108. Here, also, the transformed intermediate images are aggregated in groups of three at 110 to produce intermediate images $I_{3,1}{}^d$, $I_{3,2}{}^d$. Selected intermediate images from level two are subjected to digital image coordinate transformations at 112 and aggregated at 114 to produce the next level intermediate images $I_{4,1}{}^d$. This process is repeated to the extent necessary to produce the image $\hat{f}$ at 116, depending on the number of projections. The digital image coordinate transformation denoted by $\mathcal{K}$ at the last level 112 is a digital image rotation, and those at the preceding levels 102 and 108 can also be chosen to be digital image rotations. Here too, the parameters of the various digital image coordinate transformation are chosen to account for the view angles of the constituent projections of the intermediate images, and for the Fourier characteristics of the intermediate images, so that the aggregates of the intermediate images may be accurately represented by sparse samples, as will be explained.

Figure 9:
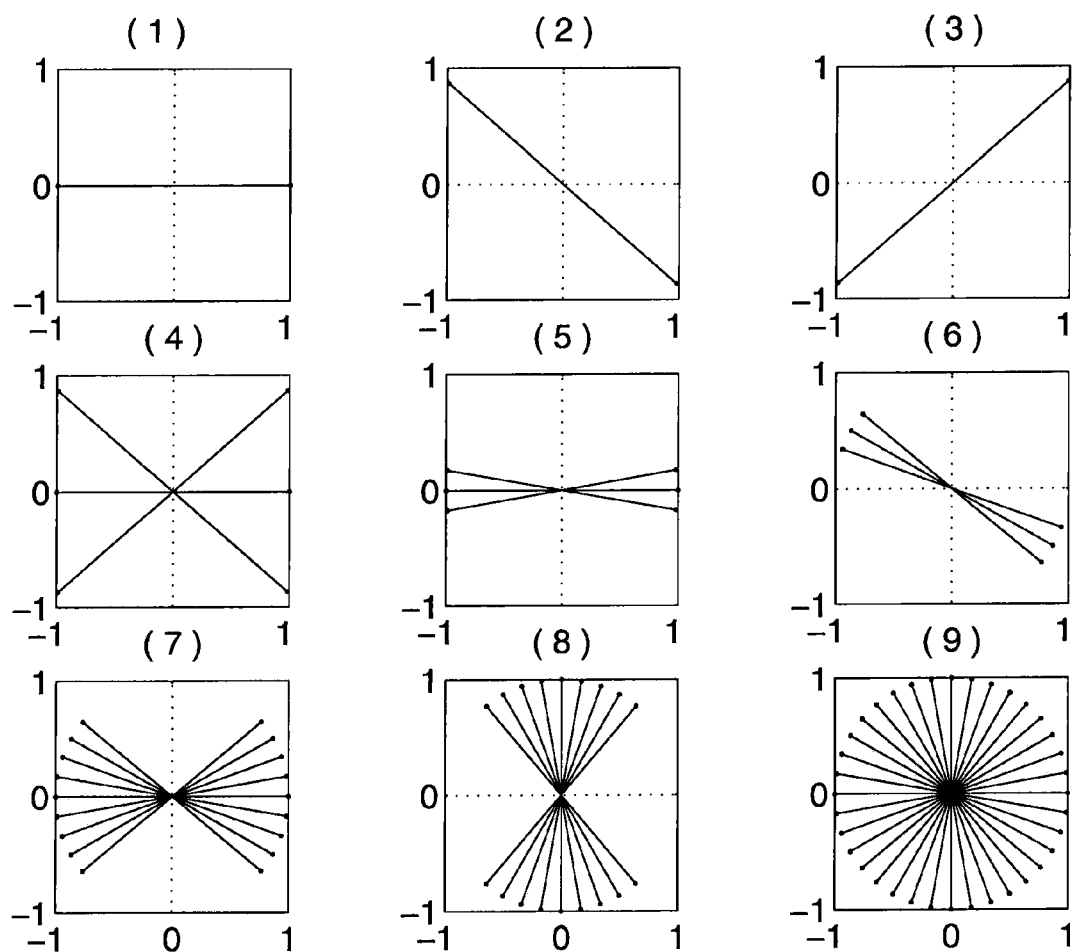
FIG. 9 is a diagram showing the evolution of the spectral support in the algorithm of FIG. 8, the blocks (1 . . . 9) corresponding to the corresponding points in FIG. 8.

FIG. 9 shows the evolution of the spectral support in the ternary backprojection algorithm of FIG. 8. The numbers (1), . . . , (9) correspond to the corresponding points in the block diagram of the algorithm in FIG. 8. The spectra shown are the discrete-time Fourier transforms (DTFTs) of the digital images $I_{l,m}$.

Figure 10A:
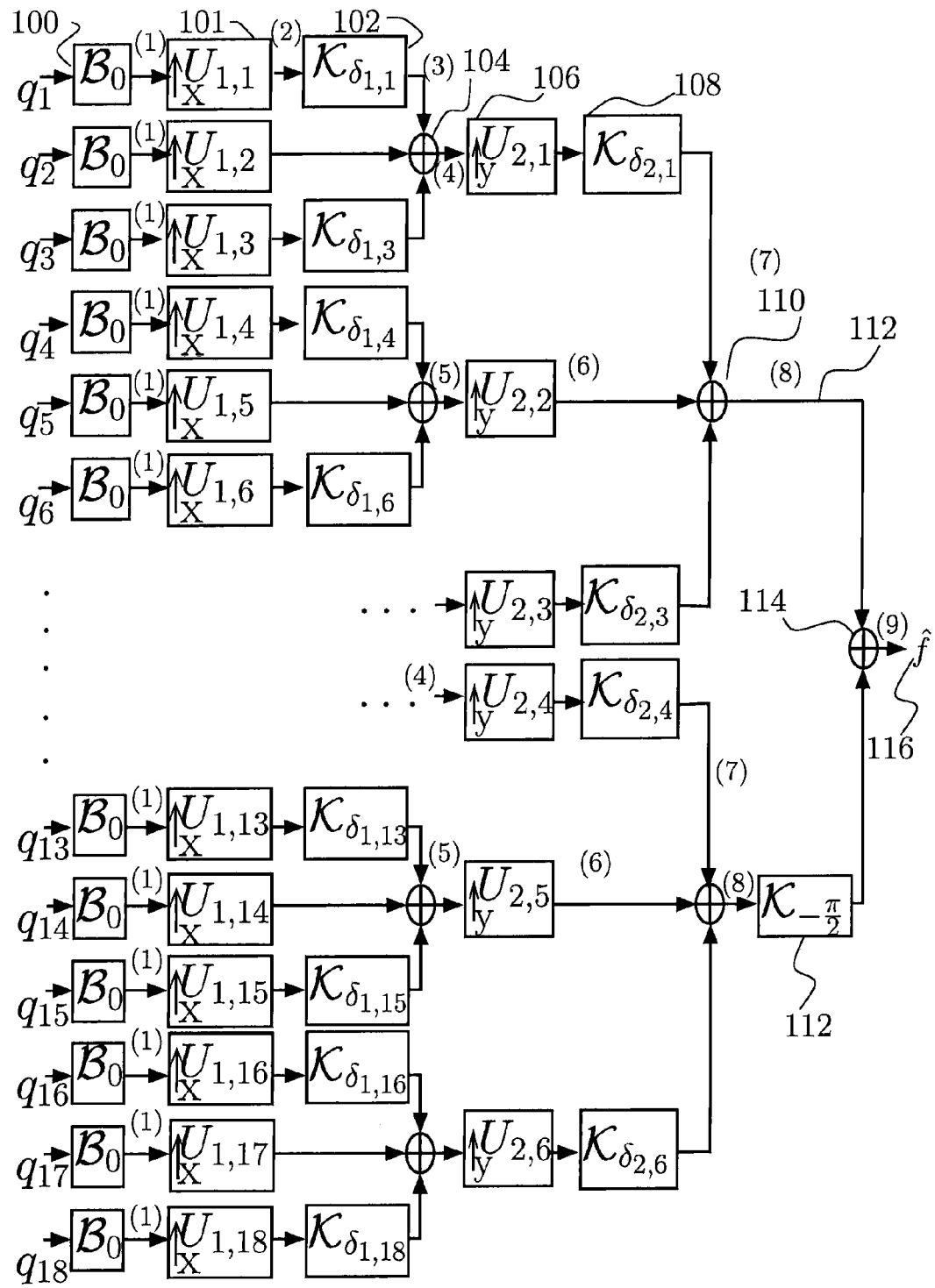
FIG. 10A is a diagram describing an algorithm for embodiment of the present invention.
Figure 10B:
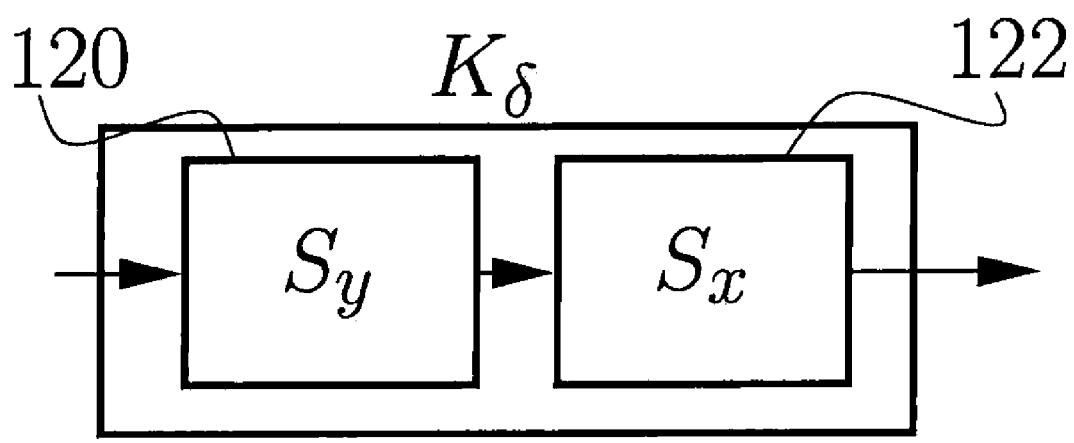
FIG. 10B illustrates the image coordinate transformation used in the embodiment of FIG. 10A.

FIG. 10A describes an algorithm for another embodiment of the present invention, using ternary two-shear-based hierarchical backprojection. The embodiment of FIG. 10A is similar to the embodiment of FIG. 8, and the reference numerals from FIG. 8 are used where appropriate. As in FIG. 8, $P=2\times3^L$ projections, and the case of L=2 is shown. The embodiment of FIG. 10A differs from that described in FIG. 8 in two respects. First, an additional upsampling step along the x coordinate is included at 101 in the first level coordinate transformations. Second, at least some of the digital image coordinate transformations, denoted by $\mathcal{K}$ at 102 and 108, are composed of a sequence of two digital image shear operations, the first (120) along the y coordinate, the second (122) along the x coordinate, as shown in FIG. 10B.

Figure 11A:
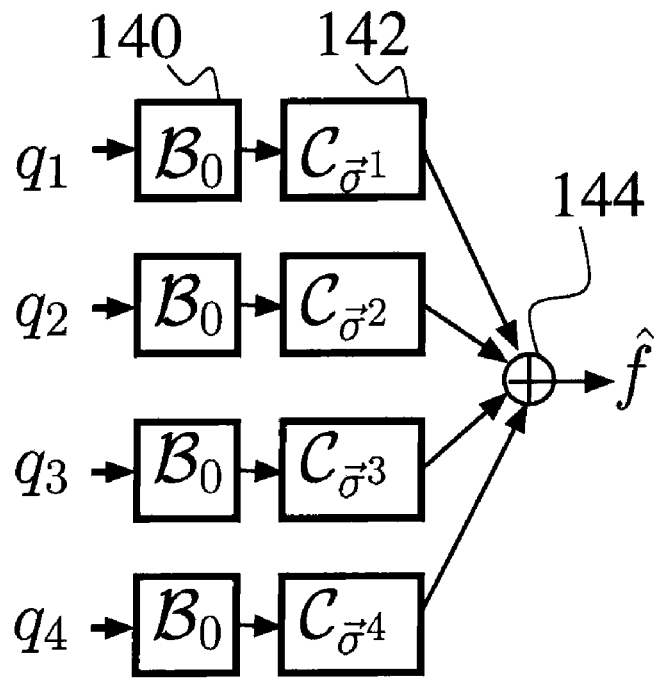
FIG. 11A is a diagram illustrating shear scale backprojection.
Figure 11B:
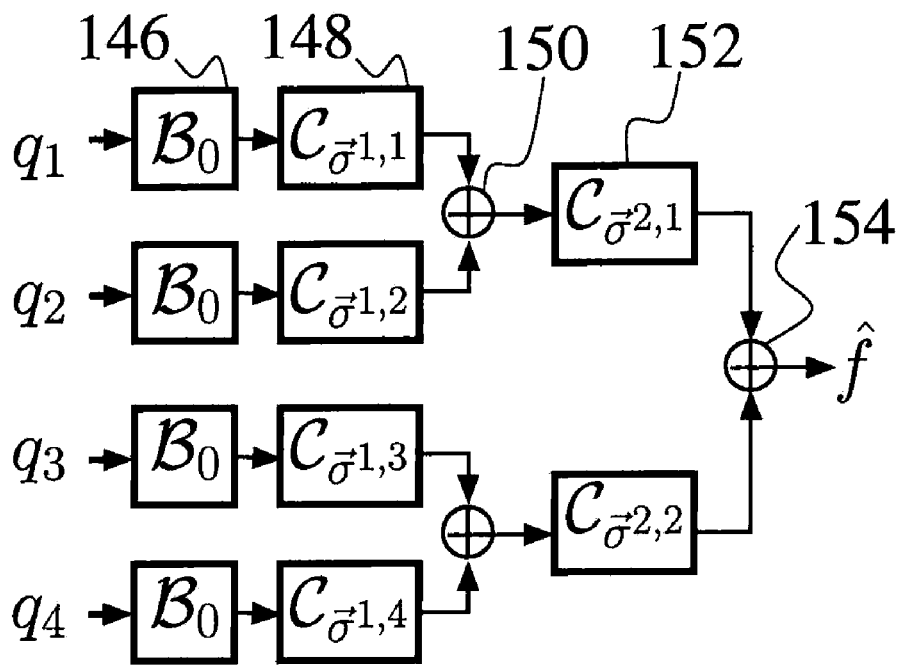
FIG. 11B is a diagram illustrating hierarchical shear scale backprojection.

FIG. 11 illustrates shear-scale backprojection, and FIG. 11B illustrates an equivalent hierarchical shear-scale backprojection. In FIG. 11A, the plurality of projections $q_1, \ldots, q_4$, are backprojected at 140 and subjected to a shear-scale coordinate transformation at 142. The resulting intermediate images are aggregated at 144.

In FIG. 11B, the projections $q_1, \ldots, q_4$ are backprojected at 146, subjected to a shear-scale coordinate transformation at 148, and aggregated in subsets at 150. The intermediate images produced by the aggregation are subjected to a shear-scale transformation again at 152, and the resulting intermediate images are aggregated at 154. This process continues in a recursive manner until all of the projections and intermediate images have been processed and aggregated to form an image $\hat{f}$. Here too, the parameters of the digital shear transformations and sampling of intermediate images are selected to account for the view angles and the Fourier characteristics, so as to reduce the sampling requirements and required computation.

Figure 12A:
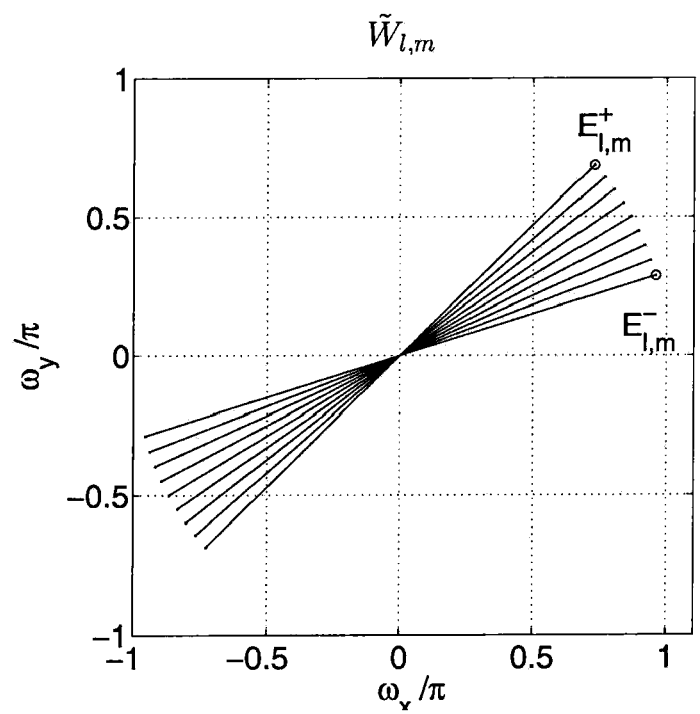
FIGS. 12A and 12B are diagrams showing the effect of image shearing on the spectral support of intermediate images.
Figure 12B:
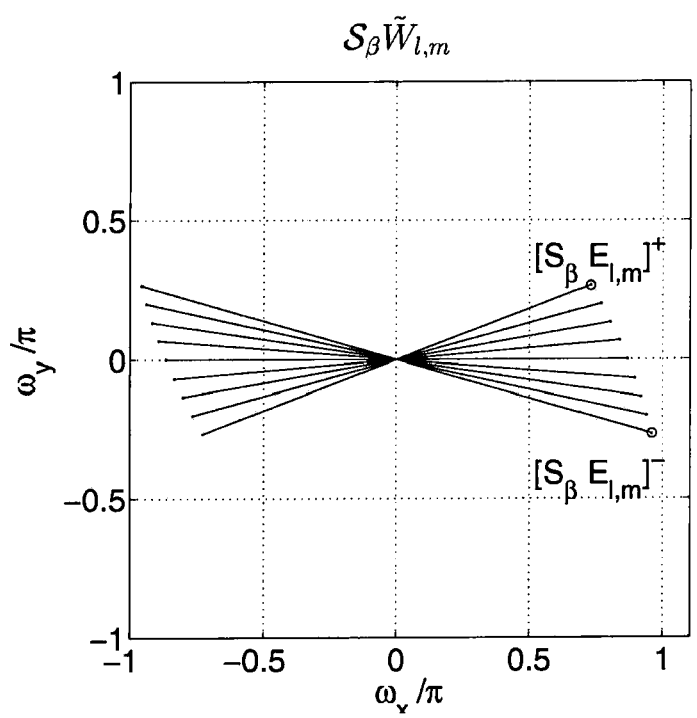

FIG. 12 shows the effect of image shearing on the spectral support of intermediate images. FIG. 12A shows the spectral support of a certain subset of the projections as they should appear in the final image. FIG. 12B shows the spectral support of the intermediate image composed of the same projections, with coordinate transformation parameters chosen to minimize the highest radian frequency in the vertical direction.

Figure 13:
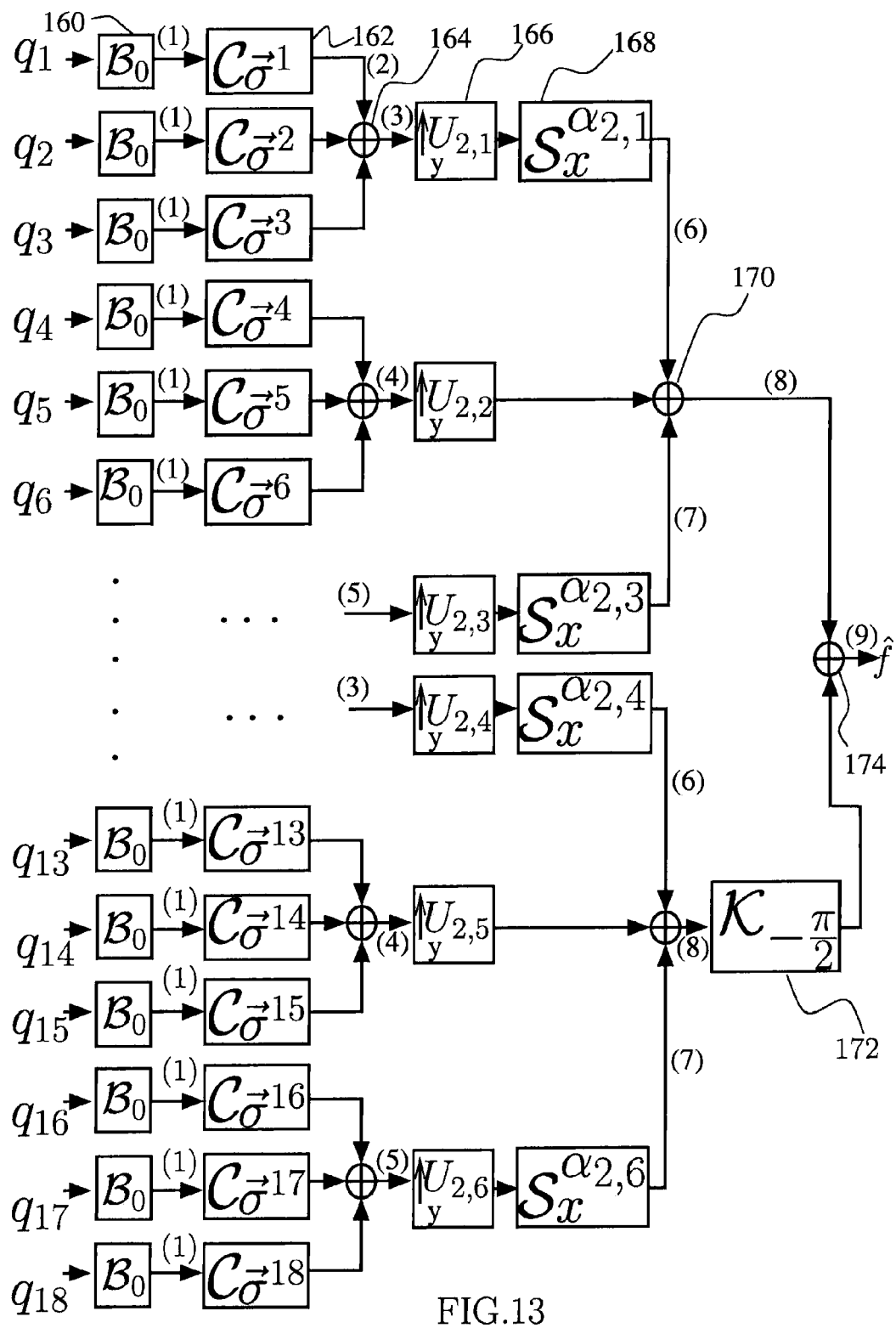
FIG. 13 is a diagram illustrating an algorithm for another embodiment of the present invention.

FIG. 13 illustrates an algorithm for another embodiment of the present invention, a ternary hierarchical shear-scale backprojection. Projections $q_{\theta_1}, \ldots, q_{\theta_I}$ are backprojected at 160 and subjected to a shear-scale digital image coordinate transformation at 162. Subsets of the resulting images are aggregated at 164, and the resulting intermediate images are subjected to up-sampling at 166 and digital shear coordinate transformations at 168. Subsets of those images are aggregated at 170, and selected resulting images are subjected to additional coordinate transformation at 172. This process continues until all of the projections and intermediate images have been processed and aggregated at 174, to produce the image $\hat{f}$. The final coordinate transformation $\mathcal{K}_{-\pi/2}$ shown here at 172, only involves rearrangement of pixels, when the sampling pattern for the pixel image $\hat{f}$ is Cartesian.

FIG. 14 is an algorithm for finding parameters of coordinate transformations for previously described embodiments, using the properties of the Fourier properties of intermediate images shown in FIG. 12.

Figure 15:
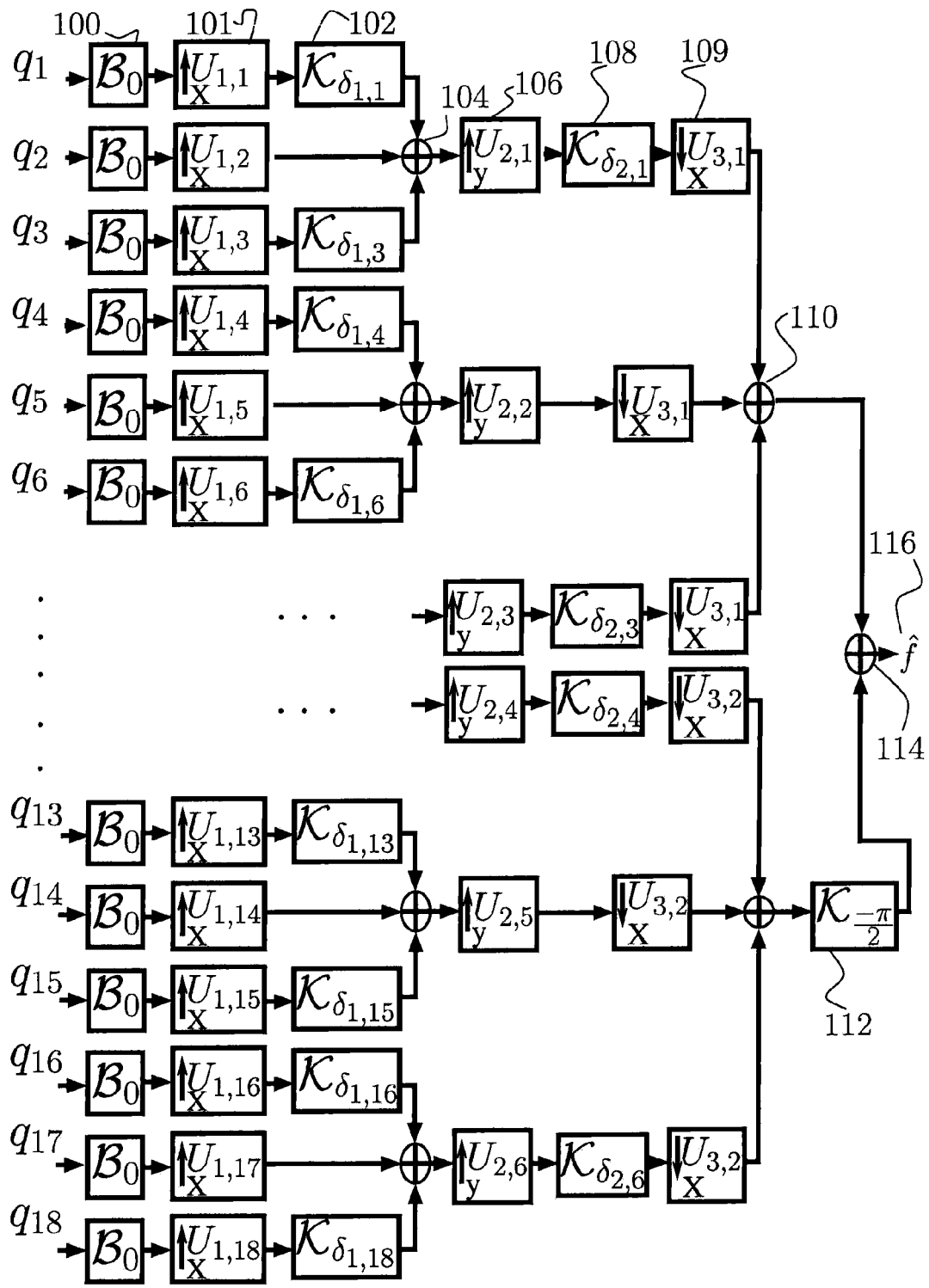
FIG. 15 illustrates an algorithm for another embodiment of the present invention.

FIG. 15 illustrates an algorithm for another embodiment of the present invention, oversampled ternary two-shear hierarchical backprojection. The embodiment of FIG. 15 is similar to the embodiment of FIG. 10A, and the reference numerals from FIG. 10A are used where appropriate. In addition to the steps of FIG. 10A, however, the embodiment of FIG. 15 includes a downsampling step 109 in the one before the last, which is the second level in FIG. 15. Here too, the parameters of the various digital image coordinate transformation are chosen to account for the view angles of the constituent projections of the intermediate images, and for the Fourier characteristics of the intermediate images, so that the aggregates of the intermediate images may be accurately represented by sparse samples. However, certain degrees of oversampling are used to improve the accuracy of subsequent processing, as will be explained. If desired, for improved computational efficiency the downsampling step 109 can be combined with the second, x-coordinate shear comprising the two-shear digital image coordinate transformation 108 (shown in FIG. 10B) producing a shear-scale transformation.

Figure 16:
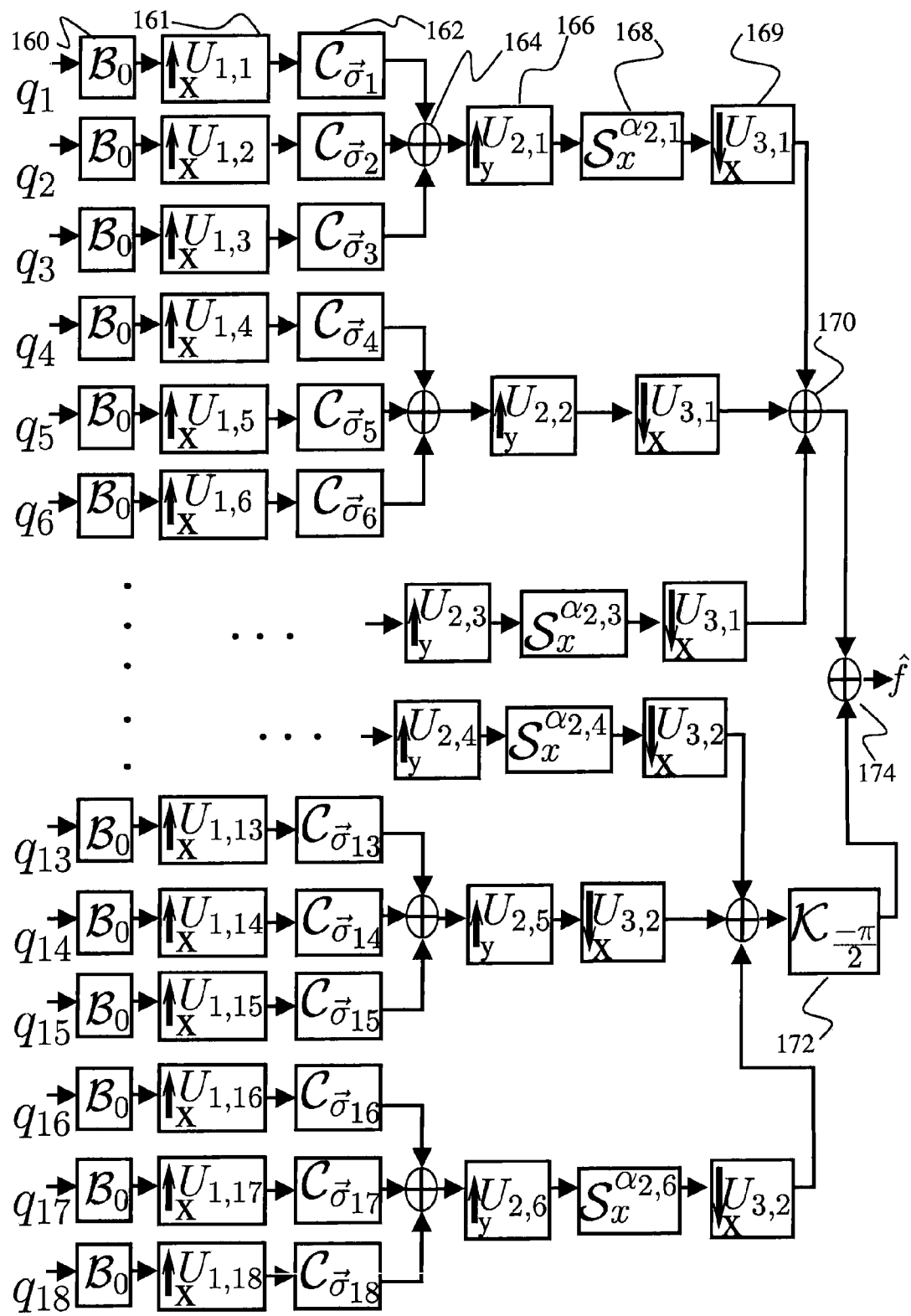
FIG. 16 illustrates an algorithm for still another embodiment of the present invention.

FIG. 16 illustrates an algorithm for another embodiment of the present invention, oversampled ternary hierarchical shear-scale backprojection. The embodiment of FIG. 16 is similar to the embodiment of FIG. 13, and reference numerals from FIG. 13 are used where appropriate. However, FIG. 16 includes additional steps of upsampling 161 in the intermediate levels, and downsampling 169 in the level before the last level, in which the intermediate images are upsampled and downsampled, respectively. Similarly to the embodiment of FIG. 15, in the embodiment of FIG. 16 when downsampling step 169 along the x coordinate $\downarrow_x U_{l,m}$ follows an x-shear step 168 $\mathcal{S}_x^{\alpha_{l,m}}$, the two can be combined for computational efficiency into a single digital image shear-scale.

Non-Cartesian Sampling Schemes for Fast Hierarchical Backprojection Algorithms

The intermediate images in the different embodiments of hierarchical backprojection illustrated in FIGS. 8, 10A, and 13 have a peculiar spectral support amenable to efficient non-cartesian sampling. In particular, the underlying continuous domain image $I_{l,m}$ in the $l^{th}$ level occupies a wedge in Fourier space, as seen for example in FIGS. 6, 7, 9, and 12. Multi-dimensional sampling theory tells us that for images with a spectral support such as this, sampling on a cartesian grid is less efficient than sampling on an appropriate non-cartesian grid. Non-cartesian sampling can improve sampling efficiency by packing the copies of the baseband spectrum more tightly in the Fourier plane. In particular, a quincunx sampling scheme reduces the sizes of intermediate images, and therefore the computational costs of the algorithm, by a factor of almost 2. Digital image coordinate transformation on periodic non-Cartesian sampling patterns can be executed efficiently using one dimensional shift-invariant filters. Likewise, all the methods previously described for selection of the parameters of digital image transformations apply as well in the case of such sampling patterns. Therefore, all the embodiments previously describe extend to embodiments that use periodic non-Cartesian sampling patterns.

Variants of the embodiments of the present invention already described are applicable to 3D backprojection of a variety of forms of 3D projections, including the X-ray transform that arises for example in Positron Emission Tomography, and the 3D Radon transform, which arises in magnetic resonance imaging.

The three-dimensional (3D) X-ray transform is a collection of integrals along sets of parallel lines, at various orientations, in 3D. Each 3D X-ray projection is a two-dimensional function that can be characterized by the 3D angle at which the lines are oriented. The block-diagram for hierarchical backprojection for 3D X-ray data is similar to the ones previously described, such as FIG. 8, 10A, 13, 15 or 16. The intermediate images in this case are three-dimensional, not two-dimensional as in the previously described examples. Each intermediate image is sampled on a 3D sampling pattern that is sparsest in a direction that is an average of the 3D angles of the constituent projections. As the algorithm progresses the density of samples along this sparse-sampling (slow) direction increases to accommodate the increasing bandwidth in that direction as explained by the Fourier analysis of 3D X-ray projections. Consequently at every stage in the algorithm, before the images are aggregated, each has to be upsampled along this slow direction. The extra dimension available in the 3D embodiment also provides more coordinate transformations available for use in the various steps in the algorithm, such as rotations in 3D. As in the 2D case, the parameters of these digital image coordinate transformations can be chosen to account for the constituent view angles and for the Fourier characteristics of the intermediate images. These digital image coordinate transformations can be decomposed into a sequence of one-dimensional operations, such as shears and shear-scales, as previously described. As in the 2D case, oversampling in any subset of the 3 dimensions may be enforced to improve image quality.

A 3D radon transform projection is a one-dimensional function—a collection of integrals along sets of parallel 2D planes, parameterized by the displacement of the plane from the origin. The view-angle of the projection is that of the 3D orientation angle of a vector perpendicular to the set of planes. The block-diagram of the hierarchical backprojection of 3D radon projections is as in FIG. 8, 10A, 13, 15 or 16. In the first level the projections are Radon backprojected onto the 3D image domain. These images are constant along two dimensions, and therefore need be sampled only on the direction perpendicular to the two constant directions. When groups of 3D radon projections are combined, the bandwidth of the aggregate image may increase in one or two dimensions, depending on the view-angles of these constituent projections. It is therefore necessary to upsample the intermediate image, possibly in two dimensions, before coordinate transforming it and adding to other intermediate images. As in the 2D case, the coordinate transformations may be performed separately, may be combined with the upsampling operation, and oversampling may be enforced on the intermediate images.

In the various embodiments of the present invention, digital image coordinate transformations and downsampling or upsampling operations may be performed by a sequence of lower (one) dimensional linear digital filtering operations. Furthermore, when the sampling patterns used have some periodicity, these digital filters can be shift invariant, as will be described in more detail. For computation efficiency, the digital filters can be implemented using recursive filter structures, or using an FFT, as is known. One way to determine preferred values for the digital filters is using the theory of spline interpolation, as explained in M. Unser, A. Aldroubi, and M. Eden, *Fast B-spline transforms for continuous image representation and interpolation*, IEEE Transactions on Pattern Analysis and Machine Intelligence, Vol. 13, pp. 277-285, 1991; M. Unser, A. Aldroubi, and M. Eden, *B-spline signal processing: Part I-theory*, IEEE Transactions Signal Processing, Vol. 41, pp. 821-832, 1993; and M. Unser, A. Aldroubi, and M. Eden, *B-spline signal processing: Part II—efficient design and applications*, IEEE Transactions Signal Processing, Vol. 41, pp. 834-848, 1993.

Figure 17:
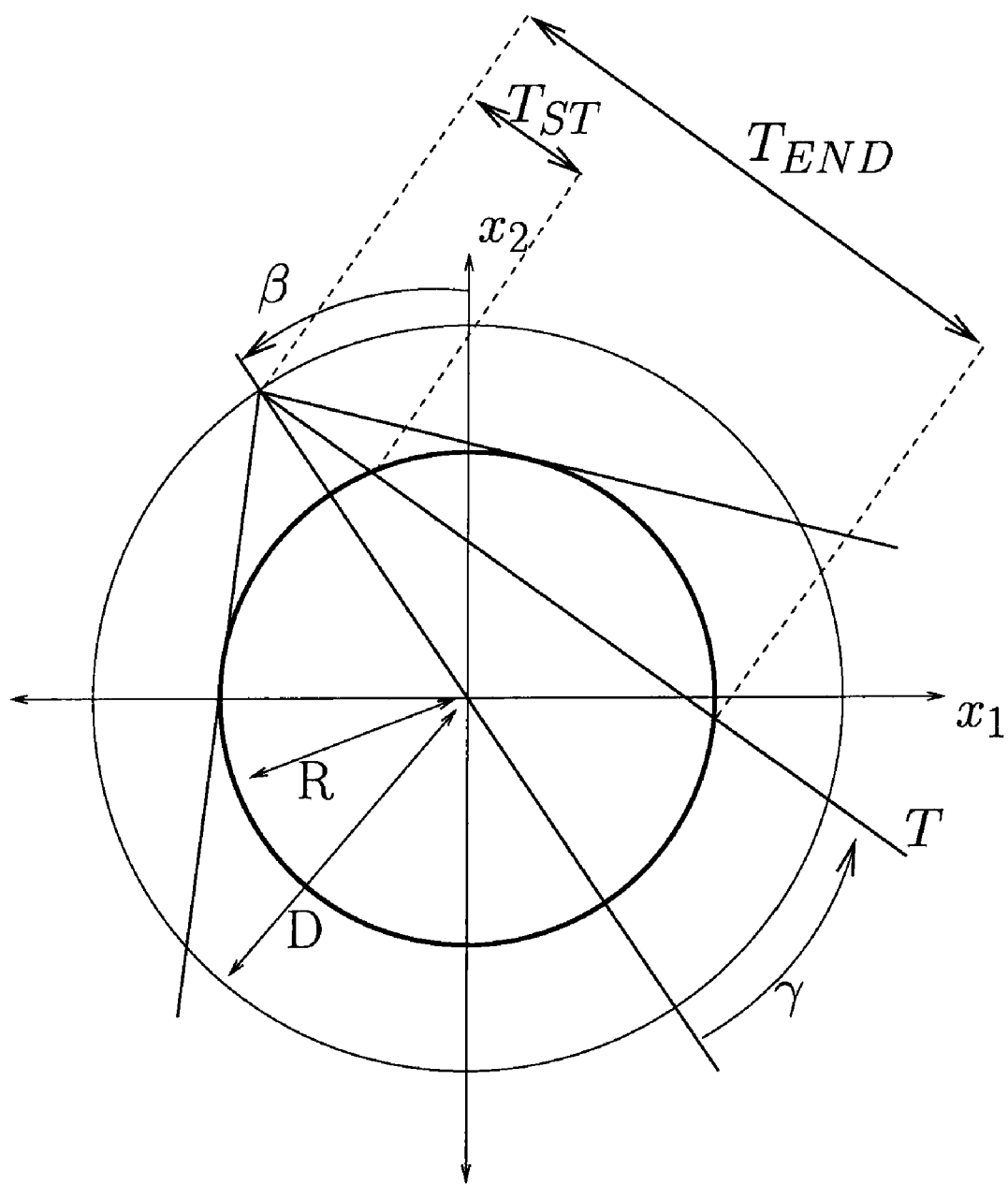
FIG. 17 is a diagram which illustrates common fan beam geometry with a circular scanning trajectory.

The hierarchical backprojection methods of the present invention are applicable to a wide range of tomographic imaging geometries, such as divergent beam geometries, including fan-beam and cone-beam, with arbitrary source trajectories. The common fan-beam geometry with a circular scanning trajectory is depicted in FIG. 17. The ray source moves on a circular trajectory of radius D around an image of radius R. A fan-beam projection at source angle $\beta$ corresponds to line integral measurements along a set of rays parametrized by fan angle $\gamma$. $T_{ST}$ is the distance along the ray of the source to the closest edge of the image-disc and $T_{END}$ is the distance of the source to the farthest edge of the disc.

Figure 18:
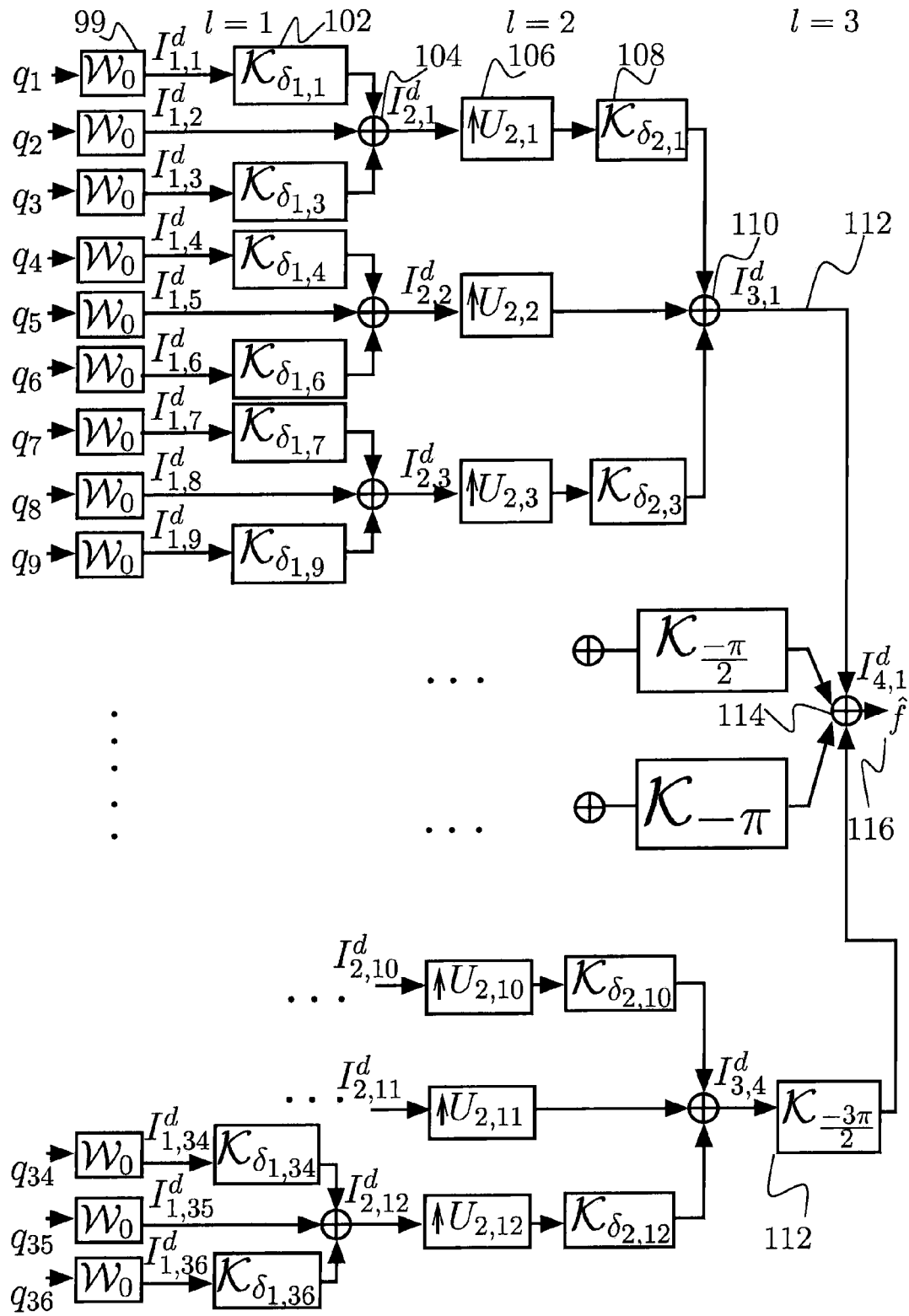
FIG. 18 illustrates an algorithm for another embodiment of the present invention.

FIG. 18 illustrates an algorithm for an embodiment of the present invention, hierarchical ternary rotation-based backprojection, applicable to fanbeam weighted backprojection. The embodiment of FIG. 18 is similar to the embodiment of FIG. 8, and the reference numerals from FIG. 8 are used where appropriate. The embodiment of FIG. 18 differs from that described in FIG. 8 in several respects. First, $P=4\times 3^L$ projections, and the case of L=2 is shown. Second, at the zeroth level, the initial intermediate images $I_{l,m}^d$ are produced from the fanbeam projections by weighted backprojection at 99, denoted here by $\mathcal{W}$. Third, at the last stage, four rather than two intermediate images are aggregated. Fourth, the sampling patterns used in most of the early levels of the hierarchy are preferably chosen to be non-Cartesian, as will be explained. Here too, the last digital image coordinate transformations only require reordering of image pixels, if a Cartesian sampling pattern is used for the intermediate images in the one-before-last level. Also, as in FIG. 5B, the operations in the zeroth and first level of the hierarchy can be combined, so that the intermediate images are produced by a direct weighted fanbeam backprojection of their three constituent projections, or by other means.

In a selected number of levels, it is beneficial to modify the embodiment of FIG. 18, by including additional weighting steps before and after the cascade of upsampling step and digital image rotation (steps 106 and 108 in FIG. 18), as shown in FIG. 19. The intermediate image $I_{2,m}$ is weighted by spatially varying weights at 180 and 182, respectively before and after steps 106 and 108. As will be explained, this weighting can be used to reduce the sampling requirements of the intermediate images, and thus reduce the computation.

The sampling scheme of the intermediate images affects the performance of the algorithm. The desired sampling scheme is one that uses the fewest samples without losing image information. Here too, the parameters of the various digital image coordinate transformations and resampling operations can be chosen to account for the view angles of the constituent projections of the intermediate images, and for the Fourier characteristics of the intermediate images, so that the aggregates of the intermediate images may be accurately represented by sparse samples, as will be explained. An alternative method for choosing these parameters is based on intersection of particular sets of rays or curves, as will be described.

FIGS. 20A-20C illustrate the progression of intermediate images through the levels of the ternary hierarchical algorithm described in FIG. 18, for the case of source angles uniformly spaced at intervals $\Delta_\beta$. The fans of the projections that make up intermediate images in the algorithms are shown. At the zeroth level, each intermediate image $I_{l,m}^d$ is made up of a single projection with fan oriented at $\beta=0$, shown in FIG. 20A. After the first level of the recursion, each intermediate image is made up of three projections, with fans as shown in FIG. 20B After the second level, each image is made up of nine backprojected fans, as shown in FIG. 20C.

The intersection-based method for choosing coordinate transformations and sampling/resampling patterns in the algorithm is illustrated in FIGS. 21A and 21B, for intermediate image $I_{3,m}$, with constituent fans as shown in FIG. 20C. The sampling pattern for $I_{3,m}$ is made up of points that lie on the central constituent fan, which coincides with the one shown in FIG. 20A. As shown in FIGS. 21A and 21B, the sampling points for $I_{3,m}$ are determined by the intersection of half of the central fan with the extremal constituent fans on the respective side of the central fan.

Figure 22:
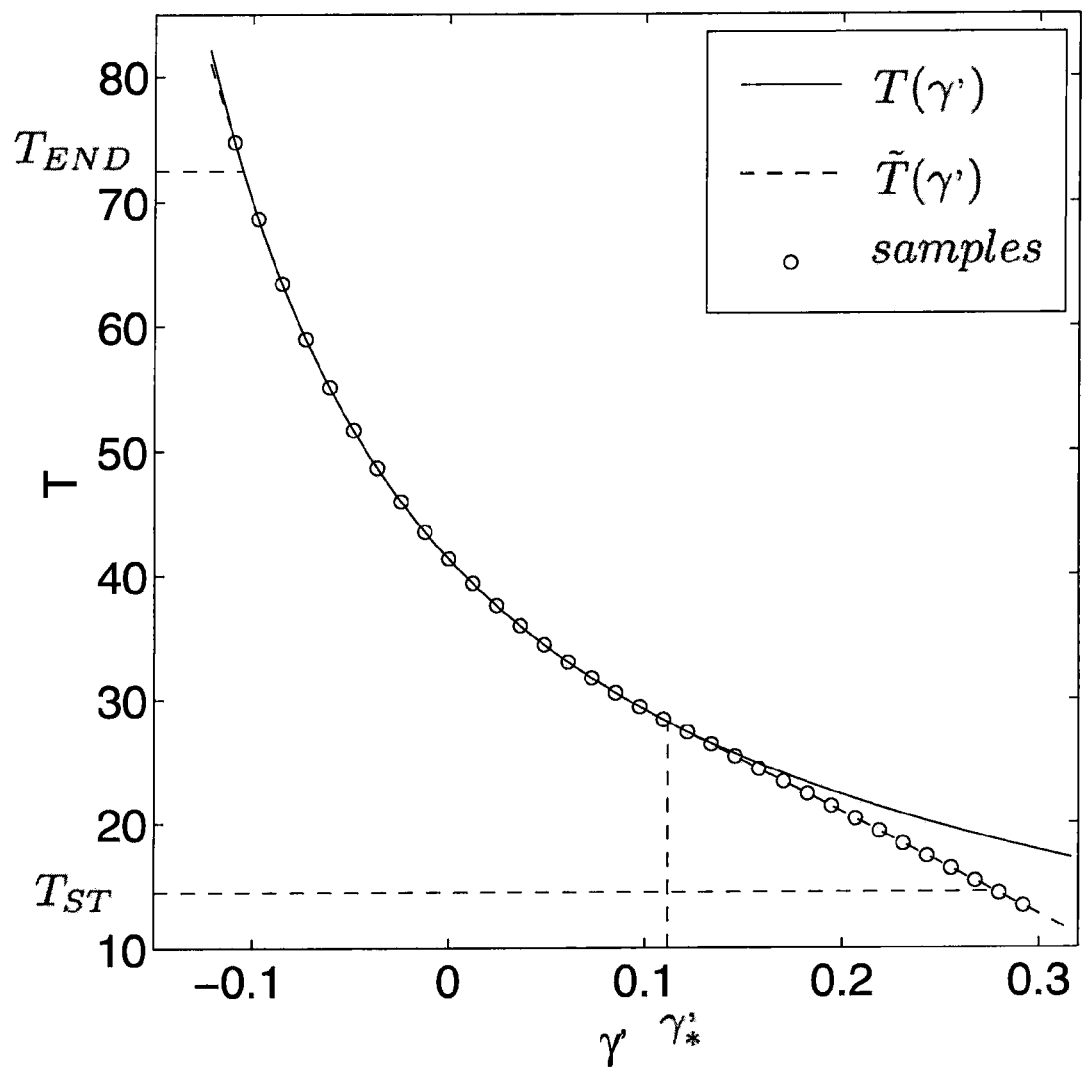
FIG. 22 is a diagram showing original intersection points obtained using the method illustrated in FIGS. 21A-21C.
Figure 23A:
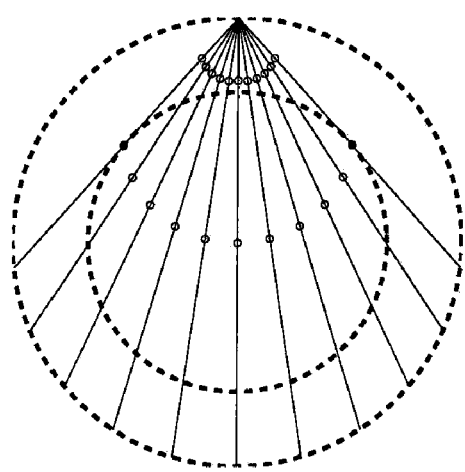
FIGS. 23A, 23B, 23C and 23D illustrate sampling points used for rotation and up-sampling used in FIG. 18.
Figure 23B:
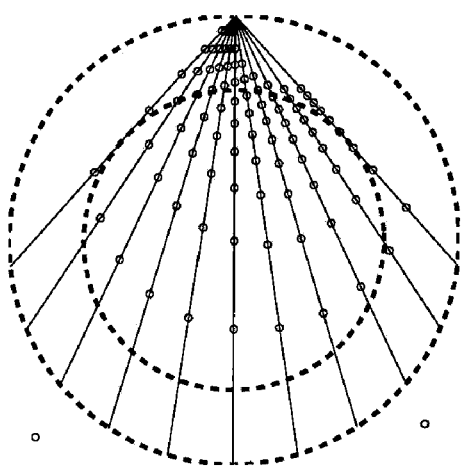
Figure 23C:
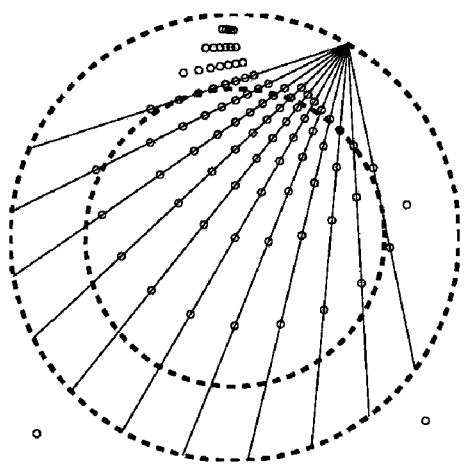
Figure 23D:
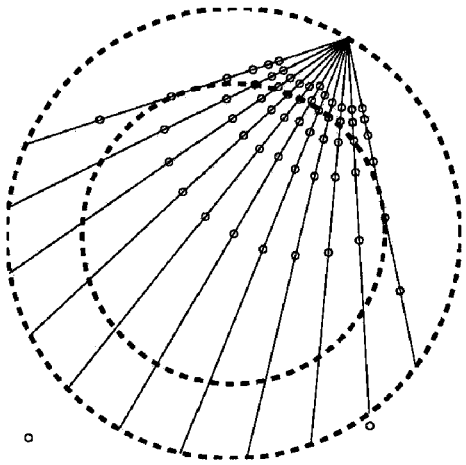

It is advantageous to modify the resulting sampling pattern by applying two constraints, to improve the accuracy of the backprojection, and reduce the computation requirements. First, the density of samples along the rays is limited not to exceed the desired sampling density of the final image. Second, the sampling pattern is forced to contain on each ray at least one sample on the outside of the image disk on each side. The plots in FIG. 22 displays the position of sampling points along a particular ray of the central fan at fan angle $\gamma_r$. The sampling points lie at constant intervals in $\gamma'$, where $\gamma'$ is the fan angle of one of the extramal fans shown in FIGS. 21A, 21B, and 21C. The points that fall on the continuous curve in FIG. 22 are original intersection points obtained using the method illustrated in FIGS. 21A and 21B. The points on the broken curve are those modified using the above two constraints. FIGS. 23A and 23D show an example of a sampling pattern obtained using this modified intersection method. The fan shown is the central fan of the intermediate image for which this sampling pattern has been produced.

As in the case of the previously described embodiment of the present invention, it is advantageous to decompose the resampling and digital image rotations operations into a sequence of one dimensional operations. The blocks marked ↑ U in FIG. 18 represent the upsampling of the intermediate image sampled on a central fan onto a finer set of sampling points on the same fan. This can be achieved by separate upsampling along each ray of the fan. For the cascade of upsampling and rotation marked by ↑ U and $\mathcal{K}$ in FIG. 18, it is convenient to do the decomposition into ID operation jointly, as illustrated in FIGS. 23A-23D. In each of the four panels, the two dashed circles represent the boundary of the image of radius D and the source trajectory on the (larger) circle of radius R. The sampling points are represented by small circles. The digital intermediate image with central fan (Fan$_a$) and the sampling pattern shown in FIG. 23A is to be resampled and rotated to the angle of the central fan (Fan$_d$) shown in FIG. 23D, with the final sampling pattern shown in FIG. 23D. This is accomplished in the following two steps:

(i) Upsample the image, separately along each ray of Fan$_a$, to the sampling pattern shown in 23B, which is defined by the intersection of Fan$_a$ with Fan$_d$. These points will therefore lie on Fan$_d$, as shown in FIG. 23C;

(ii) Upsample the image separately along each ray of Fan$_d$, to the sampling pattern shown in FIG. 23D.

These steps accomplish the combined operations of resampling and rotation, using ID upsampling operations.

Figure 24:
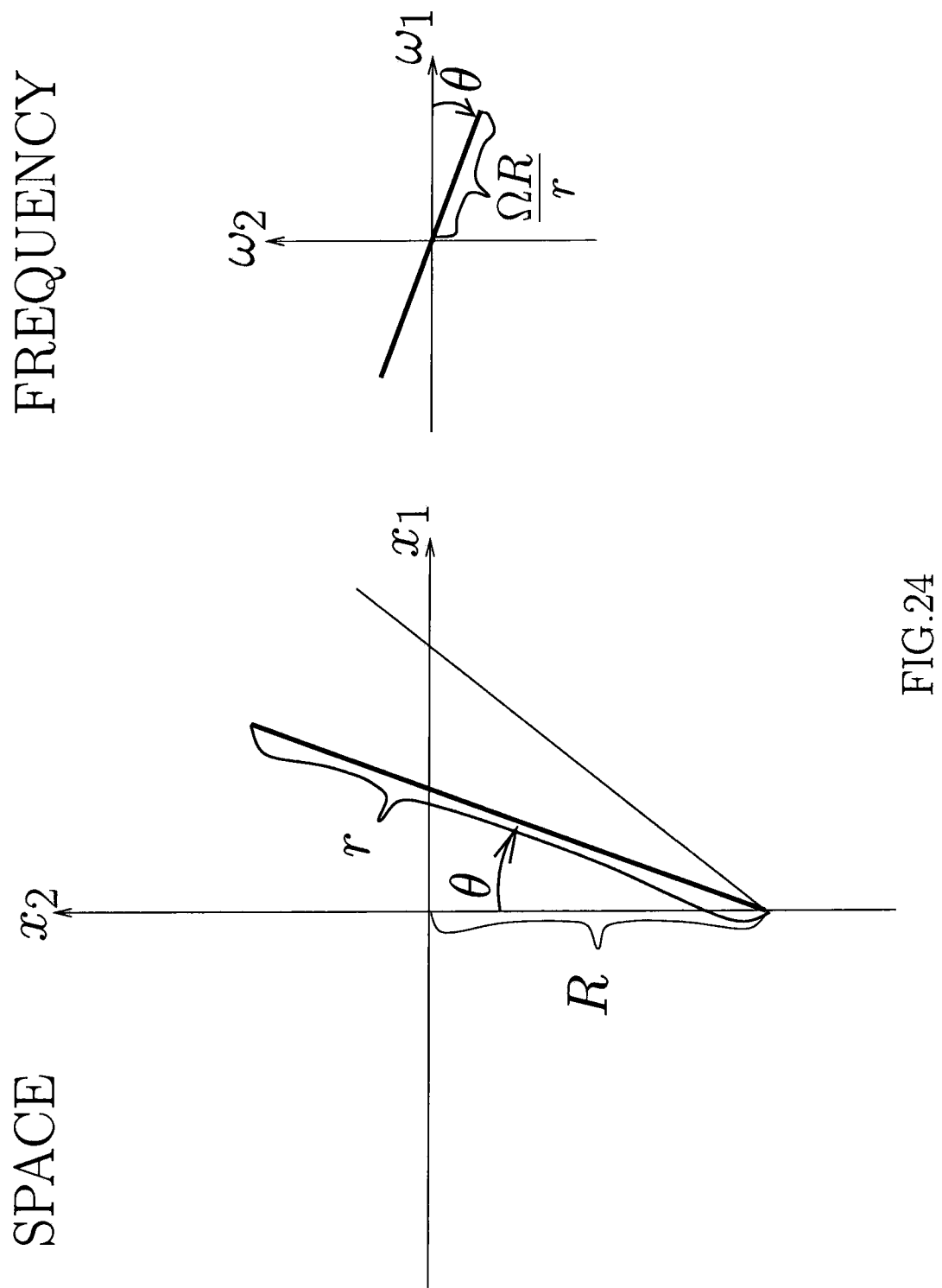
FIG. 24 and FIG. 25 illustrate local spectral support at a point of an intermediate image generated by the algorithm of FIG. 18.
Figure 25:
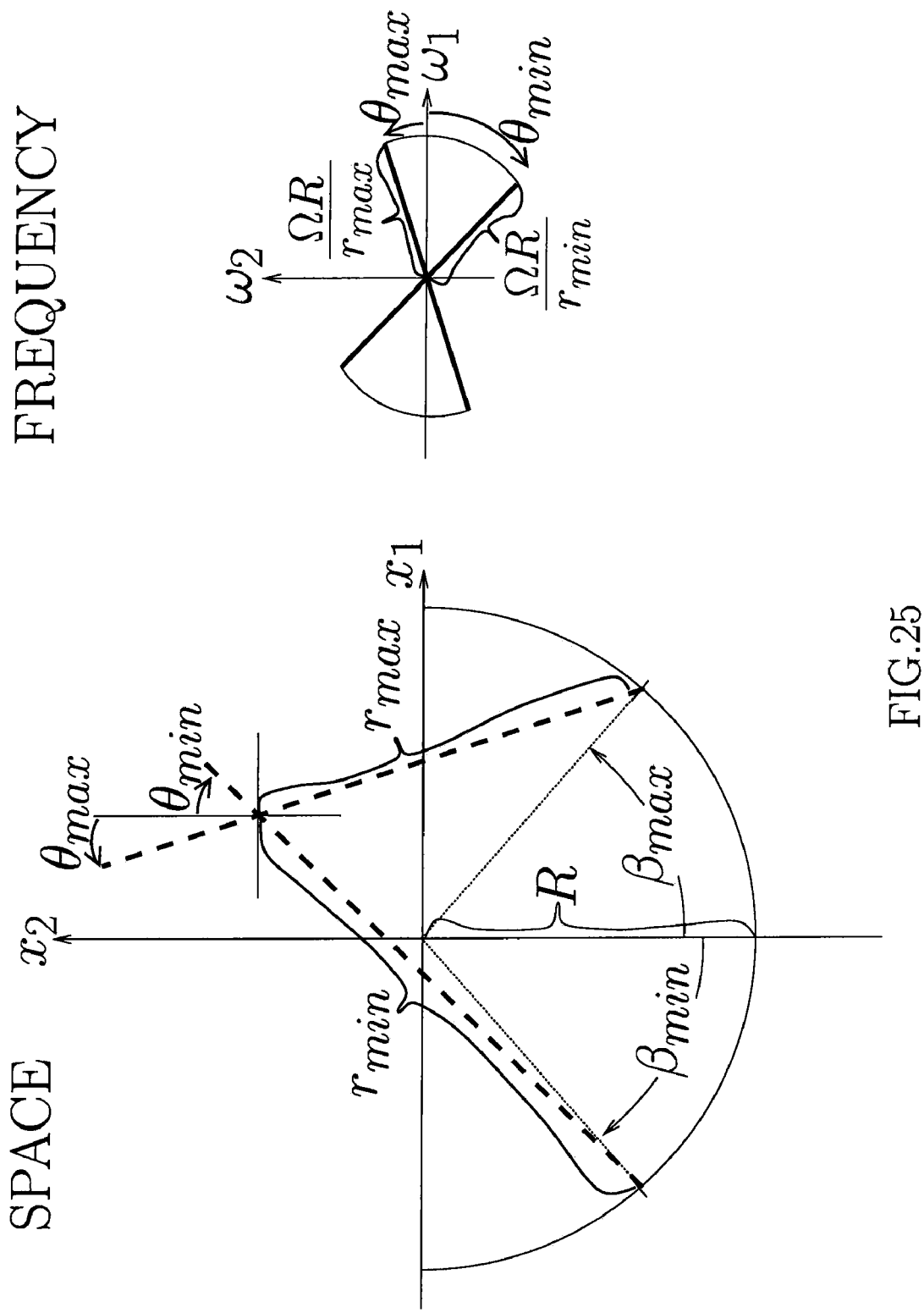

The Fourier-analysis techniques described for the embodiments of the present invention in the case of intermediate images sampled on periodic sampling patterns are extended to devise spatially varying sampling schemes in the divergent beam case. These techniques are general enough to be applied to projections and back-projections on arbitrary trajectories, in both two and three dimensions. For the case of backprojection on non-periodic systems of lines or curves, the concept of local spectral support replaces that of spectral support. This is illustrated in FIG. 24 for an intermediate image produced by the backprojection of a single fan shown on the left side of FIG. 24. As will be explained, the local spectral support of this continuous intermediate image at the indicated point parametrized by r and θ is the line segment in the Fourier domain shown on the right in FIG. 24B. The local spectral support at a point of an intermediate image composed of the backprojection of multiple fanbeam projections is shown in FIG. 25. On the left, the position of the point is indicated, as well as the range of view angles of the constituent projections for the intermediate image. The bow-tie shaped region on the right is the corresponding local spectral support.

This analysis of the local spectral support is used to determine local sampling requirements for the intermediate image. The resulting spatially nonuniform sampling patterns are indicated by the dotted arcs in FIGS. 26A and 26B for two typical intermediate fan-backprojected images. The image boundary is indicated by the circle in broken line, and only few points need be taken outside this boundary. This local Fourier sampling method may be applied directly to find sampling schemes for arbitrary projection geometries over lines, curves or planes over arbitrary dimensions.

Figure 27A:
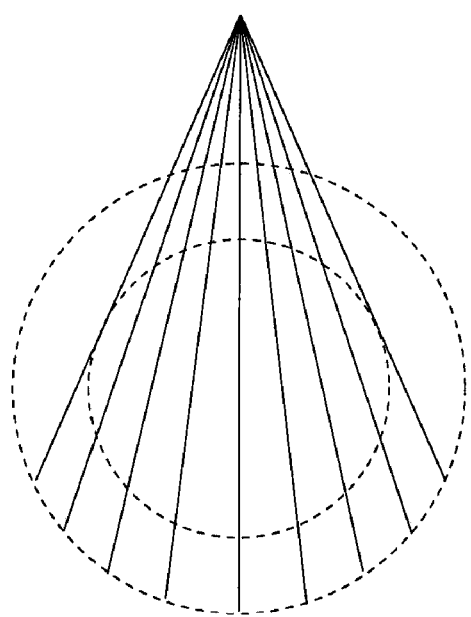
FIGS. 27A and 27B illustrate alternative sampling schemes which can be used in the present invention.
Figure 27B:
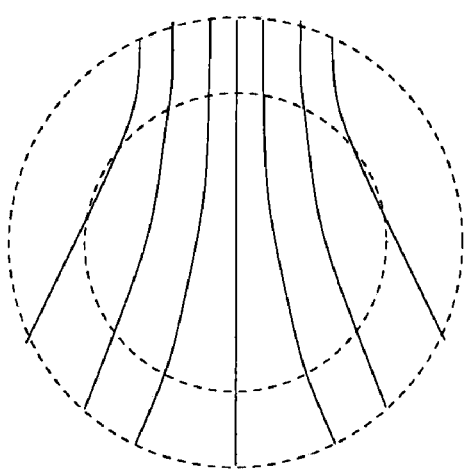

The Fourier-based method for determining the sampling patterns for resampling and coordinate transformation for hierarchical fan-beam backprojection can be further extended, as will be explained, to sampling patterns lying on lines or curves other than central fans of the intermediate images. Examples of such beneficial sets are illustrated in FIGS. 27A and 27B.

General Divergent-Beam Algorithms

The methods described for fanbeam backprojection, extend directly to other divergent-beam geometries, including 3D cone-beam, which is one of the most important in modern diagnostic radiology as will be described. Similarly to the fan-beam geometry, in which a source of divergent rays moves on a trajectory (i.e., a circle) around the imaged object, in the general divergent-beam geometry a source of divergent rays moves on a (not necessarily circular) trajectory in 3D space around the imaged object. The detector surface measures line integrals through the imaged object.

One embodiment of a hierarchical backprojection algorithm for a general divergent-beam geometry can again be described by a block diagram similar to FIG. 18, but modified in the following ways. First, at the zeroth level, the divergent-beam projections are zero-backprojected at 99 with the appropriate divergent-beam single-view backprojection $\mathcal{W}_0$ corresponding to a nominal "zero" source position, producing initial intermediate images. Second, because the trajectory of the source is not necessarily circular, the constituent divergent-beams of the intermediate images may not simply rotated as in the fan-beam geometry, but also translated, with respect to each other. The coordinate transformations $\mathcal{K}$ in 18 are selected accordingly. Third, depending on the presence of symmetries in the source trajectory and positions, there may or may not be "free" coordinate transformations such as the pixel re-arrangement which replaces a $\pi/2$ rotation in the fan-beam algorithm.

Figure 28:
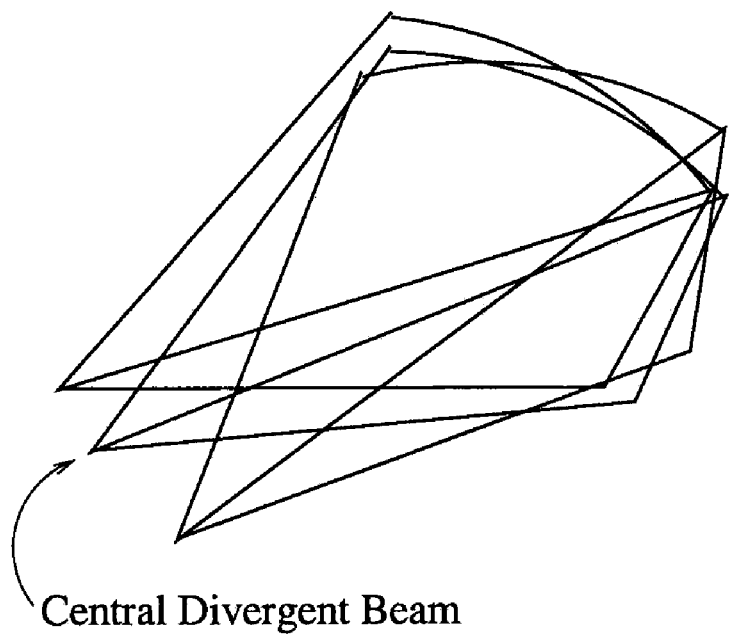
FIG. 28 includes two diagrams of divergent beams used in the present invention.
Figure 28:
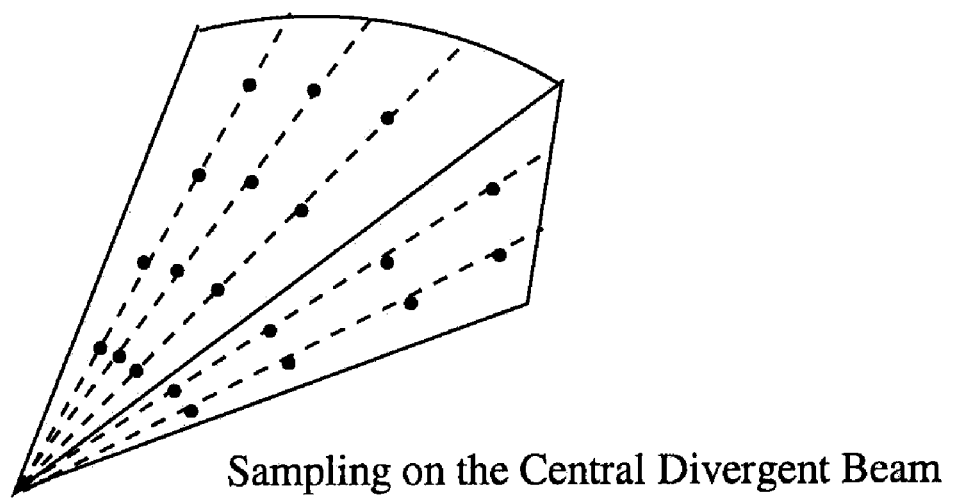

As in the fan-beam case, the initial intermediate images are processed hierarchically by the algorithm. Analogously to the fan-beam case, intermediate images that are close to each other in position and orientation are aggregated, in order that the aggregated intermediate image might be sampled sparsely. The 3D sampling patterns for the intermediate images are determined by studying the structure of constituent weighted backprojected divergent-beams that are rotated and translated with respect to each other. One sampling pattern, as illustrated in FIG. 28, is where the samples are located along the rays of a divergent-beam corresponding to the central constituent beam of the intermediate image. The sample-spacing along each ray is chosen to ensure that all the constituent divergent-beams of that intermediate image are sufficiently sampled along the ray. Alternatively, a more general way is to use the local Fourier method to find the sampling pattern, as described previously for the fan-beam case. Knowing how an intermediate image is composed of its constituent projections, the local 3D Fourier structure of every intermediate image is determined. A 3D local sampling matrix function at each point of the intermediate image is found that matches the sampling requirements for the local Fourier support, as described in the fan-beam case. This matrix function is then integrated (possibly numerically) over the image domain to determine the position of the samples.

Figure 29A:
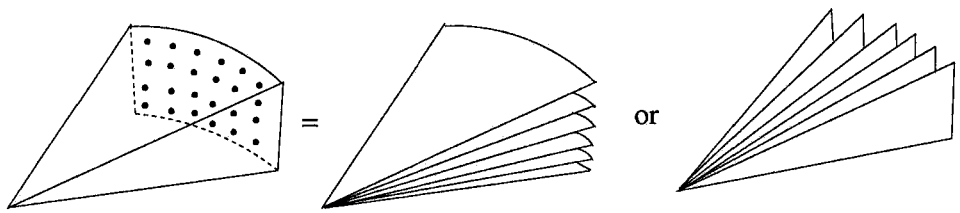
FIG. 29A is a diagram showing a conebeam.
Figure 29B:
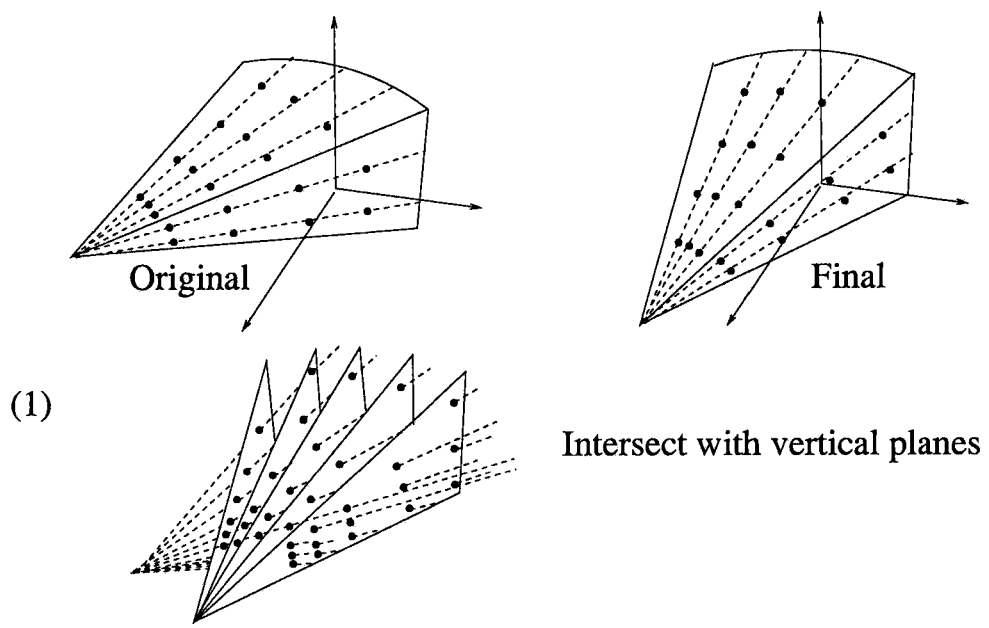
FIG. 29B is a diagram illustrating resampling.
Figure 29B:
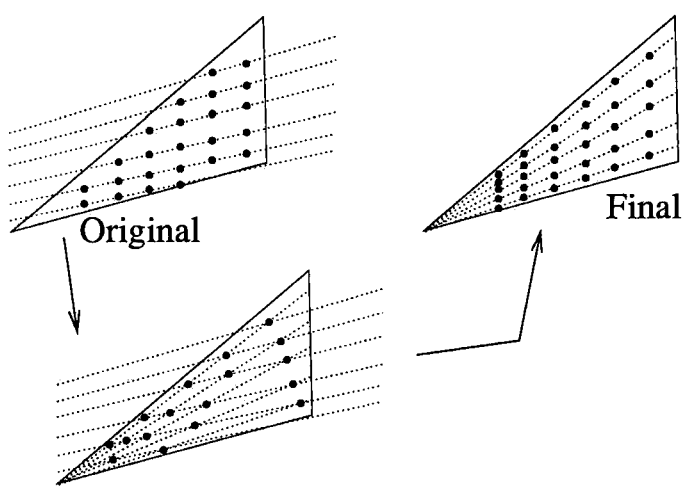

A separable method of up-sampling combined with rotation and translation onto a new sampling beam is achieved similarly to the fan-beam case. It reduces the 3D coordinate transformation and resampling operations to a sequence of 1D resampling operations. As shown in FIG. 29A, each divergent-beam may be regarded as the intersection of a set of vertical planar fan-beams that are distributed in azimuthal angle, with a set of tilted planar fan-beams at different elevation angles. The steps of the separable coordinate transformation are as follows (as shown in FIG. 29B)

1. The original is resampled onto the set of intersection of the rays of the original with the vertical planes of the new divergent-beam. These points are therefore located on the planes shared by the final sampling points.

2. Steps 1 and 2 from the separable resampling in the fan-beam case are performed for each plane separately to resample onto the final set of points.

With a suitably efficient sampling scheme, the fast hierarchical backprojection algorithm for divergent-beam can be expected to achieve large speedups with desirable accuracy. As in the fan-beam case one might use a pseudo-beam that is modified (e.g., with the location of the vertex moving farther away from the origin) in successive levels.

As will be evident to those skilled in the art, the methods of the present invention are not limited to the examples of imaging geometries or specific embodiments described herein. The methods are equally applicable to general problems of backprojection with other geometries.

Figure 30:
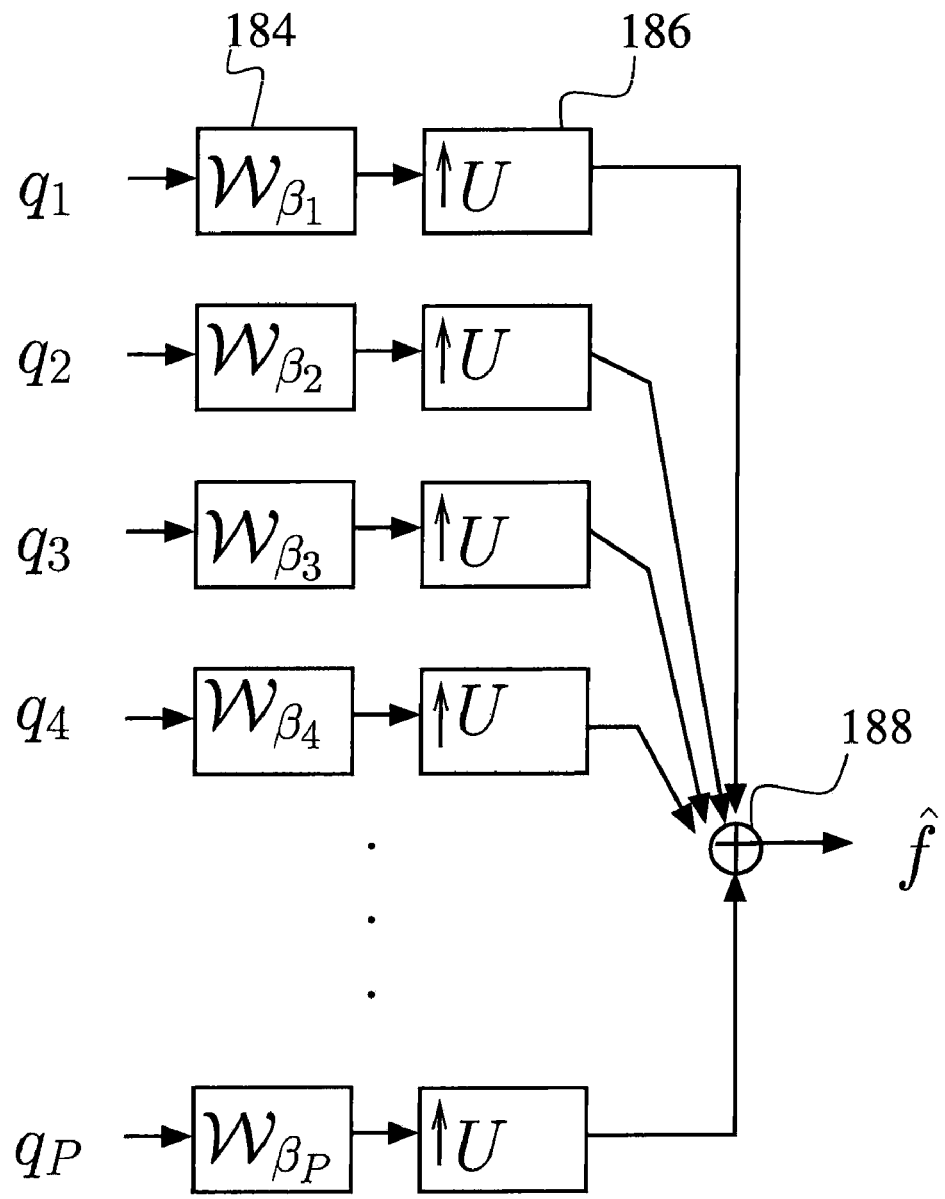
FIG. 30 is a diagram of a backprojection algorithm using resampling.

FIG. 30 illustrates resampling-based backprojection, as the sum of upsampled intermediate images formed by generalized backprojection of individual projections at source positions $\beta_p$. It is similar to the rotation-based backprojection 4, but differs from it in two respects. First, in the first step the pth (possibly processed) projection is subjected to a weighted-backprojection 184 at the source position or orientation $\beta_p$, rather than at zero, as is the case in 4. For example in the case of fanbeam projections, each projection is backprojected at the orientation of its source-angle. Second, before aggregation by addition at 188, each initial intermediate image undergoes an upsampling operation at 186. This is necessary, because the sampling pattern of each of these P single-projection intermediate images is chosen to be an efficient and sparse pattern, so will usually be different for each projection, and often non-Cartesian. Before the intermediate images are aggregated, they need to be resampled onto a common and denser grid. By itself, this structure offers no reduction in operation count. However, it serves as a stepping stone to the introduction of some of the fast hierarchical backprojection methods of the present invention.

Figure 31:
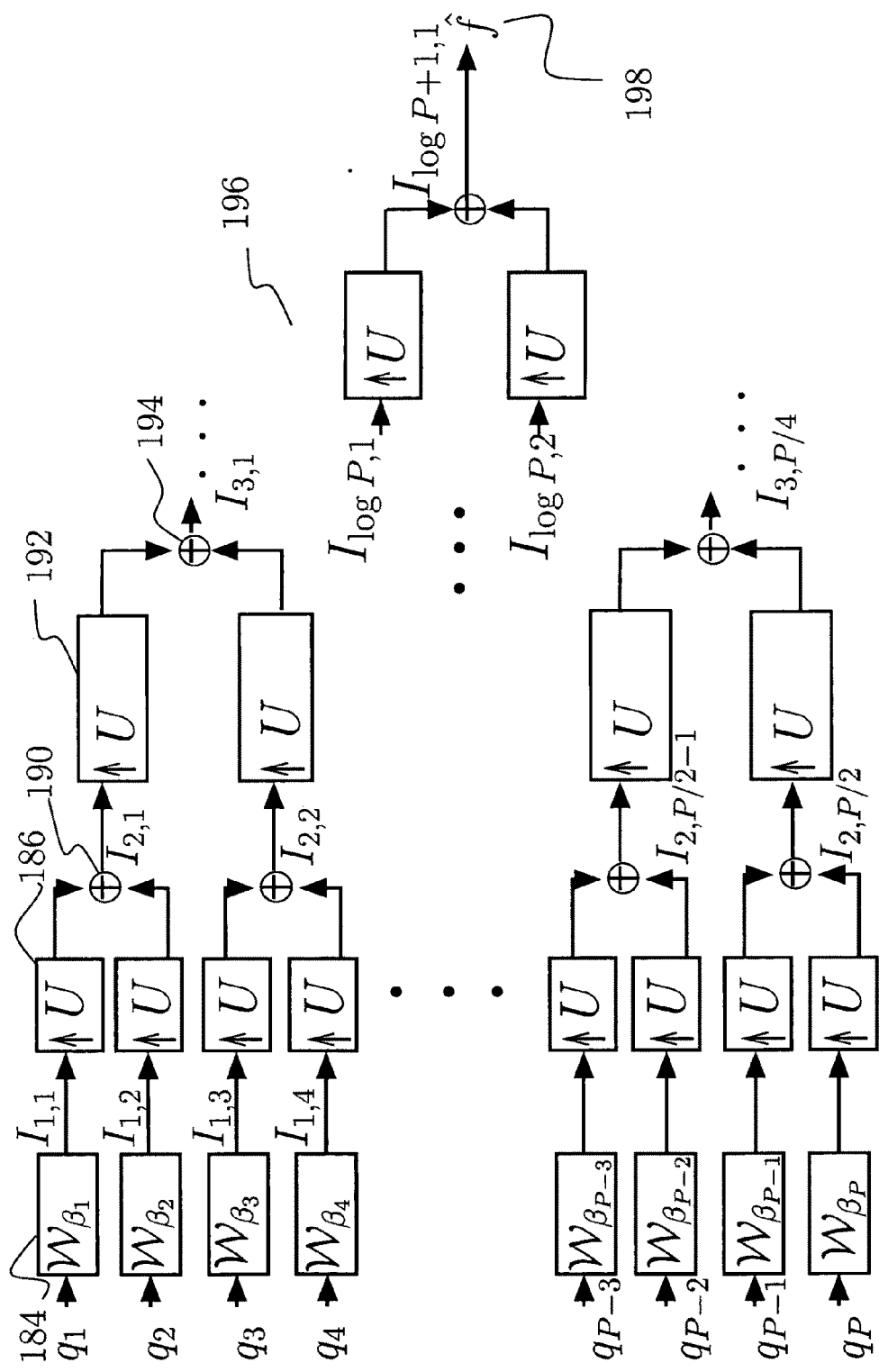
FIG. 31 is another backprojection algorithm using resampling in the present invention.

FIG. 31 is another embodiment of the present invention, a resampling-based hierarchical backprojection for creating a pixel image $\hat{f}$ from a plurality of projections $q_1 \ldots q_P$. FIG. 31 is the binary hierarchical version of FIG. 30. First, as in the non-hierarchical case, each projection is backprojected 184 at its individual orientation, onto a sampling pattern suited to that orientation, producing an intermediate digital image. This is the zeroth level of the hierarchy. In the first level of the hierarchy, these intermediate digital images are upsampled at 186 to a denser sampling pattern common to selected pairs of images. This upsampling will usually be to a non-Cartesian sampling pattern, but can be performed by a sequence of one dimensional resampling operations, as shown in FIG. 23, or in FIG. 29B. Selected resulting upsampled images are aggregated pairwise at 190, producing new intermediate images. In the second level, the new intermediate images are again upsampled at 192, and aggregated at 194, producing new intermediate images. This process continues until all intermediate image and projections have been processed, producing after the last aggregation step 198 the final image $\hat{f}$. As in the previously described embodiments, operations can be combined within and across a level.

The sampling patterns at each stage in the hierarchy and the parameters of the upsampling operation in the embodiment shown in FIG. 31 may be chosen by any of the previously described methods. For example, in the case of fan-beam projections, one possible sampling pattern for a given intermediate image would lie on the points of intersections of two fans: the first oriented at the central constituent source position; the second oriented at an extremal constituent source position. Alternatively the sampling pattern and parameters of the upsampling steps can be determined based on the Fourier or local Fourier properties and the view angle of projections included in the intermediate images. In particular, for non-periodic sampling patterns, the local Fourier method described for the fanbeam rotation-based algorithm can be used to find the sampling patterns: knowledge of how the projections combine to form the intermediate images leads to the determination of the local spectral support, which is used in turn to calculate the local sampling matrix function, which when integrated over the image domain produces the sampling pattern for the intermediate image.

Figure 32:
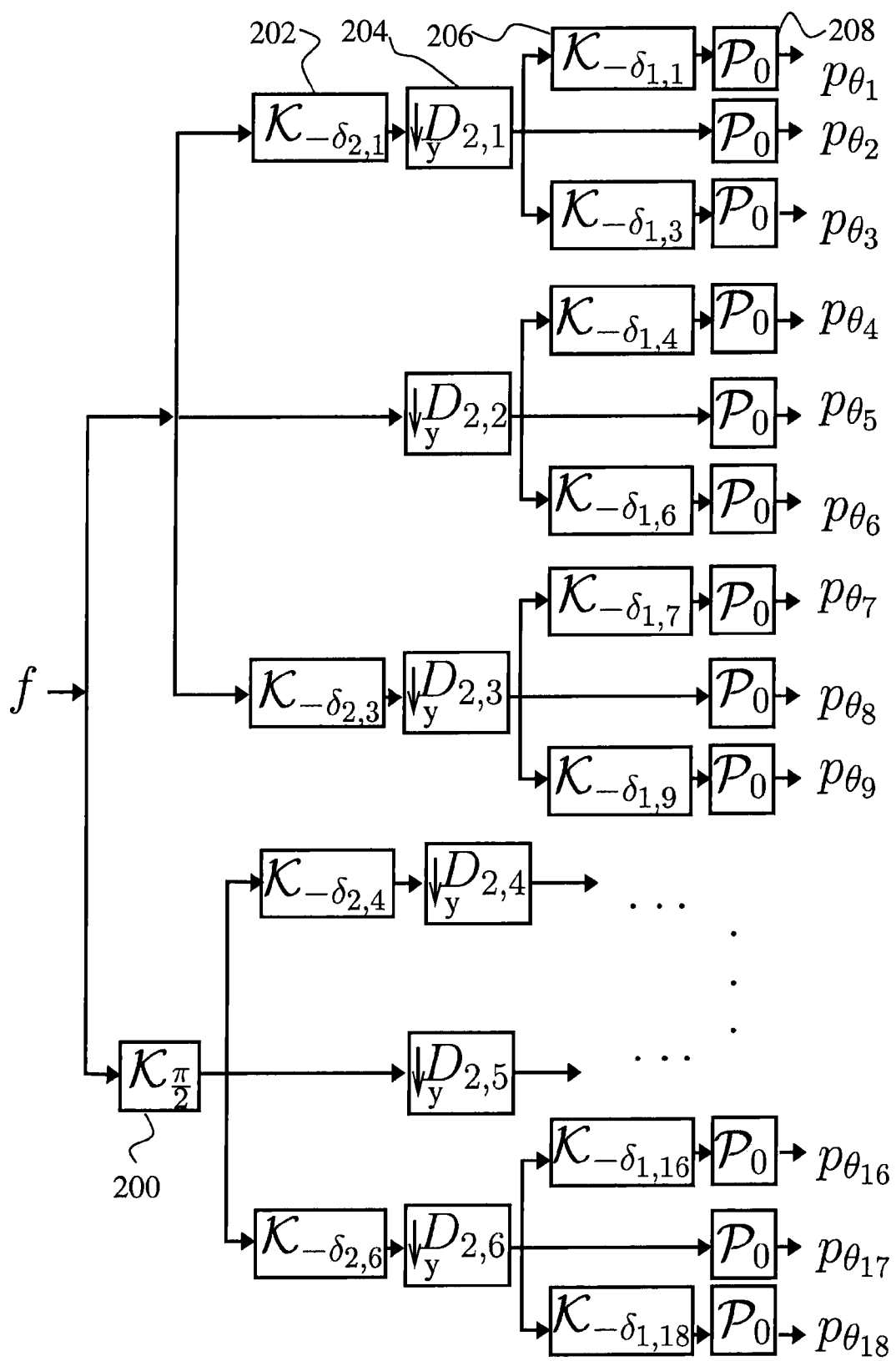
FIG. 32 is a diagram of an algorithm used for fast hierarchical reprojection.

FIG. 32 is the block-diagram for fast hierarchical reprojection. Reprojection is the process of computing tomographic projections from a given electronic image. The reprojection algorithm is found by applying the process of flow graph transposition to any block diagram of a a backprojection algorithm, possibly with some change in weighing operations. In the process, operations are replaced by their adjoint or dual. The block diagrams for reprojection therefore appear similar to a reversed version of the corresponding one for backprojection. The reprojection process described in FIG. 32 is one such embodiment of reprojection, obtained from the backprojection algorithm described in FIG. 8.

In the first level, a copy of the input image f is preserved in the top branch of the diagram as a top intermediate image, and in the bottom branch the image f is rotated at 200 by $-\pi/2$, producing a bottom intermediate image. In the second level, in the top half of the diagram, the un-rotated intermediate image is subject to three separate digital image coordinate transformations at 202 some of which may leave the image unchanged, producing three different top intermediate images. A similar process is applied in the bottom branch, producing three bottom intermediate images. Each of the top and bottom intermediate images (six in all) then undergoes a process of decimation (low-pass filtering followed by downsampling) at 204, producing new intermediate images. In the instance of the embodiment illustrated in FIG. 32 there are only $2 \cdot 3^L$, with L=2 view-angles, so the third level is the final one in the recursive hierarchy. In the third and final level the intermediate images are subject to separate coordinate transformations (206) some of which may leave the image unchanged, producing 18 intermediate images. The last step, which is not part of the recursion is different: each intermediate image undergoes a reprojection at zero degree at 208. Reprojection at zero degrees is equivalent to summing the vertical lines of pixels to produce a one-dimensional signal. These one-dimensional signals are the output projections produced by the algorithm.

The parameters of the digital image coordinate transformations in the algorithm are chosen by the knowledge of the Fourier characteristics of the intermediate images. These parameters are simply related to the parameters of the corresponding backprojection algorithm. It is easy to see that since the reprojection block-diagram is a flow transposition of a backprojection block-diagram, every branch of the reprojection block-diagram has a corresponding branch in the backprojection block-diagram, and the coordinate transformations in the corresponding branches are mathematical adjoints of each other. In the version of this reprojection algorithm that corresponds to the two-shear backprojection algorithm in FIG. 10, the coordinate transformations in the second level (202) is an x-shear followed by a y-shear, and the coordinate transformation in the last level (206) is an x-shear, followed by a y-shear, and a fractional decimation in x (These three operations can be reduced to a shear-scale). The parameters of these shears are the negative of the corresponding parameter used in the backprojection algorithm. The parameter of the decimation in x is the same as that of the upsampling in x in the first level of the backprojection algorithm. In the shear-scale version of this algorithm (corresponding to the shear-scale backprojection algorithm displayed in FIG. 13), the coordinate transformations in the second level (202) are shears in x (and the parameter of each shear is the negative of the corresponding parameter in FIG. 13). The coordinate transformations in the final level (206) are shear-scales. The shear-scale used in the reprojection algorithm is the mathematical adjoint of the corresponding shear-scale used in the backprojection. The parameters of the decimation factors are also the same as the corresponding upsampling factors in the backprojection.

Just like in the backprojection algorithms, oversampling of the intermediate images in the algorithm can be enforced by first upsampling the images at the beginning of the algorithm and downsampling them by the same factor at the end of the algorithm. Also, these operations can be combined within or across a level.

Figure 33:
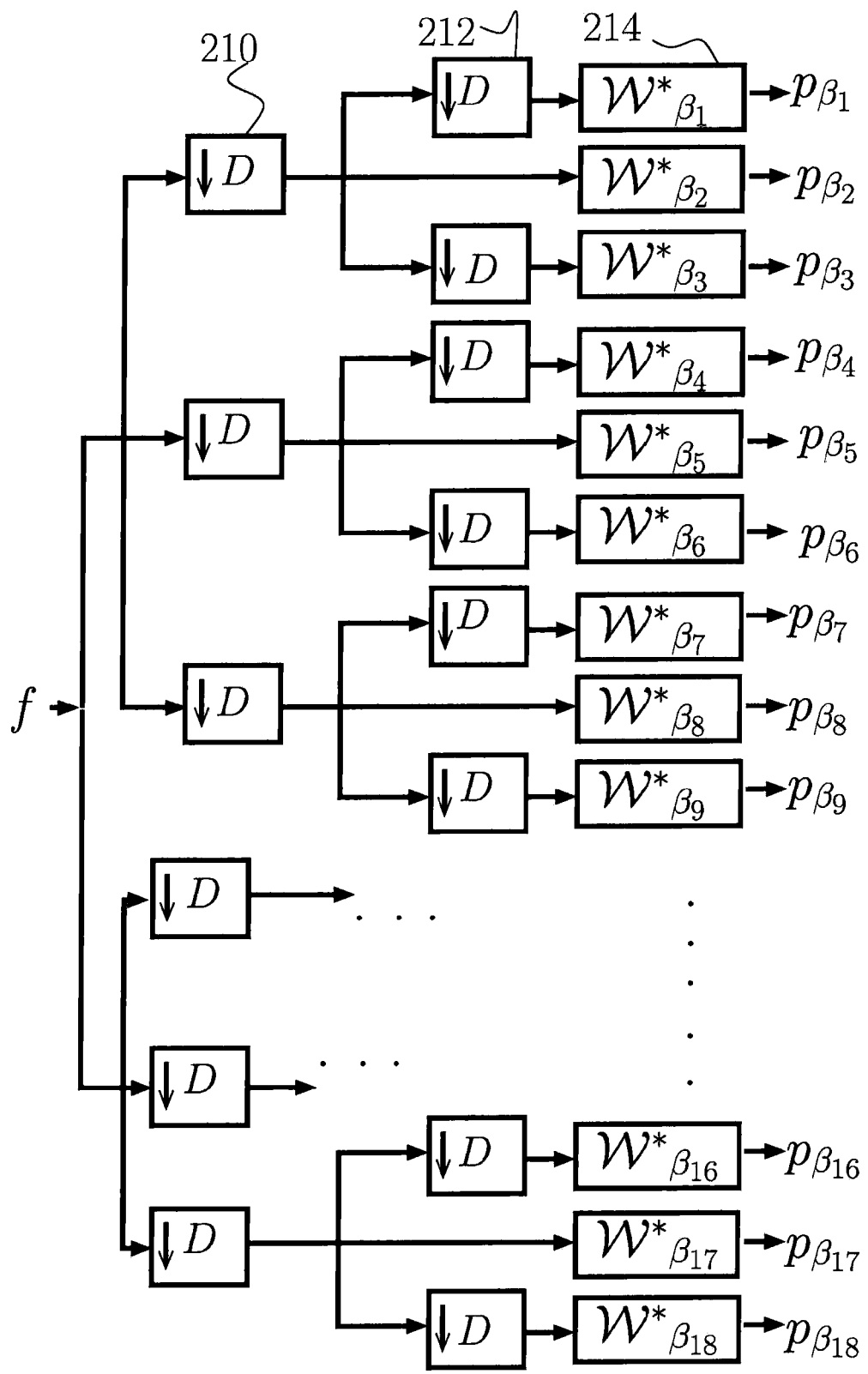
FIG. 33 is a diagram of another algorithm for fast hierarchical reprojection.

FIG. 33 is the block-diagram of a decimation-based weighted reprojection. It is the flow-graph transpose of FIG. 31 It shows the reprojection of the image onto a set of projections at 18 different source angles. Initially the given image is processed along two parallel paths. In each path the image is subject to three parallel resamplings (210) onto three different sparser sampling patterns. This resampling can be performed in a separable way using one-dimensional decimations (low-pass filtering followed by resampling onto a sparser grid). The parameters of the filter are determined by the Fourier characteristics of the intermediate image and the desired projections. Local Fourier analysis of the desired projections is used in the case when projections do not lie on parallel straight lines. In the final level of the algorithm each intermediate image is again subjected to three parallel resamplings (212) onto sparser sampling patterns. Finally a weighted projection is performed on the image to produce the projection $p_\theta$. This involves a weighted sum of the pixels of the image to produce a one-dimensional projection.

Implementations and Experimental Results

Preferred embodiments of the present invention were implemented in C programming language and tested in numerical experiments on a Sun Ultra 5 workstation with 384 MB RAM. The test image was the Shepp-Logan head phantom(a standard test image used in numerical evaluations of tomographic algorithms) By varying the parameters of the algorithms a tradeoff can be made between accuracy and computational cost. Accuracy refers to the quality of the reconstructed image. Though visual quality is not easily quantifiable, we measure the error between the reconstructed image and the original from which the radon transform was numerically computed. The measure of error used is the relative root-mean-square error (RRMSE). The RRMSE in reconstructing an N×N image $\hat{f}[m_2, m_1]$ from the tomographic projections of $f[m_2, m_1]$ is calculated as follows:

$$RRMSE = \frac{\sqrt{\frac{1}{N^2}\sum_{m_2=1}^{N}\sum_{m_1=1}^{N}|\hat{f}[m_1,m_2]-f[m_1,m_2]|^2}}{\max_{m_1,m_2} f[m_1,m_2]} \quad (1)$$

Figure 34:
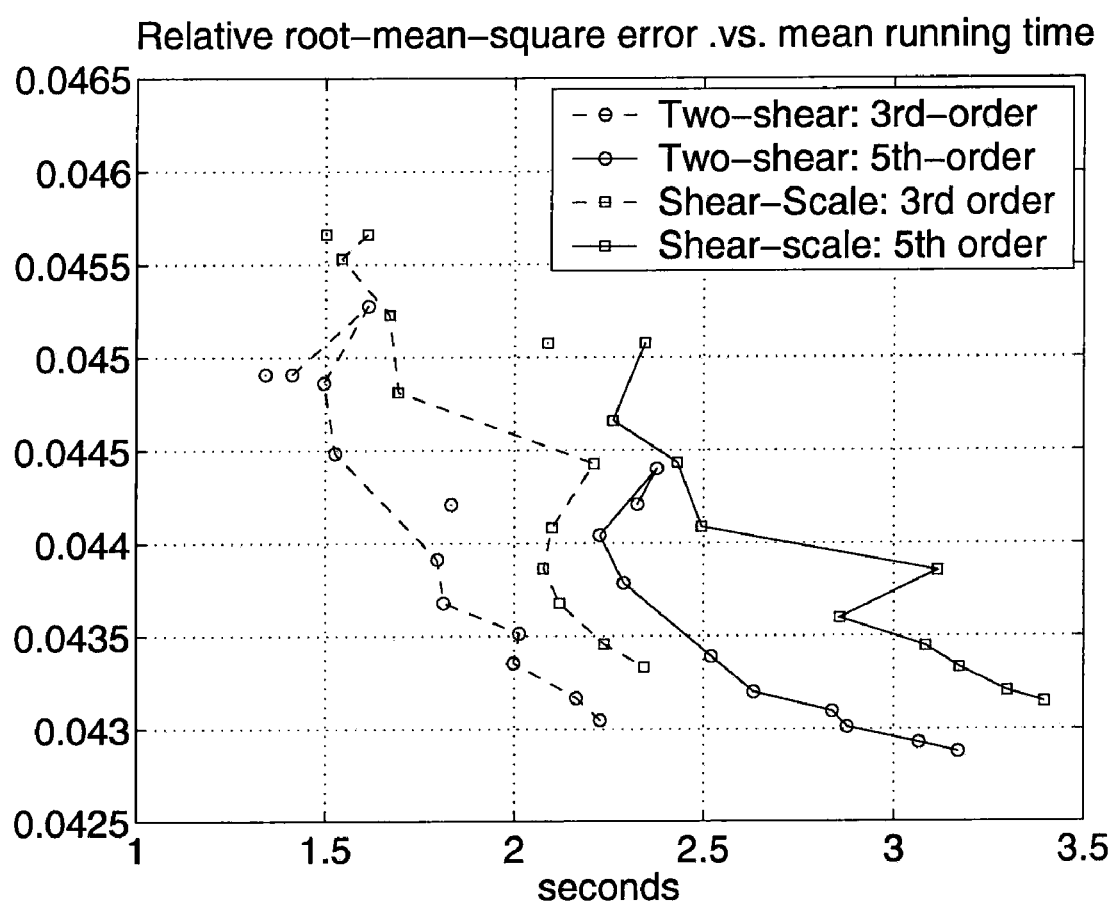
FIG. 34 is a graph showing the results of experiments using the present invention.

For parallel-beam data, the test image was of size 256×256, the number of view angles was 486, and the Shepp-Logan filter (the ideal ramp filter multiplied by a sinc function) was used to filter individual projections. FIG. 34 displays the RRMSE error versus the run times for the two algorithms at various values of the oversampling parameter $\gamma$ between 0.75 and 1.0. The two-shear algorithm is represented by the circles and the shear-scale algorithm by the squares. Each algorithm is run using two types of filters—a third-order (dashed line) and fifth-order (solid line) spline filter called MOMS. For each flavor of the algorithm, as $\gamma$ is decreased the error of the algorithm decreases and the run time increases. The plot points that are not connected to any other are the non-oversampled versions of the algorithms represented by the connected points. In comparison the run time of the conventional algorithm, using linear interpolation, is 14 s and the RRMSE error of its output image is 0.0486 (worse than the fast algorithms displayed here).

Figure 35:
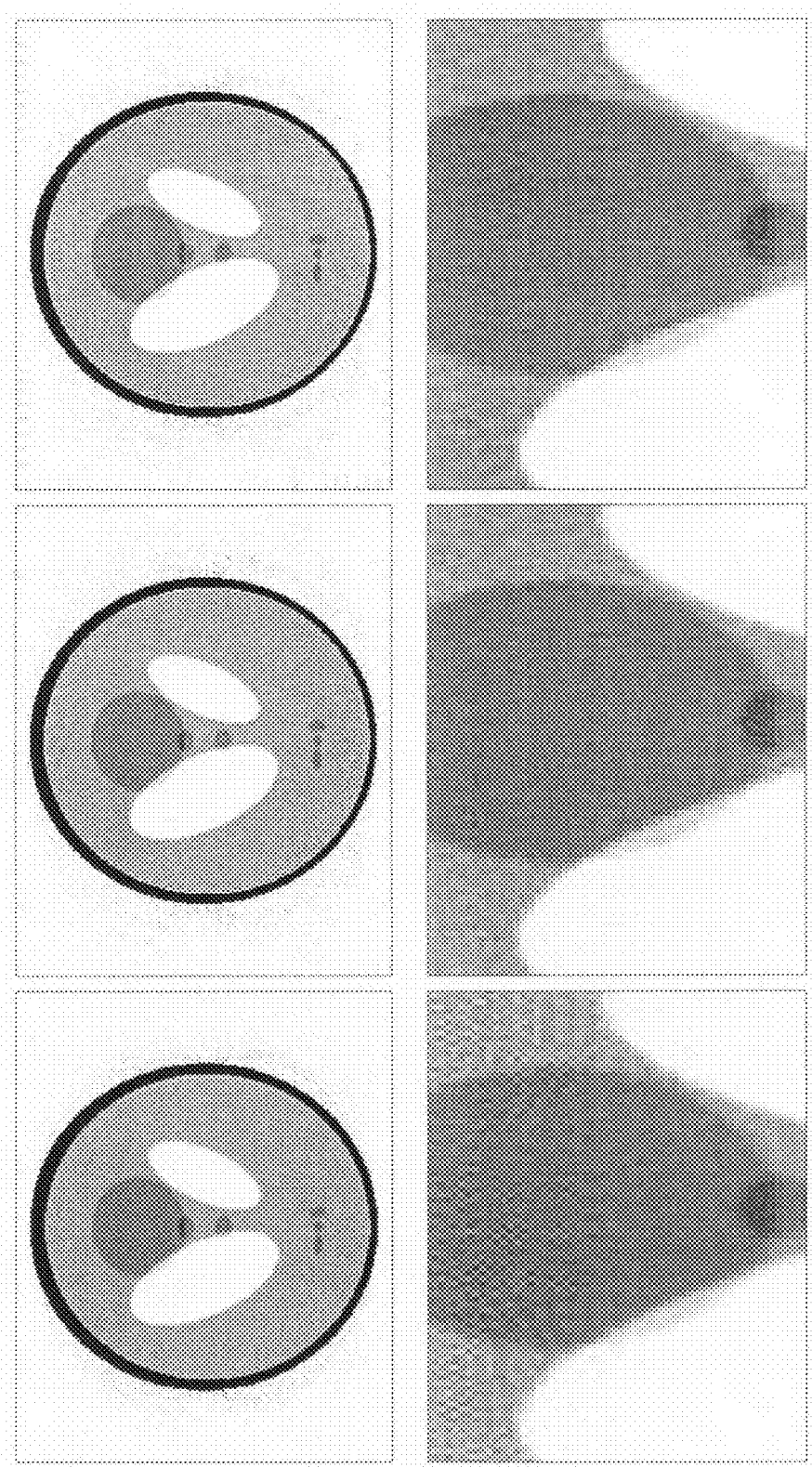
FIG. 35 includes sample images generated with the present invention.

Some sample images from the output of the algorithms, for parallel-beam data, are displayed in FIG. 35. Colunmwise from left to right, they are output images from the conventional backprojection, the two-shear and the shear-scale algorithms. An oversampling of $\gamma=0.82$ was applied to the two fast algorithms. The lower row of images displays in detail a section of the corresponding images in the upper row.

The fast hierarchical algorithm for fan-beam geometry was successfully tested on the 512×512 2D shepp-logan phantom. The acquisition geometry considered was with a source radius D=1.06×N=544, 972 source angles, and 1025 equiangular detectors. The regular and oversampled version of the fast algorithm was implemented using a variety of interpolation methods. The resulting reconstructed images were compared to a conventional fan-beam algorithm that used linear interpolation. In all the experiments the projections were filtered with the Shepp-Logan filter.

Figure 36A:
FIG. 36A is a display of a reconstructed image using the conventional algorithm.
Figure 36B:
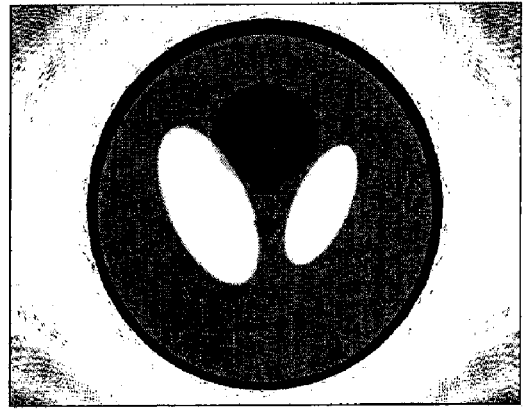
FIG. 36B shows a result obtained with the fast algorithms of the present invention.

FIGS. 36A and 36B display the reconstructed images from the conventional in FIG. 36A and the fast algorithms in FIG. 36B. The result of the fast algorithm is comparable to that of the conventional algorithm. The point spread functions of the fast algorithms are comparable to that of the conventional one. FIG. 37B displays the PSF of the conventional algorithm, FIG. 37C displays the PSF of the fast algorithm with linear interpolation and γ=0.4 oversampling. FIG. 37C compares slices through the x-axis of the psfs of the conventional algorithm, the non-oversampled and the γ=0.4 oversampled fast algorithms. The similarity of the PSFs confirms the comparable image quality in the fast algorithms.

The sampling scheme used was the fan intersection-based method, without the enhancements suggested later. In addition to the shortcomings of this scheme mentioned previously, for reasons of simplicity of implementation, numerous sample points not needed for the correct operation of the algorithm were used in the embodiment tested in the experiments. Despite these inefficiencies, for N=512 and D=1.41 N, the ratio of (data-dependant) multiply operations in the conventional algorithm to the fast (linear) one was 6.4 and the ratio of addition operations was 3.0. Note that the geometry used in this experiment, with a source very close to the origin (D=2.06 R) is particularly challenging for this un-enhanced implementation, because of the high density of samples near the source vertex. In most practical systems, the source is further away, reducing these effects. Furthermore using the alternative sampling schemes discussed earlier, will lead to much higher speedup factors.

Detailed Description of Backprojection And Reprojection Algorithms Used in the Present Invention Backprojection is the process used to create images from processed projections. Reprojection is the reverse process, used to compute projections from a given image. Both operations are used in image reconstruction from projections, as seen in FIG. 1. Conventional backprojection will be described first, followed by a description of some of the backprojection methods of the present invention. The description will be given first for the case of parallel-beam projections of a 2D image, and then for the more general 2D geometries.

The classic and preferred method used to estimate an image from its projections is the filtered backprojection (FBP) algorithm. The FBP involves first filtering the projections with a so-called ramp or modified ramp filter and then backprojecting those filtered projections. Additional pre-processing steps may also be applied to the projections before backprojection. A processed projection taken at view angle $\theta_p$, where p=1, . . . P is the projection index, will be denoted alternately by q(t, p), or $q_p$ or $q_{\theta_p}$, depending on whether the dependence on the variable t or θ needs to be shown explicitly. For brevity, processed projections will be called projections hereinafter.

The FBP reconstruction $\hat{f}$ from a set of P projections (at the angles specified by the components of the length-P vector $\vec{\theta}$), is described by:

$$\hat{f}(x_1, x_2) = (\mathcal{B}_{\vec{\theta}} q)(x_1, x_2) \quad (2)$$

where
Definition 0.1 the backprojection operator is defined by $$(\mathcal{B}_{\vec{\theta}} q)(x_1, x_2) \triangleq \sum_{p=1}^{P} q(x_1 \cos\theta_p + x_2 \sin\theta_p, p) \quad (3)$$

The $O(N^2 \log P)$ coordinate-transformation-based hierarchical backprojection algorithms of the present invention are based on a hierarchical decomposition of backprojection in terms of coordinate transformations. The details of several preferred embodiments are described with different choices of coordinate transformation, concluding with the most general coordinate transformations.

In particular, the $O(N^2 \log P)$ rotation-based hierarchical backprojection algorithms of the present invention are based on decomposition of backprojection in terms of the rotation of images.

The rotation-by-θ operator $\mathcal{K}/C(S)$ which maps an image $f(\vec{x})$ to its rotated version $(\mathcal{K}(\theta)f)(\vec{x})$ is defined by $$\mathcal{K}(\theta)f)(\vec{x}) \triangleq f(K_\theta \vec{x}), \quad \text{Definition 0.2}$$

where
Definition 0.3 The matrix of rotation by angle θ in the plane is $$K_\theta = \begin{bmatrix} \cos\theta & -\sin\theta \\ \sin\theta & \cos\theta \end{bmatrix}$$

Backprojection of a 1D function q(t) at a single-angle θ is defined as $(\mathcal{B}_\theta q)(\vec{x}) \triangleq q(x_1 \cos\theta + x_2 \sin\theta)$. In particular, the zero-angle backprojection (for θ=0) is $$(\mathcal{B}_0 q)(\vec{x}) = q(x_1 \cos 0 + x_2 \sin 0) = q(x_1) = q([1\ 0]\vec{x}) \quad (4)$$

Definition 0.4 The single-$\theta_p$-backprojection intermediate image is $$I_{\theta_p}(\vec{x}) \triangleq (\mathcal{B}_{\theta_p} q_p)(\vec{x})$$

As seen in FIG. 4, the backprojection in equation (3) may be rewritten as follows. Here $q_p$ refers to the projection whose view-angle is $\theta_p$.

$$\hat{f}(\vec{x}) = \sum_{p=1}^{P} (\mathcal{K}(-\theta_p)\mathcal{B}_0 q_p)(\vec{x}) \quad (5)$$

One embodiment of hierarchical backprojection stems from the fact that the cumulative result of several successive rotations is still a rotation. In particular, $$\mathcal{K}(\theta_1)\mathcal{K}(\theta_2)\ldots\mathcal{K}(\theta_N) = \mathcal{K}(\theta_1 + \theta_2 + \ldots + \theta_N) \quad (6)$$

It follows from Equation (6) that with $P=2^L$ for some integer L, the block diagram in FIG. 4 can be rearranged into a hierarchical tree structure as shown in FIG. 5A. The intermediate image in the $m^{th}$ branch of the $l^{th}$ level is denoted as $I_{l,m}$. In the initial level $$I_{1,m} \triangleq \mathcal{B}_0 q_m \quad m = 1, 2, \ldots, P \quad (7)$$

intermediate images are produced by backprojecting individual projections, and in subsequent levels, i.e., for l=1, 2, 3, . . . , $\log_2 P$ $$I_{l+1,m} \triangleq \mathcal{K}(\delta_{l,2m-1})I_{l,2m-1} + \mathcal{K}(\delta_{l,2m})I_{l,2m} \quad (8)$$

the intermediate images undergo coordinate transformations (rotations, in this embodiment) and are aggregated by addition. For any set of projection angles $\theta_i$, i=1, . . . P, the intermediate rotation angles $\delta_{l,m}$ can be chosen to guarantee that the structures in FIGS. 4 and 5A are equivalent, so that the hierarchical backprojection algorithm depicted in FIG. 5A produces the desired image $\hat{f}$.

In fact, because there are many more intermediate rotation angles (free parameters) than view angles (constraints), there are many degrees of freedom in the choice of the $\delta_{l,m}$. Also, for the digital images used in practice, digital image coordinate transformations are used, whose accuracy and computational cost depend on the choice of sampling patterns and implementation. These various degrees of freedom, or parameters, are used in the present invention to reduce the computational requirements of the hierarchical backprojection algorithm, as will be described.

Definition 0.5 The set $N_{l,m}$ of indices of constituent projections for an intermediate image $I_{l,m}$ is the set of indices of projections for which there is a path from the input in FIG. 5A to the intermediate image $I_{l,m}$.

For example, as seen in FIG. 5A, $N_{3,P/4}=\{P-3, P-2, P-1, P\}$. It is easily shown, using equation (8) or upon examination of the block diagram, that $$N_{l,m}=\{2^{l-1}(m-1)+k : k=1, 2, \ldots, 2^{l-1}\} \qquad (9)$$

Thus $N_{l,m}$ lists the projections that make up intermediate image $I_{l,m}$. If, instead of being processed by the method described in FIG. 5A, these same projections indexed by the set $N_{l,m}$ were directly backprojected together at their respective view-angles, this would produce the virtual intermediate image $\tilde{I}_{l,m}$:

Definition 0.6

$$\tilde{I}_{l,m} = \sum_{p \in N_{l,m}} I_{\theta_p}$$

Upon examination of the block diagram in FIG. 5, it can be seen that the relative angle between projections in an intermediate image is preserved in the final reconstructed image $\hat{f}$. In other words, for all intermediate images in the algorithm, i.e. $\forall l, m$ $$I_{l,m} = \mathcal{K}(\alpha_{l,m})\tilde{I}_{l,m} \text{ for some } \alpha_{l,m} \in (-\pi, \pi] \qquad (10)$$

The intermediate rotation angles $\delta_{l,m}$ of the hierarchical algorithm are completely determined by $\alpha_{l,m}$ as follows. It follows easily from the definition of $N_{l,m}$ or Equation (9) that $N_{l+1,m} = N_{1,2,m-1} \cup N_{1,2,m}$, and consequently by the Definition of $\tilde{I}$.

$$\tilde{I}_{l+1,m} = \tilde{I}_{1,2m-1} + \tilde{I}_{1,2m} \qquad (11)$$

Equations (8), (10) and (11) imply that $$\delta_{1,2m-1} = \alpha_{l+1,m} - \alpha_{1,2m-1} \text{ and } \delta_{1,2m} = \alpha_{l+1,m} - \alpha_{1,2m} \qquad (12)$$

The intermediate rotation angles ($\delta_{l,m}$) and correspondingly the relative angles $\alpha_{l,m}$, are chosen to reduce the bandwidth of the intermediate images. Images of small bandwidth can be represented by few samples, and consequently reduce the computational cost of the whole algorithm. The bandwidth of these intermediate images is determined by understanding the algorithm in the Fourier domain and tracking the evolution of the spectral support of the intermediate images through the hierarchy.

Tomographic Projections in the Fourier Domain

The parameters of the digital image coordinate transformations are chosen to account for the view angles $\theta_p$ of the selected projections, as has been described. The parameters are also chosen for their effect on the Fourier characteristics of the intermediate images. These considerations are also used to determine which intermediate images are selected for aggregation together.

Key to interpreting the backprojection algorithm in the Fourier domain is the projection-slice theorem that relates the one-dimensional Fourier transform ($\mathcal{F}_1$) of a projection $\mathcal{P}_\theta f$ with the two-dimensional Fourier transform ($\mathcal{F}_2$) of the image f. The projection-slice theorem 4 says that $$(\mathcal{F}_1 \mathcal{P}_\theta f)(\omega) = (\mathcal{F}_2 f)(\omega \cos\theta, \omega \sin\theta)$$

The backprojection algorithm of FIG. 4 can be interpreted in the Fourier domain. The backprojection-at-zero operator produces an image whose spectral support is limited to the horizontal frequency axis $\omega_1$:

$$(\mathcal{B}_0 q)(x_1, x_2) = q(x_1) \Leftrightarrow (\mathcal{F}_2 \mathcal{B}_0 q)(\omega_1, \omega_2) = 2\pi Q(\omega_1) \delta(\omega_2) \qquad (13)$$

It is well known that rotating an image in the space domain results in the rotation of its Fourier transform by the same angle $$g(\vec{x}) = (\mathcal{B}_0 q)(K_\theta \vec{x}) \Leftrightarrow G(\vec{\omega}) = (\mathcal{F}_2 \mathcal{B}_0 q)(K_\theta \vec{\omega}) \qquad (14)$$

It follows that the function of the backprojection operator in Equation (5) is to rotate the spectral component of each projection to the appropriate angle in the reconstructed image and add them all together.

Assuming projections with one-sided bandwidth (in the t variable) equal to $\pi$, the typical virtual continuous intermediate image $\tilde{I}_{l,m}$ in the hierarchical algorithm therefore has a spectral support of a wedge in a range of angles determined by the constituent projections, as shown in FIG. 6. In particular, let $I_{l,m}$ be an intermediate image in the block diagram of the algorithm shown in FIG. 5A, with $N_{l,m}=\{b, b+1, \ldots, e\}$, i.e. the view-angles of the constituent projections of this image are $\{\theta_p : p=b, b+1, \ldots, e\}$. Because of the relationship in Equation (10), the spectral support of $I_{l,m}$ is just a rotated version of that of $\tilde{I}_{l,m}$, with rotation angle $\alpha_{l,m}$. It follows that the range of angles occupied by the wedge in FIG. 6 is $[\gamma-\beta, \gamma+\beta]=[\theta_b-\alpha_{l,m}, \theta_e-\alpha_{l,m}]$. The bandwidths of $I_{l,m}$ in the first and second coordinate, $\Omega_s$ and $\Omega_f$, respectively, are indicated on the bounding rectangle for the wedge, which is shown by broken lines in FIG. 6. Thus, the choice of $\alpha_{l,m}$ provides a way to control the bandwidths of $I_{l,m}$.

Sampling theory dictates how such a continuous intermediate image $I_{l,m}$ may be represented by a samples on a Cartesian sampling pattern. In particular, a continuous image with bandwidths of $\Omega_s$ and $\Omega_f$ in the first and second coordinate may be sampled on a Cartesian pattern aligned with the coordinate axes, with a sample spacing of $\Delta_s$ and $\Delta_f$ in the first and second coordinates such that $\Delta_s < \pi/\Omega_s$ and $\Delta_f < \pi/\Omega_f$. In order to minimize the number of samples required to represent the continuous image, the quantity $1/(\Delta_s \Delta_f) > \pi^2 \Omega_s \Omega_f$, which is proportional to the area of the bounding rectangle, should be minimized. The rotation angle that minimizes this area, and therefore minimizes the sampling requirements for intermediate image $I_{l,m}$ is $$\alpha^*_{l,m} = (\theta_b + \theta_e)/2 \qquad (15)$$

Selecting Parameters for Coordinate Transformations

Equation (15) is used in Equation (12) to determine the optimum rotation parameters $\delta_{l,m}$ for the digital image coordinate rotations in the rotation-based hierarchical backprojection embodiment illustrated in FIG. 5A. The indices b and e are determined as corresponding to the smallest and largest, respectively, in the set $N_{l,m}$. With this choice, the intermediate image $I_{l,m} = \mathcal{K}(\alpha^*_{l,m})\tilde{I}_{l,m}$, and its bandwidths in the first coor dinate (slow bandwidth) and second coordinate (fast bandwidth) are, respectively, $$\Omega_s(I_{l,m}) = \pi \sin\frac{\theta_e - \theta_b}{2} \quad \Omega_f(I_{l,m}) = \pi \quad (16)$$

To further minimize the bandwidth, the differences $\theta_e - \theta_b$ should be minimized, which is achieved by selecting to aggregate at each step intermediate images produced from projections with the least maximum angular separation between their view angles.

In addition to rotation angles and selection of which intermediate images to aggregate, it is necessary to choose appropriate sampling patterns for the digital image coordinate transformations of the various intermediate images in the algorithm. These are chosen using the sampling requirements, which are in turn determined using the spectral supports and bandwidths of the intermediate images.

In particular, for initial intermediate images formed by the backprojection of a single projection, $I_{l,m} = \mathcal{B}_0 q_{\theta_m}$ as in FIG. 5A the slow bandwidth $\Omega_s(I_{l,m}) = 0$, and a single sample along the $x_2$ coordinate suffices. The slow bandwidth will be larger and more samples along the $x_2$ coordinate will be needed for initial intermediate images formed, as in FIG. 5B, by back-projecting more than one projection.

The sum of two virtual intermediate images ($\tilde{I}_{l,m} = \tilde{I}_{l-1,2m-1} + \tilde{I}_{l-1,2m}$) and their corresponding intermediate images are illustrated, in the space and frequency domains, in FIGS. 7A-7C. FIGS. 7A and 7B show the Fourier-domain support of $\tilde{I}$ and I. FIG. 7C shows the space-domain sampling scheme of $I_{l,m}$, $I_{l-1,2m}$ m and $I_{l-1,2m-1}$. The sampling points are at the intersections of the horizontal and vertical lines in the space domain. The aggregated intermediate image $I_{l,m}$, having a greater slow bandwidth than each of its components, requires a denser sampling pattern. Conversely, intermediate images at earlier levels of the hierarchical algorithm require a sparser sampling pattern, leading to computational savings.

Computation Cost and Savings

The computational cost is readily estimated. Assuming equally P projection view-angles in [0, π), with an angular spacing of $\Delta_\theta = \pi/P$, and $N_{l,m}$ as specified in (9), equation (16) (using $b = 2^{l-1}(m-1)+1$ and $e = 2^{l-1}(m-1)+2^{l-1}$) implies that $\Psi_s(I_{l,m}) = \pi \sin(\pi(2^{l-1}-1)/(2P))$ and $\Omega_f(I_{l,m}) = \pi$. The size (number of points) of the digital image $I_{l,m}^d$ in the $l^{th}$ level is therefore $$\text{size}(I_{l,m}^d) \approx (N/\Delta_s)(N/\Delta_f)$$
$$= (N\Omega_s(I_{l,m})/\pi)(N\Omega_f(I_{l,m})/\pi)$$
$$= N^2 \sin(\pi(2^{l-1}-1)/(2P)) < N^2(\pi 2^{l-1}/(2P))$$
$$= O(N^2 2^l/P).$$

Given that the cost of rotating a digital image of S pixels is O(S) and size $(I_{l,m}^d) = O(N^2 2^l/P)$, the complexity of the algorithm is $$\sum_{l=1}^{\log P} \frac{P}{2^{l-1}} O\left(\frac{N^2 2^l}{P}\right) = \sum_{l=1}^{\log P} O(N^2) = O(N^2 \log P) \quad (17)$$

For the typical P=O(N), this is $O(N^2 \log N)$, which is much more favorable scaling of the cost with the size of the image, than the $O(N^3)$ of conventional backprojection.

Improved Ternary Rotation-Based Hierarchical Backprojection

It is easy to see that the rotation of a sampled image by certain special angles—0, ±π/2 and π—are computationally inexpensive operations because they involve no interpolation but, at most, a mere rearranging of existing pixels. The computational efficiency of the algorithm of the present invention can be improved by incorporating these free operations into it. The binary algorithm (FIG. 5) can be modified such that three, not two, images are added at every stage. The center image of each such triplet is rotated by 0 radians—a free operation. To use the free rotation by −π/2, it is included in the final stage: one of the constituent images is rotated by −π/2 and added to the other un-rotated one. This particular combination of binary and ternary stages results in a set of view-angles of size $2 \times 3^L$ for some integer L. Though the algorithm can be tailored to arbitrary sets and numbers of projections, the description and analysis of the algorithm can be simplified by assuming that they number exactly $2 \times 3^L$ and are uniformly distributed as follows:

$$\theta_i = -\frac{\pi}{4}(1 - 3^{-L}) + \Delta_\theta(i-1) \quad (18)$$

where $i = 1, 2, \ldots, 2 \cdot 3^L$ and $$\Delta_\theta = \pi/(2 \cdot 3^L)$$

Hence, the view-angles can be divided into two sets of $3^L$ each, one set centered around θ=0 and the other centered around θ=π/2. The block diagram of this ternary algorithm is shown in FIG. 8 for the particular case of L=2, i.e., for a set of $P = 2 \times 3^2 = 18$ projections. The digital intermediate images $I_{l,m}^d$ are the sampled versions of the underlying continuous intermediate images $I_{l,m}$. In the block diagram, blocks marked $\mathcal{B}_0$ represent the zero-angle backprojection operator. Blocks marked $\mathcal{K}_\delta$ represent the digital image rotation operator. As will be explained, the sampling periods and rotation angles for the digital images and for the digital image rotations are chosen to minimize computational cost.

Selected aggregate intermediate digital images can be stretched to produce new intermediate images. The blocks labelled $\uparrow_y U_{l,m}$ in FIG. 8 represent up-sampling along the second (slow) coordinate, which are necessary to accommodate the increasing bandwidth of the intermediate images as the algorithm progresses. For the configuration of view-angles in (18) and (22), the bandwidth of the intermediate images in the $l^{th}$ level are $\Omega_s(I_{l,m}) = \pi \sin(\Delta_\theta(3^{l-1}-1)/2)$ and $\Omega_f(I_{l,m}) = \pi$. The normalized spectral supports at key points of the algorithm, numbered (1), ..., (9), are displayed in FIG. 9. As the algorithm progresses (as l increases), the slow bandwidth increases, and the required slow-sampling period, $\Delta_s < \pi/\Omega_s(I_{l,m}) = \sin((3^{l-1}-1)/2)^{-1}$, decreases. The upsampling factors $U_{l,m}$ in the various upsampling blocks can be chosen to satisfy these requirements.

Section 0.0.0.1 describes how the separable rotation of discrete images involving two-shears is incorporated into the backprojection algorithm. In order to improve the quality of the backprojected image, a systematic oversampling of the intermediate images is introduced. Section 0.0.0.1 describes the algorithms modified to include this oversampling.

Intermediate rotation angles for coordinate transformation can be chosen as follows. For general L, the hierarchy consists of (L+1) levels. In the zeroth level, each projection $q_\theta$ is backprojected-at-zero ($\mathcal{B}_0$) to produce a corresponding image $\mathcal{B}_0 q_\theta$. The images are then grouped into threes and combined to produce a third as many images. The groupings at level l are defined by the following relationships. In subsequent levels, l=1, ..., L, $$I_{l+1,m} = \mathcal{K}_{(\delta_{l,3m-2})} I_{l,3m-2} + \mathcal{K}_{(\delta_{l,3m-1})} I_{l,3m-1} + \mathcal{K}_{(\delta_{l,3m})} I_{l,3m} \quad (19)$$

$$\text{and } I_{L+2,i} = \mathcal{K}_{(\delta_{L+1,1})} I_{L+1,i} + \mathcal{K}_{(\delta_{L+1,2})} I_{L+1,2} \quad (20)$$

For the configuration of view angles in (18), the optimal intermediate rotation angles are $\delta_{l,3m-1}=0$ for l=1, 2, ..., L, $\delta_{L+1,i}=0$, and $\delta_{L+1,2}=-\pi/2$. Upon examination of FIG. 10A, it is easy to see that the indices $N_{l,m}$ of the projections that constitute image $I_{l,m}$ are as follows:

$$N_{l,m} = \{3^{l-1}(m-1)+1, 3^{l-1}(m-1)+2, \ldots, 3^{(l-1)}m\} \text{ for } l=1, 2, \ldots, L+1 \quad (21)$$

By Equation (21) therefore, $b=3^{l-1}(m-1)+1$ and $e=3^{l-1}(m-1)+3^{l-1}$ and, using Equations (18) and $$\alpha_{l,m}^* = -\frac{\pi}{4}(1 - 3^{-L}) + \Delta_\theta(3^{l-1}(m-1/2) - 1/2). \quad (15)$$

Similarly to the binary it follows that for l=1, ..., L, $$\delta_{l,3m-i} = \alpha_{l+1,m}^* - \alpha_{l,3m-i}^* = \begin{cases} +\Delta_\theta 3^{l-1} & \text{if } i=2 \\ 0 & \text{if } i=1 \\ -\Delta_\theta 3^{l-1} & \text{if } i=0 \end{cases} \quad (22)$$

For the final stage we make use of the free rotations by $\pi/2$ and 0 radians.

0.0.0.1 Coordinate transformation can be based on shearing, as follows. The digital image rotation of the intermediate images can be replaced by a sequence of two digital image shears as shown in FIG. 10(B), where shears in the x and y coordinate are defined as follows:

Definition 0.7 The x-shear and y-shear operators are defined by $$(\mathcal{S}_x(\alpha)f)(\vec{x}) = f(S_x^\alpha \vec{x})$$

$$(\mathcal{S}_y(\alpha)f)(\vec{x}) = f(S_y^\alpha \vec{x})$$

where the x-shear and y-shear matrices are $$S_x^\alpha = \begin{bmatrix} 1 & \alpha \\ 0 & 1 \end{bmatrix} \text{ and } S_y^\alpha = \begin{bmatrix} 1 & 0 \\ \alpha & 1 \end{bmatrix},$$

respectively.

This alternative embodiment is derived from the two-shear factorization of the rotation matrix:

$$K_\theta = S_y^{\tan\theta} S_x^{-\sin\theta\cos\theta} S_c,$$

where $$S_c = \begin{bmatrix} \cos\theta & 0 \\ 0 & 1/\cos\theta \end{bmatrix}.$$

This decomposition implies that in the case of digital images, using perfect bandlimited interpolation and a sufficiently bandlimited digital image as the input to the two-shear digital image coordinate transformation, the twice-sheared image is simply the image rotated by θ, and effectively downsampled in x and upsampled in y by a factor of 1/cos θ. To correct these changes in sampling pattern would require non-integer resampling every time a two-shear operation is performed. Instead, by sampling the intermediate images differently, only the cumulative effects need to be addressed for the final image.

A convenient choice is to correct the resampling once at the beginning of the hierarchy, by upsampling the initial digital intermediate images in x and downsampling in y. When the initial intermediate images are produced by single-view backprojection as in the embodiments shown in FIG. 10A, the downsampling in y is free, because it only involves initial backprojection onto a sampling pattern with a different y density. It is therefore not shown explicitly in the block diagram in FIG. 10B. Upsampling in x in the first stage avoids aliasing problems in later stages. For each of the initial images, the cumulative effective downsampling/upsampling factor $$1 \Big/ \prod_{k=1}^{K} \cos\theta_k$$

to the final image is calculated across all two-shear transformations on the path to the final image, and the reverse operation is applied at the initial image as described. It follows that each of the initial images $I_{l,p}^d$, p=1, ..., P is resampled with different x and y sampling densities.

So the resulting algorithm, as shown in FIG. 10(A) involves first resampling all the images $\mathcal{B}_0 q_{\theta_p}$, p=1, ..., P by the appropriate factors (depending on $\theta_p$) and then performing two-shear digital image coordinate transformations as shown in FIG. 10(B). The two shears are performed taking into consideration the changing sampling pattern of each intermediate image.

Shear-Scale Algorithms

The shear-scale-based hierarchical backprojection algorithm is based on the definition of backprojection as the sum of single-projection images that are scaled (stretched/contracted) and sheared.

Definition 0.8 The x-shear-scale operator $\mathcal{C}(\vec{\sigma})$ is defined by $$(\mathcal{C}(\vec{\sigma})f)(\vec{x}) = f(C_{\vec{\sigma}}\vec{x})$$

where the x-shear-scale matrix $$C_{\vec{\sigma}} = \begin{bmatrix} \sigma_1 & \sigma_2 \\ 0 & 1 \end{bmatrix}.$$

So, Equation (3) may be rewritten as $$\hat{f}(\vec{x}) = \sum_{p=1}^{P} [\mathcal{C}(\cos\theta_p, \sin\theta_p)\mathcal{B}_0 q_p](\vec{x}) \quad (23)$$

The following are some results describing the effect of accumulated shears and shear-scales that can be easily shown.

$$\prod_{i=1}^{n} \mathcal{S}_x(\alpha_i) = \mathcal{S}_x\left(\sum_{i=1}^{n} \alpha_i\right) \quad (24)$$

$$\mathcal{C}(\vec{\sigma}')\mathcal{C}(\vec{\sigma}'') = \mathcal{C}(\sigma_1'\sigma_1'', \sigma_1''+\sigma_1'\sigma_2'') \quad (25)$$

Similarly to Equation (24), Equation (25) can be inductively applied to prove that a sequence of n shear-scales is also a shear-scale. Using this property, Equation (23) can be rewritten in a hierarchical algorithmic structure. FIG. 11A is the block-diagram representation of Equation(23) (for P=4), and FIG. 11B is its hierarchical equivalent.

The requirement of equivalence of the two structures sets up a system of equations between the given projection-angles $\theta_p$ and the unknown shear-scale parameters $\vec{\sigma}_{l,m}$, whose solution always exists.

It is computationally beneficial (in terms of operations or storage space) to use an integer scale-factor rather than a non-integer one. For example, it is beneficial to use x-shear-scales $\mathcal{C}(\vec{\sigma})$ with an integer shear-parameter $\sigma_1=1.0$, which is exactly a pure x-shear $\mathcal{S}_x(\sigma_2)$. It is possible to design the algorithm so that only pure x-shears are used, and x-shear-scalings are avoided, in levels l=2, 3, ..., L.

Instead of replacing each shear-scale in Equation (23) with a sequence of shear-scales, using Equations (24) and (25) each shear-scale is replaced with a single shear-scale followed by a sequence of shears:

$$\mathcal{C}(\cos\theta_p, \sin\theta_p) = \mathcal{S}_x(\alpha_n)\mathcal{S}_x(\alpha_{n-1}) \ldots \mathcal{S}_x(\alpha_1)\mathcal{C}(\cos\theta_p, \sigma) \quad (26)$$

$$\text{s.t.} \quad \sigma + \cos\theta_p \sum_{i=1}^{n} \alpha_i = \sin\theta_p$$

with free parameters $\alpha_1, \alpha_2, \ldots, \alpha_n$.

The resulting hierarchical configuration is displayed in FIG. 13. A convenient choice is to perform the x-shear-scale ($\mathcal{C}_{\vec{\sigma}}$) in the level l=1 and x-shears in subsequent levels l=2, 3, ..., L. So the expression for the underlying continuous-domain image in the first level is as follows.

$$I_{2,m} = \sum_{i=0}^{2} \mathcal{C}(\vec{\sigma}^{3m-i})\mathcal{B}_0 q_{3m-i} \quad (27)$$

For l=2, 3, ..., L the intermediate image $I_{l+1,m}$ is composed of the x-sheared versions of three intermediate images ($\{I_{l,3m-i}\}_{i=0}^{2}$) in the previous level:

$$I_{l+1,m} = \mathcal{S}_x(\alpha_{l,3m-2})I_{l,3m-2} + I_{l,3m-1} + \mathcal{S}_x(\alpha_{l,3m})I_{l,3m} \quad (28)$$

And in order to use the free rotation by 0 and $-\pi/2$ radians, in the final level:

$$I_{L+2,l} = I_{L+1,l} + \mathcal{K}(-\pi/2)I_{L+1,2}.$$

The parameters of the coordinate transformations in the algorithm displayed in FIG. 13 (for the various shear-scales and shears) are underdetermined. In fact, only the (nonintegral) scale-factors $\sigma_1$ in the first level are completely determined by the angle of the associated projection. The intermediate shear-factors ($\{\alpha_{l,m}\}_{l=2,3,\ldots,L}$) are chosen to minimize the bandwidths of the intermediate images, in order that they may be sampled most sparsely. Given any such set $\{\alpha_{l,m}\}$ the $\sigma_2$'s (shear-factors) in level l=1 can always be chosen to ensure that the backprojected image $\hat{f}$ produced by the entire hierarchical algorithm of FIG. 13 is equal to the backprojection expression (23). In particular, the shear-scale parameters in the initial level of the hierarchy depend on the set $\{\alpha_{l,m}\}$ as follows:

$$\sigma_1^p = \begin{cases} \cos\theta_p & \text{if } p \leq \frac{P}{2} \\ \cos\left(\theta_p - \frac{\pi}{2}\right) & \text{if } p > \frac{P}{2} \end{cases}$$

$$\sigma_2^p = \begin{cases} \sin\theta_p - \cos\theta_p \sum_{l=2}^{L} \alpha_{l,\mu(p,l)} : p \leq \frac{P}{2} \\ \sin\left(\theta_p - \frac{\pi}{2}\right) - \cos\left(\theta_p - \frac{\pi}{2}\right) \sum_{l=2}^{L} \alpha_{l,\mu(p,l)} : p > \frac{P}{2} \end{cases}$$

where $\mu(p, l) = p/3^{l-1}$ describes the path in the hierarchy from the $p^{th}$ projection in level 1 to the root.

By examination of the upper half $p \leq P/2$ of the block-diagram in FIG. 13, following the sequence of shears backwards from the last level, it can be seen that in this top half of the hierarchy the underlying continuous intermediate image $I_{l,m}$ is related to its associated virtual intermediate image $\tilde{I}_{l,m}$ by a shear i.e., $$I_{l,m} = \mathcal{S}_x(\beta_{l,m})\tilde{I}_{l,m} \quad (29)$$

Similarly to the derivation of Equation (12), it can be shown that the intermediate shear-factors depend on the $\{\beta_{l,m}\}$ as follows:

$$\alpha_{l,3m-i} = \beta_{l+1,m} - \beta_{l,3m-i} \text{ for } i=0, 1, 2. \quad (30)$$

The freedom in the choice of the shear coefficients $\alpha_{l,m}$ provides a freedom in the choice of the $\beta$ parameters, which can be used to minimize the bandwidth of the intermediate projections. This will reduce their sampling requirements, and improve the computational efficiency of the algorithm.

Let the spectral support of the intermediate image $I_{l,2m-1}$ be denoted by $W_{l,3m-i}$, and its y bandwidth (i.e., slow bandwidth) be denoted by $\Omega_y(W_{l,3m-i})$. The optimal $\beta_{l,3m-i}$ minimizing $\Omega_y$ ($W_{l,3m-i}$) is then, for i=0, 1, 2

$$\beta^*_{l,m-i} = \beta \in \{\Omega_y(\mathcal{S}_y(\beta)\tilde{W}_{l,3m-i})\} \quad (31)$$

If the view angles are uniformly distributed, it is found that $\beta^*_{l,3m-i} \approx \beta^*_{l+1,m}$. An advantageous choice is then $\beta^*_{l,3m-1} \triangleq \beta^*_{l+1,m}$, yielding $\alpha^*_{l,3m-1}=0$. which eliminates about one third of the required shear operations.

The set $\{\beta_{l,m}\}$ is determined by tracking the spectral support of the intermediate images in the algorithm, backwards from the final to first level of the hierarchy. Following from the slice projection theorem, it is clear that the spectral support of $\tilde{I}_{l,m}$ is $$\tilde{W}_{l,m} = \{(r\cos\theta_p, r\sin\theta_p): p \in N_{l,m}, r \in [-\pi,\pi]\} \quad (32)$$

For the sake of sampling requirements, the spectral support $\tilde{W}_{l,m}$ is characterized by its end points denoted as $\tilde{E}_{l,m}$, $$\tilde{E}_{l,m} = \{(\cos\theta_p, \sin\theta_p): p \in N_{l,m}\} \quad (33)$$

and shown in FIG. 12. The upper and lower band-edges of this set $\tilde{E}_{l,m}$ are denoted by $\tilde{E}^+_{l,m}$ and $\tilde{E}^-_{l,m}$ respectively. So if $N_{l,m}=\{b, b+1, \ldots, e\}$, $\tilde{E}^+_{l,m}=(\cos\theta_e, \sin\theta_e)$ and $\tilde{E}^-_{l,m}=(\cos\theta_b, \sin\theta_b)$. Because of the ternary combination rule, the upper, middle and lower third sets of these spectral-support end-points are denoted as $\tilde{E}^0_{l+1,m}$, $\tilde{E}^1_{l+1,m}$, and $\tilde{E}^2_{l+1,m}$ i.e. $\tilde{E}^1_{l+1,m} = \tilde{E}_{l,3m-i}$. And following from (30) and Fourier theory about affine transformations, $E_{l,m}=\mathcal{S}_y(\beta_{l,m})\tilde{E}_{l,m}$. The optimal shear factors are then $$\alpha^*_{l,3m-i} = -\frac{(E^i_{l+1,m})^+_y + (E^i_{l+1,m})^-_y}{(E^i_{l+1,m})^+_x + (E^i_{l+1,m})^-_x} \quad (34)$$

$$i = 0, 2$$

The algorithm FindAlphas shown in FIG. 14 finds the optimal shear-factors $\alpha^*_{l,m}$ while traversing through the hierarchy down from level L to level 2 in the shear-scale backprojection algorithm (FIG. 13). The inputs to the algorithm are the sets of end-points of the spectral support of the images at the start of the (L+1)-th level: $E_{L+1,m}$ for m=1, 2. In particular, in the case of uniformly distributed angles, $$E_{L+1,1}=E_{L+1,2}=\{(\cos\theta_p, \sin\theta_p): p=1, 2, \ldots, P/2\}.$$

Finding Upsampling Factors

The y-upsampling factors $\{U_{l,m}\}$ in the algorithms and different embodiments of this invention determine the sampling density of the intermediate images in the slow direction. These upsampling factors can be chosen to meet the sampling requirements of the intermediate images, while being restricted to integer values. This restriction to integers has computational advantages, and may be expanded to that of rational numbers with low-valued denominators for the same reason.

The problem of choosing these factors is slightly simpler in the case of the shear-scale algorithm than the two-shear case. In the former case, examining FIG. 13 it is easy to see that the slow sampling interval of the intermediate image $I_{l,m}$ is $$\prod_{l'=l}^{L} U_{l',\mu(l',l,m)},$$

where $\mu(l', l, m)=m/3^{l'-l}$ describes the path from $I_{l,m}$ to the final node of the algorithm. Sampling theory requires that slow direction sampling interval be as follows:

$$\Delta_s^{l,m} = \prod_{l'=l}^{L} U_{l',\mu(l',l,m)} \leq \pi/\Omega_y(W_{l,m}) \quad (35)$$

where $\Omega_y(W_{l,m})$ is the y-bandwidth of $I_{l,m}$. The computational cost of the whole algorithm, given a set of upsampling factors $\mathcal{U}\triangleq\{U_{l,m}\in 2, 3, \ldots, L; m=1, 2, \ldots, 6\cdot 3^{L-1}\}$, can be shown to be $$\mathcal{J}(\mathcal{U}) = \sum_{l=2}^{L} \sum_{m=1}^{6\cdot 3^{L-l}} \left(\frac{c_{l,m}}{\prod_{l'=l}^{L} U_{l',\mu(l',l,m)}}\right) + c \quad (36)$$

where the constants $c_{l,m}$ denote the relative computational cost of digital coordinate transformation applied to intermediate digital image $I_{l,m}^d$. These constants are determined by the order of digital filters used, and by the particular implementation of the coordinate transformation, as will be described in the discussion of efficient implementations of coordinate transformations. The best set $\mathcal{U}$ to minimize $\mathcal{J}\mathcal{U}$ subject to the constraint Equation (35), can be solved by dynamic programming or a comprehensive search. For a given set of view angles, the best set of upsampling factors can be precomputed and stored in a lookup table.

In the case of the two-shear rotation algorithm, the problem is complicated slightly by the fact that the use of two-shear rotation causes a defacto fractional up and down sampling of intermediate images. In particular, the slow-sampling periods $\Delta_{l,m}$ in adjacent levels of the algorithm are related as follows: $\Delta_s^{l+l,m/3}=\Delta_s^{l,m}/(U_{l,m}\kappa_{l,m})$ where $$\kappa_{l,m} = \begin{cases} 1 & \text{if } m = 2, 5, 8, \ldots, 2*3^k - 1 (\text{norotation}) \\ 1/\cos(\Delta_\theta * 3^{l-1}) & \text{if } m = 1, 3, 4, 6, \ldots, 2*3^k (\text{rotation by} \pm \Delta_\theta * 3^{l-1}) \end{cases}$$

So the constraint on the slow direction sampling interval becomes as follows:

$$\Delta_s^{l,m} = \prod_{l'=l}^{L} (U_{l',\mu(l',l,m)}\kappa_{l',\mu(l',l,m)}) \leq \pi/\Omega_y(W_{l,m}) \quad (37)$$

where $\Omega_y(W_{l,m})$ is the y-bandwidth of $I_{l,m}$. The computational cost given by Equation (36) now can be minimized subject to the constraint in Equation (37).

Oversampled Versions of the Algorithms

Oversampling can be incorporated into this algorithm to improve the accuracy of the reconstruction. One way to do so is uniformly over all intermediate images in the algorithm: whenever an interpolation is performed in the algorithm, the image being operated upon is at least oversampled by some predetermined constant $\gamma$. In particular, the ratio of the Nyquist rate to the sampling frequency (in both slow and fast directions) of every intermediate image that is subject to a digital coordinate transformation or resampling should preferably be less than $\gamma$. This oversampling is preferably incorporated while modifying the algorithms of the present invention as little as possible.

Oversampling in the Slow Direction

In the previously described algorithms of the present invention, the sampling frequency in the slow direction is controlled by the upsampling factors $U_{l,m}$. This proves to be a useful tool for maintaining the oversampling condition in the oversampled versions of the algorithms, and therefore results in no alterations to the structures of the algorithms of the present invention. The upsampling by a factor of $1/\gamma$ is achieved by simply modifying the constraint on the slow-direction sampling interval by the factor $\gamma$, i.e., requiring $$\Delta_s^{l,m} \leq \gamma\pi/\Omega_s(I_{l,m}) \text{ for } l=2, 3, \ldots, L.$$

Oversampling in the Fast Direction

In the fast direction, the computationally inexpensive integer upsampling is not used to control the oversampling, so the algorithm is modified to involve fractional upsampling. In the two-shear hierarchical backprojection algorithm, such a fractional upsampling by factors $\{U_{l,m}: m=1, 2, \ldots, 2.3^L\}$ in the slow direction is already included in level l=1. We therefore simply increase the upsampling factors $U_{l,m}$ to incorporate this oversampling and then downsample the image after the last digital coordinate transformation has been performed, to return the image to the desired sampling scheme (where $\Delta_f=\Delta_s=1.0$). This modification to the two-shear algorithm therefore involves only one additional level of fractional resampling. This x coordinate resampling is combined with the digital x-shear in the $L^{th}$ level for improved computational efficiency. The block diagram of this algorithm is in FIG. 15.

In the shear-scale hierarchical backprojection algorithm, the x-upsampling operations are combined with the x-shear-scales ($\mathcal{C}(\vec{\sigma})$ at the beginning of the algorithm) to avoid an extra level of resampling. It is easy to see that x-upsampling is simply a special case of x-shear-scaling, with the shear factor set to 0. The combination of these two operations is still an x-shear-scale: $\mathcal{C}(\sigma_1, \sigma_2)\mathcal{C}(1/U, 0)=\mathcal{C}(\sigma_1/U, \sigma_2/U)$. The downsampling at the end of the algorithm is combined with the x-shears in $L^{th}$ level ($\mathcal{S}_{\alpha_{L,m}|m-1, \ldots, 6}$), to make them effectively shear-scales of the digital image. It can be shown that an x-shear by a followed by a x-downsampling by U is effectively an x-shear-scale: $\mathcal{C}(U, 0)\mathcal{S}_x(\alpha)=\mathcal{C}(U, 1+U\alpha)$.

The exact values of these upsampling and downsampling factors is determined both by the parameter γ and the spectral structure of the intermediate images. In the fast direction, the oversampling condition is that the fast direction (y coordinate) sampling interval satisfy $\Delta_f^{l,m} \leq \gamma\pi/\Omega_f (I_{l,m})$ for l=2, 3, ..., L. So the additional upsampling necessary is $$\eta = \frac{\max_{2 \leq l \leq L} \Omega_f(I_{l,m})}{\gamma\pi} \quad (38)$$

Consequently, the upsampling factors $\tilde{U}_{l,m}$, of the oversampled algorithm, are modified from $U_{l,m}$, those of the non-oversampled two-shear algorithm, as follows:

$$\tilde{U}_{l,m}=\eta U_{l,m} \text{ and } \tilde{U}_{L+l,m}=\eta \quad (39)$$

In other words, the upsampling factors in the first level are modified to ensure that all the intermediate images in the algorithm are oversampled according to the parameter γ. Consequently, after the last rotation, the images have a fast-sampling interval of 1/η; and, therefore, at the $L^{th}$ level, they have to be downsampled by η to return them to a unit-sampling scheme.

It must be noted here that because the input projections are assumed to be sampled exactly at the Nyquist rate, the oversampling condition in the fast direction will not be satisfied for the first-level images, $\mathcal{B}_0 q_{\theta_p}$, p=1, ..., P.

The block diagram of this ternary oversampled shear-scale-based algorithm is in FIG. 16.

Collapsing Sequences of Similar Operations

Whenever there is a sequence of two operations operating on the same single coordinate, they may be combined for improved computational cost and resampling accuracy. The following is another example, in addition to the previously mentioned ones of combining x-shears and x-upsampling/downsampling, or x-shear-scales with x-upsampling/downsampling.

The non-oversampled two-shear algorithm of FIG. 10A involves a y-shear followed by an x-shear of four out of six of the intermediate images in the $L^{th}$ stage. We incorporate the final downsampling of the image in the oversampled version of FIG. 15 by collapsing the sequence of two operations—the x-downsampling followed by the x-shear of this stage—into a single one. This leaves the length of the cascade of interpolations unchanged from the non-oversampling case.

Hierarchies of Arbitrary Radixes/Branching factors

All these algorithms can be easily modified for the case when the set of view-angles is not of the form $2*3^L$. Though the preferred embodiment is for all the branches of the hierarchy to involve the aggregation of triplets of intermediate images, or use rotations by $\pm\pi/2$ or 0, arbitrary numbers of intermediate images may be combined at each stage.

Given an arbitrary number (say M) of intermediate images at a particular level of the algorithm, 3×M/3 of them may be combined in groups of three (where x is the largest integer less than or equal to x). If the remaining number of intermediate images is two then they may be aggregated as a pair to produce an image at the next level. If there is only a single intermediate image remaining it may be passed on, without alteration, to the next level of the hierarchy.

The branching factor of the hierarchy (the number of branches that aggregate at a node of the hierarchy) may be altered, not just to accommodate arbitrary numbers of view-angles, but also to reduce the depth of the hierarchy and thereby improve image quality. In that case it may be useful to aggregate images not in pairs or triplets but in larger groups.

The previous prescriptions for the parameters of the coordinate transformations may be easily extended to nodes with arbitrary branching factors. For example in the rotation-based algorithm where $$I_{l+1,n} = \sum_{i=1}^{M} \mathcal{K}(\delta_{l,m_i}) I_{l,m_i},$$

the relations described in Equations (10) and (15) still hold, and the rotation angles therefore are prescribed by $\delta_{l,m_i}=\alpha_{l+1,m}-\alpha_{l,m_i}$. In the case of the shear-scale based algorithm where $$I_{l+1,n} = \sum_{i=1}^{M} \mathcal{S}_x(\alpha_{l,m_i}) I_{l,m_i},$$

Equation (29) still holds. Extending the notation $E_{l,m}^i$ to refer to the $i^{th}$ set of the M sets of projections being aggregated, one obtains an equation for $\alpha^*_{l,m_i}$ identical to the right-hand-side of Equation (34).

0.1 Hierarchical Algorithms Based on Other Image Transformations

The back-projection equation (3) may be written in the form $$\hat{f}(\vec{x}) = \frac{1}{P} \sum_{p=1}^{P} [\mathcal{B}_0 q_P](A_{\theta_p} \vec{x}) \quad (40)$$

for any matrix $A_\theta$, as long as the first row of $A_\theta$ is [cos θ sin θ]. The freedom to choose arbitrary values for the remaining two entries of $A_\theta$ allows for flexibility in the design of the coordinate transformations used in the hierarchical algorithm. Matrix $A_\theta$ can be factored as $$A_\theta = \prod_{l=1}^{L} A(\delta_l)$$

for some parameter vectors $\delta_l$ that are related to θ, but are not completely determined, owing to the freedom in the two bottom entries of $A_\theta$. This factorization can be used to derive a hierarchical decomposition of the backprojection equation (40) with a corresponding block diagram such as FIG. 5, with the coordinate transformation steps denoted by $\mathcal{K}(\delta_{l,m})$ representing the image coordinate transformation operators defined as $$(\mathcal{K}(\delta_{l,m})f)(\vec{x}) = f(A(\delta_{l,m})\vec{x}).$$

Clearly, the specific embodiments of this invention described herein are special cases of this more general choice of matrix $A_\theta$ and its factorization, and the associate coordinate transformation. The effect of these coordinate transformations on the Fourier spectrum of the intermediate images is analyzed similarly to the cases already described, because the effect of an affine transformation by matrix A in the spatial domain is an affine transformation by matrix $A^{-T}$, i.e., the inverse-transpose of A, in the frequency domain. Similar considerations can therefore be used to select free parameters in the transformations with the goal of reducing the computational requirements. Thus, the class of digital image coordinate transformations used in the hierarchical backprojection algorithms of the present invention includes many other transformations in addition to those described for specific embodiments. Furthermore, because matrices $A(\delta_{l,m})$ can be factorized into a product of triangular matrices, the coordinate transformations can be performed as a cascade of single-axis coordinate transformations, if desired.

0.2 Efficient and Accurate Implementation of Digital Image Coordinate Transformations and Resampling The accuracy and speed of the hierarchical backprojection and reprojection algorithms of the present invention depend on the specifics of the implementation of the various digital image coordinate transformations and resampling operations. Improved accuracy requires in general high order filters or interpolations, which usually increases the computation cost. The cost of high order filtering or interpolation can be reduced by decomposing the operations into lower order operations. Additional reduction in computation and/or memory requirements is obtained if the filters used are shift invariant. High order finite impulse response filters can be implemented efficiently using low-order recursive filter, or by using the fast Fourier transform (FFT).

In particular, if a separable representation basis is assumed for the continuous image, a digital y-shear of the digital image can be achieved by fractional delays of the individual vertical lines in a digital image array. Likewise, a digital x-shear can be expressed as a fractional delay of one row at a time. In turn, a fractional delay of a 1D signal can be accomplished using a shift-invariant filter. Similar decompositions are known for 3D images and shear operations.

Resampling a digital image can also be usually performed using lower dimensional operations, which can often be shift invariant. For example, image upsampling along one coordinate by an integer factor U may be decomposed into U different, computationally efficient, fractional delays. This is essentially, the so-called polyphase decomposition, well-known in digital signal processing. Rational, but non-integer resampling along one coordinate can be decomposed into a cascade of integer down and upsampling, each of which is efficiently performed.

More general digital image resampling can also be decomposed into lower dimensional operations. Consider the resampling of a digital 2D image f from a sampling pattern with samples $S_1$ lying on a family of curves, denoted $CF_1$, to another another pattern with points $S_2$ lying on a different family of curves, $CF_2$, producing the digital image h. If the two families of curves intersect at sufficient density the method that was described with reference to FIG. 23 for resampling from one fan to another rotated fan can be used for general curves. Otherwise a third family of curves $CF_3$ can be introduced, which intersects both $CF_1$ and $CF_2$ at a desired density. The digital image can then be resampled from $CF_1$ to its intersections with $CF_3$, then to the intersections of $CF_3$ with $CF_2$, and finaly on $CF_2$ to the desired sampling pattern.

This process generalizes to 3D, for example by considering surfaces instead of curves, to first reduce the process to one of resampling on surfaces, and then using the 2D process to further reduce resampling on surfaces to resampling on curves.

Digital coordinate transformations and resampling can often be combined, improving the computational efficiency. For example, the digital x-shear-scale operations used in the shear-scale algorithm shown in FIG. 13 can be decomposed into resampling operations on individual horizontal lines.

1 Divergent Beam Fast Hierarchical Backprojection Algorithms 1.1 Fan-Beam Projection and Backprojection Consider the case of equiangular-spaced detectors located on a circle around the object. The fan-beam tomographic projection, at a source-angle $\beta$, of a two-dimensional image f(x, y) is denoted by $(\mathcal{R}_\beta f)(\gamma)$ and is defined as the set of line integrals along the rays of a fan, parameterized by $\gamma$, centered at the source position on a circle of radius D from the origin.

The function $f(\vec{x})$ is assumed to be zero-valued outside a disc of radius R.

The fan-beam ray $V(\beta, \gamma, T)$, shown in FIG. 17, is defined by $$V(\beta, \gamma, T) = D\begin{bmatrix} -\sin\beta \\ \cos\beta \end{bmatrix} + T\begin{bmatrix} \sin(\beta+\gamma) \\ -\cos(\beta+\gamma) \end{bmatrix} \quad (41)$$

The fan-beam projection at source-angle and fan-angle $\gamma$ is $(\mathcal{R}_\beta f)(\gamma) = \int_{T=0}^{\infty} f(V(\beta, \gamma, T))dT$. Since f is zero outside the disc of radius R, the integral needs only be performed within the disc i.e. between $T_{ST}$ and $T_{END}$.

In computed tomography with the fan-beam geometry, projections are available at a set of discrete source angles $\{\beta_p: p=1, 2, \ldots, P\}$, and within each fan the angles of the rays are indexed by $\{\gamma_j: j=1, 2, \ldots, J\}$. In the case of equiangular fan-beam geometry the detectors are equally distributed on the arc of a circle centered at the source, so the fan-angles are evenly spaced. In the case of equispaced detectors, the detectors are equally distributed on a line perpendicular to the line from the source position to the origin. The fast backprojection algorithms for fan-beam geometry described here assume equiangular distribution with J odd and $\gamma_j = \Delta_\gamma \cdot (j-(J+1)/2)$. However, the algorithms may be easily extended to other fan-angle geometries.

The reconstruction algorithm from a set of P fan-beam projections $\{R_{\beta_i}(\gamma): i=1, 2, \ldots, P\}$, may be expressed as the scaling and filtering of each fan-beam projection followed by a weighted backprojection (5):

$$\hat{f}(\vec{x}) = \sum_{p=1}^{P} W(T(\vec{x}, \beta_p)) q_{\beta_p}(\gamma(\vec{x}, \beta_p)) \quad (42)$$

where W(T) is an appropriate weight function, $T(\vec{(x)}, \beta)$ and $\gamma(\vec{(x)}, \beta)$ are the distance along the ray between source and image point $\vec{x}$ for source position $\beta$, and the fan angle of that ray, respectively, and $q_\beta(\gamma)$ are the weighted and filtered projections $$Q_\beta(\gamma) = R'_\beta(\gamma) * g(\gamma), R'_\beta(\gamma) = R_\beta(\gamma) \cdot D \cdot \cos\gamma$$

where $g(\gamma)$ is an appropriate filter.

Definition 1.1 The weighted backprojection of a function q at a single source angle β is defined by $$(\mathcal{W}_\beta q)(\vec{x}) \triangleq W(T(\vec{x}, \beta))q(\gamma(\vec{x}, \beta)) \tag{43}$$

and the weighted backprojection operator $\mathcal{W}_{\vec{\beta}}$ (where $\vec{\beta} \in [0, 2\pi)^P$) is defined by $$(\mathcal{W}_{\vec{\beta}}\{q_p\}_{p=1}^P)(\vec{x}) \triangleq \sum_{p=1}^P (\mathcal{W}_{\beta_p}q_p)(\vec{x}) \tag{44}$$

Therefore $\hat{f}(\vec{x}) = (\mathcal{W}_{\vec{\beta}}\{q_p\}_{p-1}^P)(\vec{x})$.
It is easily shown that $$\mathcal{W}_\beta = \mathcal{K}_{(-\beta)}\mathcal{W}_0 \tag{45}$$

where $\mathcal{K}(\beta)$ denotes the rotation by β operator, and consequently that $$(\mathcal{W}_{\vec{\beta}}\{q_p\}_{p=1}^P)(\vec{x}) = \sum_{p=1}^P (\mathcal{K}(-\beta_p)\mathcal{W}_0 q_p)(\vec{x}) \tag{46}$$

Thus, as in the parallel beam case, the weighted backprojection of P fan-beam projections may be expressed as the sum of weighted-zero-backprojected images as seen in FIG. 4, with $\mathcal{B}_0 = \mathcal{W}_0$. In fact, close analogs of the backprojection operator defined in Equations (43) and (44) apply more generally to the reconstruction of functions in two and higher dimensions from projections of a general form, with appropriate definition of the functions $\gamma(\vec{x}, \beta)$ and $T(\vec{x}, \beta)$. The methods of the present invention extend to these other applications, with appropriate definition of a coordinate transformation $\mathcal{K}$.

1.2 Fast Hierarchical Backprojection

The Fast Hierarchical Backprojection Algorithm for the fan-beam geometry is similar to that for the parallel beam case. It combines the fan-beam projections in a ternary hierarchical structure, exploiting the fact that intermediate images formed by projections that are close to each other in projection angle can be sampled sparsely. The block-diagram is shown in FIG. 18. Similar algorithms can be derived for binary or other (possibly mixed) radix structures.

The equations that govern the combination of the underlying continuous images in FIG. 18 are as follows:

$$I_{1,m} \triangleq \mathcal{W}_0 q_m \tag{47}$$

$$I_{l+1,m} \triangleq \mathcal{K}(\delta_{l,3m-2})I_{l,3m-2} + I_{l,3m-1} + \mathcal{K}(\delta_{l,3m})I_{l,3m} \tag{48}$$
$$l = 1, 2, \ldots, L$$

$$I_{L+1,1} \triangleq I_{L,1} + \mathcal{K}(-\pi/2)I_{L,2} + \mathcal{K}(-\pi)I_{L,3} + \mathcal{K}(-3\pi/2)I_{L,4} \tag{49}$$

In the embodiment described next, it is assumed that the source angles are uniformly spaced in $[0, 2\pi)$ as follows:

$$\beta_j = -\frac{\pi}{4}\left(1 - \frac{1}{9}\right) + \Delta_\beta(j-1) \text{ where } \Delta_\beta = \pi/(2 \cdot 3^L)$$

The intermediate rotation angles are then chosen as in the case using Equation (22), with $\Delta_\beta$ replacing $\Delta_\theta$.

The constituent fans of an intermediate image in three levels of the algorithm with block diagram FIG. 18 are illustrated in FIG. 20.

1.2.1 The Sampling Scheme

One embodiment of the fan-beam algorithm uses a sampling scheme of the intermediate images in the algorithm derived by analogy to the case, which is described next. Alternatives and improvements are described later.

A single-fanbeam-backprojection image (an image $\mathcal{W}_0 q$ produced by weighted backprojection of a single fanbeam) has a structure amenable to sparse sampling. It follows from Equation (43) that $(\mathcal{W}_\beta q)(V(\beta, \gamma, T)) = W(T)q(\gamma)$. A single sample at a particular $T = T_1$ on the ray indexed by γ in a fan oriented at β=0 is therefore sufficient to specify the value of the image along the entire ray: it is simply proportional to W(T) where T is the distance from the source to the point in the ray.

An intermediate image in the algorithm is a sum of several rotated versions of such single-fanbeam-backprojection images, each generated from a constituent projection. We refer to the fan at the angle that is at the center of the angular interval spanned by the constituent projections as the central constituent fan. This may correspond to an actual projection—e.g., in the case of a ternary algorithm—or a to virtual projection—e.g., in the case of a binary algorithm. For example, the fan in FIG. 20A is the central constituent fan for both FIG. 20B and FIG. 20C.

Recall that in the parallel-beam algorithm the intermediate images are sampled on Cartesian sampling patterns aligned with the central constituent. In the rotation-based parallel-beam case the intermediate images are sampled along parallel vertical rays. The spacing of samples along each of these parallel rays is chosen to guarantee that the other constituent projections of the image are sufficiently sampled (by the Nyquist sampling criterion) along that ray. The necessary spacing is exactly equal to the spacing of the intersection points of the vertical rays with a set of rotated parallel rays corresponding to the extremal constituent projection, that is, the one farthest away in view angle from the center projection.

In direct analogy to the parallel-beam case, here the intermediate images are sampled along the rays of the central constituent fan. The sampling points along the rays of the central fan are the intersection points of the central fan with the extremal constituent fans. This results in samples that are not uniformly spaced along each ray. Consider two fans $V(\beta, \gamma_j, \cdot)|_{j=1}^J$ and $V(\beta', \gamma'_j, \cdot)|_{j=1}^J$. Assuming the equiangular fanbeam geometry with an odd number J of detectors, $\gamma_j = \Delta_\gamma \cdot (j - (J+1)/2)$. The points on the $r^{th}$ ray of the -fan (corresponding to fan-angle $\gamma_r$) that intersect the β'-fan, are determined by the equation $V(\beta, \gamma_r, T) = V(\beta', \gamma'_j, T')|_{j=1}^J$, which has the solution $$T_{\beta,\beta',\gamma_r}(\gamma'_j) = \frac{D[\sin(\beta - \beta' - \gamma'_j) + \sin(\gamma'_j)]}{\sin(\beta - \beta' + \gamma_r - \gamma'_j)}$$

The function $T_{\beta,\beta',\gamma_r}(\gamma')$ describes how the fan $V(\beta', \cdot, \cdot)$ varies along the $r^{th}$ ray of the fan $V(\beta, \cdot, \cdot)$. It carries information about the varying sampling rate along a ray of the fan. The steeper the slope, the sparser are the samples. The local sampling rate at any γ' is proportional to $(dT/d\gamma')^{-1}$. A typical T(γ') is displayed by the solid line in FIG. 22.

Two modifications are made to $T_{\beta,\beta',\gamma_r}(\gamma')$ to get a new sampling function $\tilde{T}_{\beta,\beta',\gamma_r}(\gamma')$:

1. Intermediate images are to be sampled within the disc of radius R, with margins of at least one sample on each ray outside the disc (one sample with $T<T_{ST}$ and one sample with $T>T_{END}$). Define $\gamma'_{END}=T^{-1}_{\beta,\beta',\gamma_r}(T_{END})$: the value of $\gamma'$ corresponding to $T_{END}$. Fans with adjacent source angles may lack intersection points with $T>T_{END}$. In order to rectify that, the slope of $\tilde{T}_{\beta,\beta',\gamma_r}(\gamma')$ for $T>T_{END}$ is clamped to that at $T_{\beta,\beta',\gamma_r}(\gamma'_{END})$.

2. The final image is sampled on a Cartesian pattern with unit sampling intervals. This is the smallest interval at which intermediate images need to be sampled. The point $\gamma'$ at which a unit sampling rate along the $\gamma^{th}$ ray is achieved is determined by solving the equation $d/(d\gamma)T_{\beta,\beta',\gamma_r}(\gamma)=1/\Delta_\gamma$ for $\gamma$. To maintain the unit sampling interval constraint, the slope of $\tilde{T}_{\beta,\beta',\gamma_r}(\gamma')$ for $\gamma' \geq \gamma'\bullet$ is set to $1/\Delta_\gamma$.

FIG. 22 displays $T_{\beta,\beta',\gamma_r}(\gamma)$ and $\tilde{T}_{\beta,\beta',\gamma_r}(\gamma)$ for a typical $\beta$ and $\gamma$. It also displays the T-values of the actual sampling points on the ray which are the set $\{\tilde{T}_{\beta,\beta',\gamma_r}(j\Delta_\gamma):j\epsilon\}$. The integers j are chosen so that there are margins of at least one sample on each side of the image boundary.

Clearly, the locations of the sample points prescribed by the principles outlined herein can be computed from the geometry of the fans, Equation (21) for the set $N_{l,m}$ of the constituent projections, the selected rotation angles $\delta_{l,m}$ for the intermediate images (given in Equation (22) for the case of equispaced view angles), and the chosen form for $\tilde{T}_{\beta,\beta',\gamma_r}(\gamma)$.

Separable Rotation and Up-Interpolation for Fan-Beam Sampling

As described in the Overview, the upsampling operations, and upsampling combined with rotation operations can be decomposed into computationally efficient one dimensional resampling operations.

1.2.2 Sampling Scheme Based on Local Fourier Structure

Given an image $f(\vec{x}):^n\rightarrow$, we want to find a sampling function $t(\vec{x}):^n\rightarrow^n$ such that $f(t(\vec{x}))$ has a small essential bandwidth and therefore can be sampled on the set of points $\{t(\vec{m}):\vec{m}\epsilon^n\}$. We find this sampling function as follows. As will be explained shortly, knowing how $f(\vec{x})$ is composed of its constituent projections, we find the n×n matrix function $$v(\vec{x}) = \begin{bmatrix} v_{11}(\vec{x}) & v_{12}(\vec{x}) \\ v_{21}(\vec{x}) & v_{22}(\vec{x}) \end{bmatrix}$$

in the case n=2 that describes how the function f should be sampled locally at the point $\vec{x}$. We then integrate this matrix function over the image domain to get the sampling function $t(\vec{x})$.

In our algorithms, we know that the intermediate image f is of the form:

$$f = \sum_p \mathcal{K}(\delta_p)\mathcal{W}_\theta q_p$$

for some angles $\delta_p \in [\beta_{min}, \beta_{max}]$. Ignoring the weighting by W(T), and assuming that the projections $q_p$ are sampled exactly at the Nyquist rate, we know the local structure of the spectral support at each point in the image f. Because of the fan-backprojection of each band-limited projection $q_p$, an image that is fan-backprojected from a single projection has a negligible spatial bandwidth in the direction of the spoke of the fan, while it's bandwidth in the perpendicular direction is inversely proportionate to the distance from the vertex of the fan as seen in FIG. 24. When a set of these fans are rotated and added together, the local spectral support of this resulting image is the union of the spectral supports of the individual fans.

For example when the constituent fans have source angles between $\beta_{min}$ and $\beta_{max}$ as shown in FIG. 25, the local spectral support at a point $\vec{x}$ in the image domain is a warped wedge with radii oriented between $\theta_{min}$ and $\theta_{max}$, and a radial bandwidth of $\Omega R/r_\theta$ at angle $\theta$. Here $\Omega$ is the spatial bandwidth of the back-projected projection at the center of the image plane assuming the projections are sampled at the Nyquist rate. In the equiangular case $\Omega$ is number of samples of the projection divided by the length of the arc through the origin of the image plane that the backprojected projection covers. Mathematically the spectral support is $$\{(\cos\theta\omega_\theta, \sin\theta\omega_\theta): \theta \in [\theta_{min}, \theta_{max}] \text{ and } \omega_\theta \in [-\Omega_\theta, \Omega_\theta]\} \quad (50)$$

where $$\theta_{max} = \tan\frac{R\sin\beta_{max} - x_1}{R\cos\beta_{max} + x_2}$$

$$\theta_{min} = \tan\frac{R\sin\beta_{min} - x_1}{R\cos\beta_{min} + x_2}$$

$$\Omega_\theta = R\Omega/r_\theta$$

$$r_\theta = \sqrt{(x_1 - R\sin\theta)^2 + (x_2 - R\cos\theta)^2}$$

Given this knowledge of the local two-dimensional fourier structure at a point $\vec{x}$ in the image, the matrix function $v(\vec{x})$ at that point is the sampling matrix that, if the spectral support at that point were uniform across the whole image (such as in the parallel-beam case), would efficiently sample the image. In the intermediate images of interest here, this produces two distinct small-bandwidth and large-bandwidth sampling directions. We fix the first coordinate to be the small-bandwidth direction.

We approximate this sampling matrix function $v(\vec{x})$ by $$\left(\begin{bmatrix} s_1 & 0 \\ 0 & s_2 \end{bmatrix}\begin{bmatrix} 1 & \alpha_1 \\ 0 & 1 \end{bmatrix}\begin{bmatrix} 1 & 0 \\ \alpha_2 & 1 \end{bmatrix}\right)^T.$$

Here $$\alpha_2 = -\frac{\Omega_{min}\sin\theta_{min} + \Omega_{max}\sin\theta_{max}}{\Omega_{min}\cos\theta_{min} + \Omega_{max}\cos\theta_{max}} \text{ and} \quad (51)$$

$$\alpha_1 = \frac{\Omega_{min}\cos\theta_{min} - \Omega_{max}\cos\theta_{max}}{\Omega_{max}\sin\theta_{min} + \Omega_{min}\sin\theta_{min}}$$

$$s_1 = \left([1 \ 0]\begin{bmatrix} 1 & \alpha_1 \\ 0 & 1 \end{bmatrix}\begin{bmatrix} 1 & 0 \\ \alpha_2 & 1 \end{bmatrix}\begin{bmatrix} \cos\theta_{mid} \\ \sin\theta_{mid} \end{bmatrix}\Omega_{mid}\right)^{-1} \text{ and}$$

$$s_2 = \left([0 \ 1]\begin{bmatrix} 1 & 0 \\ \alpha_2 & 1 \end{bmatrix}\begin{bmatrix} \cos\theta_{max} \\ \sin\theta_{max} \end{bmatrix}\Omega_{max}\right)^{-1}$$

Here $$\Omega_{min} \triangleq \Omega_{\theta_{min}} \text{ and } \Omega_{max} \triangleq \Omega_{\theta_{max}}.$$

Angle $\theta_{mid}$ refers to the angle of the projection corresponding to the source-angle $(\beta_{min}+\beta_{max})/2$, and $$\Omega_{mid} \triangleq \Omega_{\theta_{mid}}.$$

These parameters, chosen by geometrical arguments on the spectral support, ensure that the spectral support upon transformation by the sampling matrix is restricted to $[-\pi, \pi] \times [-\pi, \pi]$.

The sampling function for the whole image is found by integrating this sampling matrix function across the whole image—solving the set of differential equations:

$$\frac{dt_i}{dn_j} = v_{ij}(t(\vec{n}))$$

for i, j=1, 2. This may be solved numerically. Even if this exact prescribed pattern is not used, the local Fourier support analysis will evaluate the effectiveness of any sampling pattern.

Figure 26A:
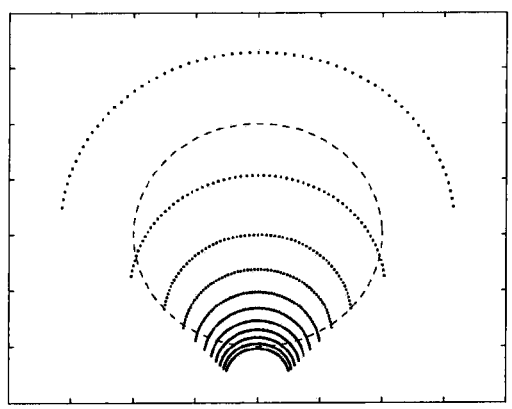
FIGS. 26A and 26B are diagrams of nonuniform sampling patterns used in the algorithm of FIG. 18.
Figure 26B:
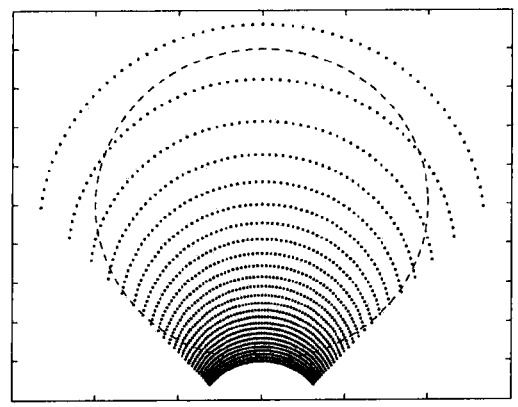

The resulting sampling patterns for a few intermediate images are shown in FIGS. 26A and 26B. For the fan-beam case, this local Fourier-based method produces sampling patterns that are similar to the ones resulting from the intersection-based methods described earlier.d The previously described separable method to resample from one sampling pattern to another can be used with these patterns also. This local Fourier sampling method may be applied directly to find sampling schemes for arbitrary projection geometries over lines, curves or planes over arbitrary dimensions. In the case of the geometry, it reduces to that discussed earlier.

1.2.3 Alternative Sampling Schemes

The sampling schemes in which the samples are located on a fan whose vertex is on the source trajectory (called a "sampling fan") has some shortcomings. The sampling points are chosen separately for each ray resulting in a scheme that is not necessarily optimal in a two dimensional sense. Though the final image in the algorithm is sampled on a uniform rectangular grid with unit-spacing, the intermediate images using the above mentioned scheme are sampled more densely than necessary in certain regions of the image (eg. close to the vertex of the fan). In order to rectify this the above described scheme might be modified to make sparse the sampling in such oversampled regions. Two such possibilities are illustrated in FIG. 27. Both these possibilies incorporate the fact while in the first level the image is sampled efficiently on a fan, in the final level it needs to be sampled on a rectangular grid. These schemes attempt to incorporate the gradual transition from sampling on a fan to a grid.

In FIG. 27A samples are selected on a pseudo-fan whose vertex is located further from the origin than the source radius. In successive levels intermediate images are formed from fans from a larger range of source angles and the distance of the vertex of the pseudo-fan from the origin increases. In the final level the vertex is at infinity; i.e. the rays are the parallel lines of the rectangular grid. In FIG. 27B the samples are located, not on a fan, but on a beam that is less divergent nearer the source position. In successive levels the beam becomes more parallel and less divergent. These or other sampling schemes that take a two dimensional (or, for 3D images, a 3D) point of view will contribute to a faster algorithm.

1.2.4 Other Optimizations

In the fan-beam case with a full trajectory, source angles are distributed in $[0, 2\pi)$. This allows us to take advantage of rotations by $-\pi/2$, $-\pi$ and $-3\pi/2$ that involve no interpolation but only a rearranging of pixels.

The positions of points in the sampling patterns for all levels of the algorithm can be pre-computed and stored in a look up table, or computed on-the-fly along with the processing of data. In either case, computation and/or storage can be reduced by taking advantage of the smooth variation of sample position as a function of ray index, which may be observed in FIGS. 23A and 23A.

1.2.5 Oversampled Fast Hierarchical Backprojection

As in the parallel-beam case, oversampling by a factor $\gamma < 1.0$ can be used to improve accuracy. One way to achieve this in the fan-beam parallel-beam case, is to determine the denser sampling patterns using a fan-angle spacing $\Delta_\beta' = \Delta_\beta \cdot \gamma$.

1.2.6 Algorithms for Short Scan and Alternative Angle Distributions

The methods of this invention are also applicable to the so-called short-scan data acquisition format, where the range of source angles is smaller than $[0, 2\pi)$. The difference is in the weighting used in backprojection: an extra weighting factor (e.g., Parker weighting) is introduced to account for the short scan. Likewise, the algorithms generalize to nonuniform distributions of the source angle, or even small sets of source angles that may not allow reconstruction of a complete image. Furthermore, the order of operations in the algorithm may be modified in various ways (for example pipelining), which would be known to those skilled in the art. For example, the operations may be ordered such that processing may begin as soon as a single projection is available.

What is claimed is:

1. A method for producing projections from an electronic image, the steps comprising:
    a) producing a plurality of intermediate images by performing digital image coordinate transformations on the electronic image;
    b) producing at least one further intermediate image by performing digital image coordinate transformations on at least one intermediate image;
    c) repeating step b) in a recursive manner to further produce a plurality of intermediate images; and
    d) producing a plurality of projections from the intermediate images produced in step c).

2. The method as recited in claim 1 in which at least one of the projections produced in step d) is produced by performing at least one of reprojection and weighted reprojection of an intermediate image.

3. The method as recited in claim 1 in which at least two projections are produced in step d) by reprojection from one intermediate image.

4. The method as recited in claim 1 in which one intermediate image is utilized to produce at least two further intermediate images.

5. The method as recited in claim 1 in which the digital image transformations include at least one of: digital image rotation, digital image shearing, digital image shear-scaling, upsampling, downsampling, resampling, and decimation.

6. The method as recited in claim 1 in which at least one of the digital image coordinate transformations is performed using digital filtering.

7. The method as recited in claim 6 in which at least some of the digital filtering is performed using at least one of shift-invariant filters, one-dimensional digital filters, recursive digital filters, and a fast Fourier transform.

8. The method as recited in claim 1 in which at least one of the repetitions in step c) further includes performing at least one of downsampling and upsampling on the at least one further intermediate image.

9. The method as recited in claim 1 in which at least one of step a), step b), and step c) further includes weighting at least one intermediate image.

10. The method as recited in claim 1 in which a selected degree of oversampling is applied to at least one of the plurality of intermediate images in at least one of step b) and step c).

11. The method as recited in claim 1 in which at least one of producing a plurality of intermediate images in step a), selected coordinate transformations in steps b) or c), and producing a plurality of projections in step d) are combined within a level, or across adjacent levels of a hierarchy or recursion.

12. The method as recited in claim 1 in which at least one of the digital image coordinate transformations is performed with at least one of a non-Cartesian and non-periodic sampling pattern.

13. The method as recited in claim 12 in which at least some of the digital filtering is performed using at least one of shift-invariant filters, one-dimensional digital filters, recursive digital filters, and a fast Fourier transform.

14. A method for producing, from an electronic image, projections along a collection of lines, curves, or surfaces, the steps comprising:
   a) producing a plurality of intermediate images by performing digital image resampling on the electronic image;
   b) producing at least one further intermediate image by performing digital image resampling on at least one intermediate image;
   c) repeating step b) in a recursive manner to further produce a plurality of intermediate images; and
   d) producing a plurality of projections from the intermediate images produced in step c).

15. The method as recited in claim 14 in which digital image resampling is performed by a sequence of lower-dimensional digital filtering operations that utilize intermediate sampling schemes that lie on intersections of the collection of lines, curves, or surfaces.

16. The method of claim 14 in which at least one intermediate image is weighted at least one of before and after resampling.

17. The method as recited in claim 14 in which at least one of producing a plurality of intermediate images in step a), digital image resampling in steps b) or c), and producing a plurality of projections in step d) are combined within a level, or across adjacent levels of a hierarchy or recursion.

18. The method as recited in claim 14 in which at least one of the projections produced in step d) is produced by performing weighted reprojection of an intermediate image.

19. The method as recited in claim 18 in which at least two projections are produced in step d) by at least one of reprojection and weighted reprojection from one intermediate image.

20. The method as recited in claim 14 in which one intermediate image is utilized to produce at least two further intermediate images.

* * * * *